US012671944B2

(12) United States Patent
Kim et al.

(10) Patent No.: US 12,671,944 B2
(45) Date of Patent: Jun. 30, 2026

(54) SOUND APPARATUS AND VEHICULAR APPARATUS INCLUDING THE SAME

(71) Applicant: LG Display Co., Ltd., Seoul (KR)

(72) Inventors: Daewon Kim, Paju-si (KR); YeongRak Choi, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 206 days.

(21) Appl. No.: 18/615,650

(22) Filed: Mar. 25, 2024

(65) Prior Publication Data

US 2024/0334131 A1 Oct. 3, 2024

(30) Foreign Application Priority Data

Mar. 27, 2023 (KR) ........................ 10-2023-0039723

(51) Int. Cl.
*H04R 17/00* (2006.01)
*H04R 1/02* (2006.01)

(52) U.S. Cl.
CPC ............. *H04R 17/00* (2013.01); *H04R 1/025* (2013.01); *H04R 2499/13* (2013.01)

(58) Field of Classification Search
CPC . H04R 1/02; H04R 1/025; H04R 7/06; H04R 17/00; H04R 2499/13
See application file for complete search history.

(56) References Cited

U.S. PATENT DOCUMENTS

| | | | | |
|---|---|---|---|---|
| 6,472,798 | B2 * | 10/2002 | Kishimoto | H04R 31/003 310/345 |
| 7,050,593 | B1 * | 5/2006 | Emerling | H04R 5/02 181/161 |
| 8,090,138 | B2 * | 1/2012 | Toyama | B60R 11/0223 381/396 |
| 9,113,248 | B2 * | 8/2015 | Storm | H04R 7/10 |
| 2009/0120715 | A1 * | 5/2009 | Saiki | H04R 1/2803 181/151 |
| 2011/0085684 | A1 * | 4/2011 | Kim | H04R 17/00 381/190 |
| 2021/0352390 | A1 * | 11/2021 | Lee | H04R 9/066 |
| 2022/0272437 | A1 * | 8/2022 | Homma | H04R 1/26 |
| 2023/0016891 | A1 * | 1/2023 | Yamauchi | G10K 9/122 |
| 2024/0395262 | A1 * | 11/2024 | Liang | G10L 17/10 |

* cited by examiner

*Primary Examiner* — Jason R Kurr
(74) *Attorney, Agent, or Firm* — Birch, Stewart, Kolasch & Birch, LLP

(57) ABSTRACT

Discussed is a sound apparatus for placement on a surface of a material, the sound apparatus including a sound generating module including a vibration apparatus configured to be displaced by an electric signal applied to the vibration apparatus. The sound generating module can be exposed to air on at least one side thereof. Also, a vehicular apparatus can include an interior material exposed at an internal space; and at least one or more sound generating apparatuses disposed at the interior material to output a sound to the internal space. The vehicular apparatus can include one or more of sound generating apparatuses.

32 Claims, 30 Drawing Sheets

130: 130C, 130I, 130L 130L: 130L1, 130L2 30-1: 31C 30-2: 31I, 31L 230: 230B

130: 130C, 130E, 130N 130E: 130E2, 130E3 30-1: 31C, 31E 30-3: 31N 230B: 230B3, 230B4 230: 230B

SOUND APPARATUS AND VEHICULAR APPARATUS INCLUDING THE SAME

CROSS-REFERENCE TO RELATED APPLICATIONS

This application claims priority to Korean Patent Application No. 10-2023-0039723 filed in the Republic of Korea on Mar. 27, 2023, the entire contents of which is hereby expressly incorporated by reference into the present application.

BACKGROUND

Technical Field

The present disclosure relates to a sound apparatus and a vehicular apparatus including the same.

Discussion of the Related Art

Vehicles can include a sound apparatus which outputs a sound based on an audio signal output from a multimedia device, and such sound apparatus can include a car audio device. For example, the sound apparatus applied to vehicles can include a front speaker and a rear speaker, which are configured as a coil type device.

SUMMARY

However, a sound apparatus in the vehicles can be limited when outputting a realistic sound or stereo sound of a multichannel through the front speaker and the rear speaker to limitations of the coil type device. Further, in the sound apparatus in vehicles, in a case where the number of speakers are increased, a stereo sound can be output, but due to a size of the speakers based on the coil type device and a limitation of a space in vehicles, there is a limitation in increasing the number of speakers so that a realistic sound or stereo sound cannot be provided using the coil type device.

The inventors of the present disclosure have recognized the problems and disadvantages of the related art and have performed extensive research and experiments for enhancing a sound characteristic and/or a sound pressure level characteristic of a sound apparatus for vehicles. Based on the extensive research and experiments, the inventors have invented a sound apparatus and a vehicular apparatus including the same, which can enhance a sound characteristic and/or a sound pressure level characteristic.

One or more aspects of the present disclosure are directed to providing a sound apparatus and a vehicular apparatus including the same, which can enhance a sound characteristic and/or a sound pressure level characteristic.

Additional features, advantages, and aspects of the present disclosure are set forth in part in the present disclosure and will also be apparent from the present disclosure or can be learned by practice of the inventive concepts provided herein. Other features, advantages, and aspects of the present disclosure can be realized and attained by the descriptions provided in the present disclosure, or derivable therefrom, and claims hereof as well as the appended drawings.

To achieve these and other advantages and aspects of the present disclosure, as embodied and broadly described herein, in one or more aspects, a sound apparatus can include an enclosure including an internal space, and a sound generating module at the internal space, the enclosure can include an opening portion connected to the internal space.

In one or more aspects, a vehicular apparatus according to some embodiments of the present disclosure can include an interior material exposed at an internal space, and at least one or more sound generating apparatuses disposed at the interior material to output a sound to the internal space. The at least one or more sound generating apparatuses can include a sound apparatus. The sound apparatus can include an enclosure including an internal space, and a sound generating module at the internal space, the enclosure can include an opening portion connected to the internal space.

Details of other exemplary embodiments will be included in the detailed description of the disclosure and the accompanying drawings.

In a sound apparatus and a vehicular apparatus including the same according to one or more embodiments of the present disclosure, a sound characteristic and/or a sound pressure level characteristic can be enhanced.

In a sound apparatus and a vehicular apparatus including the same according to one or more embodiments of the present disclosure, a sound characteristic and/or a sound pressure level characteristic in a pitched sound band including a sound of a low-pitched sound band can be enhanced.

In a sound apparatus and a vehicular apparatus including the same according to one or more embodiments of the present disclosure, a signal supply member and a vibration generating apparatus can be configured as one part (or one component), thereby realizing an effect of uni-materialization.

In a sound apparatus and a vehicular apparatus including the same according to one or more embodiments of the present disclosure, a protrusion part and a coupling part can be configured as one part (or one component), thereby realizing an effect of uni-materialization.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with aspects of the disclosure.

It is to be understood that both the foregoing description and the following description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure, are incorporated in and constitute a part of this disclosure, illustrate aspects and embodiments of the disclosure and together with the description serve to explain principles of the disclosure.

Figure 1:
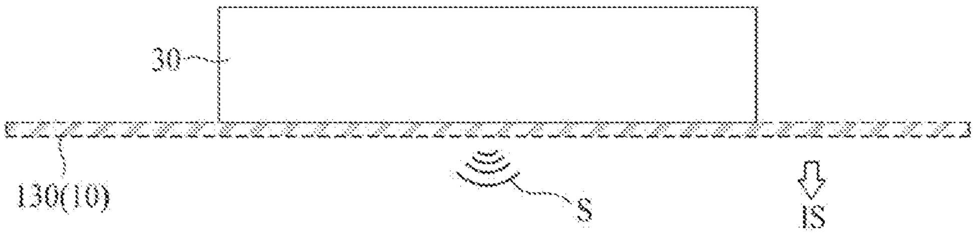
FIG. 1 illustrates a sound apparatus for vehicles according to an embodiment of the present disclosure.

Throughout the drawings and the detailed description, unless otherwise described, the same drawing reference numerals should be understood to refer to the same elements, features, and structures. The sizes, lengths, and thicknesses of layers, regions and elements, and depiction of thereof can be exaggerated for clarity, illustration, and convenience.

DETAILED DESCRIPTION OF THE EMBODIMENTS

Reference is now made in detail to aspects of the present disclosure, examples of which can be illustrated in the accompanying drawings. In the following description, when a detailed description of well-known functions, structures or configurations can unnecessarily obscure aspects of the present disclosure, a detailed description of such known functions or configurations can have been omitted for brevity. Further, repetitive descriptions can be omitted for brevity. The progression of processing steps and/or operations described is a non-limiting example.

The sequence of steps and/or operations is not limited to that set forth herein and can be changed to occur in an order that is different from an order described herein, with the exception of steps and/or operations necessarily occurring in a particular order. In one or more examples, two operations in succession can be performed substantially concurrently, or the two operations can be performed in a reverse order or in a different order depending on a function or operation involved.

Unless stated otherwise, like reference numerals can refer to like elements throughout even when they are shown in different drawings. In one or more aspects, identical elements (or elements with identical names) in different drawings can have the same or substantially the same functions and properties unless stated otherwise. Names of the respective elements used in the following explanations are selected only for convenience and can be thus different from those used in actual products.

Advantages and features of the present disclosure, and implementation methods thereof, are clarified through the aspects described with reference to the accompanying drawings. The present disclosure may, however, be embodied in different forms and should not be construed as limited to the example aspects set forth herein. Rather, these example aspects are examples and are provided so that this disclosure can be thorough and complete to assist those skilled in the art to understand the inventive concepts without limiting the protected scope of the present disclosure.

Shapes (e.g., sizes, lengths, widths, heights, thicknesses, locations, radii, diameters, and areas), dimensions, ratios, angles, numbers, and the like disclosed herein, including those illustrated in the drawings, are merely examples, and thus, the present disclosure is not limited to the illustrated details. Any implementation described herein as an "example" is not necessarily to be construed as preferred or advantageous over other implementations. It is, however, noted that the relative dimensions of the components illustrated in the drawings are part of the present disclosure.

Where a term like "comprise," "have," "include," "contain," "constitute," "made of," "formed of," or the like is used with respect to one or more elements, one or more other elements can be added unless a term such as "only" or the like is used. The terms used in the present disclosure are merely used in order to describe example aspects, and are not intended to limit the scope of the present disclosure. The terms of a singular form can include plural forms unless the context clearly indicates otherwise.

The word "exemplary" is used to mean serving as an example or illustration, unless otherwise specified. Aspects are example aspects. "Embodiments," "examples," "aspects," and the like should not be construed as preferred or advantageous over other implementations. An embodiment, an example, an example aspect, an aspect, or the like can refer to one or more aspects, one or more examples, one or more example embodiments, one or more aspects, or the like, unless stated otherwise. Further, the term "may" encompasses all the meanings of the term "can."

In one or more aspects, unless explicitly stated otherwise, element, feature, or corresponding information (e.g., a level, range, dimension, size, or the like) is construed to include an error or tolerance range even where no explicit description of such an error or tolerance range is provided. An error or tolerance range can be caused by various factors (e.g., process factors, internal or external impact, noise, or the like). In interpreting a numerical value, the value is interpreted as including an error range unless explicitly stated otherwise.

In describing a positional relationship when the positional relationship between two parts (e.g., layers, films, regions, components, sections, or the like) is described, for example, using "on," "upon," "on top of," "over," "under," "above," "below," "beneath," "near," "close to," "adjacent to," "beside," "next to," "at or on a side of," or the like, one or more other parts can be located between the two parts unless a more limiting term, such as "immediate(ly)," "direct(ly)," or "close(ly)," is used. For example, where a structure is described as being positioned "on," "upon," "on top of," "over," "under," "above," "below," "beneath," "near," "close to," "adjacent to," "beside," "next to," "at or on a side of," or the like another structure, this description should be construed as including a case in which the structures contact each other as well as a case in which one or more additional structures are disposed or interposed therebetween. Furthermore, the terms "front," "rear," "back," "left," "right," "top," "bottom," "downward," "upward," "upper," "lower," "up," "down," "column," "row," "vertical," "horizontal," and the like refer to an arbitrary frame of reference.

Spatially relative terms, such as "below," "beneath," "lower," "on," "above," "upper" and the like, can be used to describe a correlation between various elements (e.g., layers, films, regions, components, sections, or the like) as shown in the drawings. The spatially relative terms are to be understood as terms including different orientations of the elements in use or in operation in addition to the orientation depicted in the drawings. For example, if the elements shown in the drawings are turned over, elements described as "below" or "beneath" other elements would be oriented "above" other elements. Thus, the term "below," which is an example term, can include all directions of "above" and "below." Likewise, an exemplary term "above" or "on" can include both directions of "above" and "below."

In describing a temporal relationship, when the temporal order is described as, for example, "after," "subsequent," "next," "before," "preceding," "prior to," or the like, a case that is not consecutive or not sequential can be included and thus one or more other events can occur therebetween, unless a more limiting term, such as "just," "immediate(ly)," or "direct(ly)," is used.

The terms, such as "below," "lower," "above," "upper" and the like, can be used herein to describe a relationship between element(s) as illustrated in the drawings. It will be understood that the terms are spatially relative and based on the orientation depicted in the drawings.

It is understood that, although the terms "first," "second," or the like can be used herein to describe various elements (e.g., layers, films, regions, components, sections, or the like), these elements should not be limited by these terms, for example, to any particular order, precedence, or number of elements. These terms are used only to distinguish one element from another. For example, a first element could be termed a second element, and, similarly, a second element could be termed a first element, without departing from the scope of the present disclosure. Furthermore, the first element, the second element, and the like can be arbitrarily named according to the convenience of those skilled in the art without departing from the scope of the present disclosure. For clarity, the functions or structures of these elements (e.g., the first element, the second element and the like) are not limited by ordinal numbers or the names in front of the elements. Further, a first element can include one or more first elements. Similarly, a second element or the like can include one or more second elements or the like.

In describing elements of the present disclosure, the terms "first," "second," "A," "B," "(a)," "(b)," or the like can be used. These terms are intended to identify the corresponding element(s) from the other element(s), and these are not used to define the essence, basis, order, or number of the elements.

For the expression that an element (e.g., layer, film, region, component, section, or the like) is described as "connected," "coupled," "attached," "adhered," or the like to another element, the element can not only be directly connected, coupled, attached, adhered, or the like to another element, but also be indirectly connected, coupled, attached, adhered, or the like to another element with one or more intervening elements disposed or interposed between the elements, unless otherwise specified.

For the expression that an element (e.g., layer, film, region, component, section, or the like) "contacts," "overlaps," or the like with another element, the element can not only directly contact, overlap, or the like with another element, but also indirectly contact, overlap, or the like with another element with one or more intervening elements disposed or interposed between the elements, unless otherwise specified.

The phrase that an element (e.g., layer, film, region, component, section, or the like) is "provided in," "disposed in," or the like in another element can be understood as that at least a portion of the element is provided in, disposed in, or the like in another element, or that the entirety of the element is provided in, disposed in, or the like in another element. The phrase that an element (e.g., layer, film, region, component, section, or the like) "contacts," "overlaps," or the like with another element can be understood as that at least a portion of the element contacts, overlaps, or the like with a least a portion of another element, that the entirety of the element contacts, overlaps, or the like with a least a portion of another element, or that at least a portion of the element contacts, overlaps, or the like with the entirety of another element.

The terms such as a "line" or "direction" should not be interpreted only based on a geometrical relationship in which the respective lines or directions are parallel or perpendicular to each other. Such terms can mean a wider range of lines or directions within which the components of the present disclosure can operate functionally. For example, the terms "first direction," "second direction," and the like, such as a direction parallel or perpendicular to "x-axis," "y-axis," or "z-axis," should not be interpreted only based on a geometrical relationship in which the respective directions are parallel or perpendicular to each other, and can be meant as directions having wider directivities within the range within which the components of the present disclosure can operate functionally.

The term "at least one" should be understood as including any and all combinations of one or more of the associated listed items. For example, each of the phrases of "at least one of a first item, a second item, or a third item" and "at least one of a first item, a second item, and a third item", can represent (i) a combination of items provided by two or more of the first item, the second item, and the third item or (ii) only one of the first item, the second item, or the third item.

The expression of a first element, a second elements, "and/or" a third element should be understood to encompass one of the first, second, and third elements, as well as any and all combinations of the first, second and third elements. By way of example, A, B and/or C encompass only A; only B; only C; any of A, B, and C (e.g., A, B, or C); or some combinations of A, B, and C (e.g., A and B; A and C; or B and C); and all of A, B, and C. Furthermore, an expression "A/B" can be understood as A and/or B. For example, an expression "A/B" can refer to only A; only B; A or B; or A and B.

In one or more aspects, the terms "between" and "among" can be used interchangeably simply for convenience unless stated otherwise. For example, an expression "between a plurality of elements" can be understood as among a plurality of elements. In another example, an expression "among a plurality of elements" can be understood as between a plurality of elements. In one or more examples, the number of elements can be two. In one or more examples, the number of elements can be more than two. Furthermore, when an element (e.g., layer, film, region, component, sections, or the like) is referred to as being "between" at least two elements, the element can be the only element between the at least two elements, or one or more intervening elements can also be present.

In one or more aspects, the phrases "each other" and "one another" can be used interchangeably simply for convenience unless stated otherwise. For example, an expression "different from each other" can be understood as different from one another. In another example, an expression "different from one another" can be understood as different from each other. In one or more examples, the number of elements involved in the foregoing expression can be two. In one or more examples, the number of elements involved in the foregoing expression can be more than two.

In one or more aspects, the phrases "one or more among" and "one or more of" can be used interchangeably simply for convenience unless stated otherwise.

The term "or" means "inclusive or" rather than "exclusive or." For example, unless otherwise stated or clear from the context, the expression that "x uses a or b" means any one of natural inclusive permutations. For example, "a or b" can mean "a," "b," or "a and b." For example, "a, b or c" can mean "a," "b," "c," "a and b," "b and c," "a and c," or "a, b and c."

Features of various aspects of the present disclosure can be partially or entirely coupled to or combined with each other, can be technically associated with each other, and can be operated, linked, or driven together in various ways. Aspects of the present disclosure can be implemented or carried out independently from each other, or can be implemented or carried out together in a co-dependent or related relationship. In one or more aspects, the components of each apparatus according to various aspects of the present disclosure can be operatively coupled and configured.

Unless otherwise defined, the terms (including technical and scientific terms) used herein have the same meaning as commonly understood by one of ordinary skill in the art to which example aspects belong. It should be further understood that terms, such as those defined in commonly used dictionaries, should be interpreted as having a meaning for example, for example, consistent with their meaning in the context of the relevant art and should not be interpreted in an idealized or overly formal sense, unless expressly defined otherwise herein.

The terms used herein have been selected as being general in the related technical field; however, there can be other terms depending on the development and/or change of technology, convention, preference of technicians, and so on. Therefore, the terms used herein should not be understood as limiting technical ideas, but should be understood as examples of the terms for describing example aspects.

Further, in a specific case, a term can be arbitrarily selected by an applicant, and in this case, the detailed meaning thereof is described herein. Therefore, the terms used herein should be understood based on not only the name of the terms, but also the meaning of the terms and the content hereof.

X-axis direction", "Y-axis direction" and "Z-axis direction" should not be construed by a geometric relation only of a mutual vertical relation and can have broader directionality within the range that elements of the present disclosure can act functionally.

In the following description, various example aspects of the present disclosure are described in detail with reference to the accompanying drawings. With respect to reference numerals to elements of each of the drawings, the same elements can be illustrated in other drawings, and like reference numerals can refer to like elements unless stated otherwise. The same or similar elements can be denoted by the same reference numerals even though they are depicted in different drawings.

In addition, for convenience of description, a scale, dimension, size, and thickness of each of the elements illustrated in the accompanying drawings can be different from an actual scale, dimension, size, and thickness, and thus, aspects of the present disclosure are not limited to a scale, dimension, size, and thickness illustrated in the drawings.

FIG. 1 illustrates a sound apparatus for vehicles according to an embodiment of the present disclosure. All components of each sound apparatus according to all embodiments of the present disclosure are operatively coupled and configured.

With reference to FIG. 1, a sound apparatus for vehicles according to an embodiment of the present disclosure can include a sound apparatus 30 or at least one or more sound apparatuses 30. The sound apparatus 30 can be disposed or equipped at an inner portion of a vehicle 10 to output a sound S toward an indoor space IS of the vehicle 10.

The vehicle 10 can include an interior material (or an interior finish material or an interior) 130. In the following description, for convenience of description, the "interior material 130" can be referred to as "a vehicle interior material 130".

The vehicle interior material 130 can include all elements configuring an inner portion of the vehicle 10, or can include all elements disposed at the indoor space IS of the vehicle 10. For example, the vehicle interior material 130 can be an interior member or an inner finish material of the vehicle 10, but embodiments of the present disclosure are not limited thereto.

The vehicle interior material 130 according to an embodiment of the present disclosure can be exposed at the inner portion or the indoor space IS of the vehicle 10 in the inner portion or the indoor space IS of the vehicle 10. For example, the vehicle interior material 130 can be configured to cover one surface (or an interior surface) of at least one or more of a main frame (or a vehicle body), a side frame (or a side body), a door frame (or a door body), a handle frame (or a steering hub), and a seat frame, which are exposed at the indoor space IS of the vehicle 10. For example, the vehicle interior material 130 can be configured to cover a vehicle structure including the main frame, the side frame, the door frame, the handle frame, and the seat frame, or the like, but embodiments of the present disclosure are not limited thereto. For example, the main frame can include a dash panel, a pillar panel, a roof panel, and a floor panel, but embodiments of the present disclosure are not limited thereto. For example, the door frame can include a door inner panel and a door outer panel, but embodiments of the present disclosure are not limited thereto.

The vehicle interior material 130 according to an embodiment of the present disclosure can include a dashboard, a pillar interior material (or a pillar trim), a floor interior material (or a floor carpet), a roof interior material (or a headliner), a door interior material (or a door trim), a handle interior material (or a steering cover), a seat interior material, a rear package interior material (or a back seat shelf), an overhead console (or an indoor illumination interior material), a rear view mirror, a glove box, and a sun visor, or the like, but embodiments of the present disclosure are not limited thereto.

The vehicle interior material 130 according to an embodiment of the present disclosure can include one or more materials of metal, wood, rubber, plastic, glass, fiber, cloth, paper, a mirror, leather, and carbon, but embodiments of the present disclosure are not limited thereto. The vehicle interior material 130 including a plastic material can be an injection material which is implemented by an injection process using a thermoplastic resin or a thermosetting resin, but embodiments of the present disclosure are not limited thereto. The vehicle interior material 130 including a fiber material can include at least one or more of a plastic composite fiber, a carbon fiber (or an aramid fiber), and a natural fiber, but embodiments of the present disclosure are not limited thereto. The vehicle interior material 130 including the fiber material can include a textile sheet, a knit sheet, or a nonwoven fabric, or the like, but embodiments of the present disclosure are not limited thereto. For example, the paper can be cone paper for speakers. For example, the cone paper can be pulp or foamed plastic, or the like, but embodiments of the present disclosure are not limited thereto.

The vehicle interior material 130 including a leather material can include natural leather or artificial leather, but embodiments of the present disclosure are not limited thereto.

The vehicle interior material 130 according to an embodiment of the present disclosure can include at least one or more of a flat portion (or flat surface portion) and a curved portion (or curved surface portion). For example, the vehicle interior material 130 can have a surface structure corresponding to a surface structure of a corresponding vehicle structure, or can have a surface structure which differs from a surface structure of a corresponding vehicle structure.

According to an embodiment of the present disclosure, the sound apparatus 30 can be disposed at the vehicle interior material 130. The sound apparatus 30 can vibrate the vehicle interior material 130 to generate a sound S based on a vibration of the vehicle interior material 130. For example, the sound apparatus 30 can directly vibrate the vehicle interior material 130 to generate the sound S based on a vibration of the vehicle interior material 130. For example, the sound apparatus 30 can be configured to vibrate the vehicle interior material 130 to output the sound S toward an inner portion or an indoor space IS of the vehicle 10. Thus, the sound apparatus 30 can use the vehicle interior material 130 as a sound vibration plate or an acoustic diaphragm. The vehicle interior material 130 can perform a function of a vibration plate, a sound vibration plate, or a sound generating plate for outputting the sound S. For example, the vehicle interior material 130 can have a size which is greater than the sound apparatus 30, but embodiments of the present disclosure are not limited thereto.

According to an embodiment of the present disclosure, the sound apparatus 30 can be disposed at at least one or more of a dashboard, a pillar interior material, a floor interior material, a roof interior material, a door interior material, a handle interior material, and a seat interior material, or can be disposed at one or more of a rear package interior material, an overhead console, a rear view mirror, a glove box, and a sun visor.

The sound apparatus for vehicles according to an embodiment of the present disclosure can vibrate a corresponding vehicle interior material 130 by at least one or more of at least one or more sound apparatuses 30 disposed at the vehicle interior material 130 to output a realistic sound S or stereo sound including a multichannel toward the indoor space IS of the vehicle 10, but embodiments of the present disclosure are not limited thereto.

Figure 2:
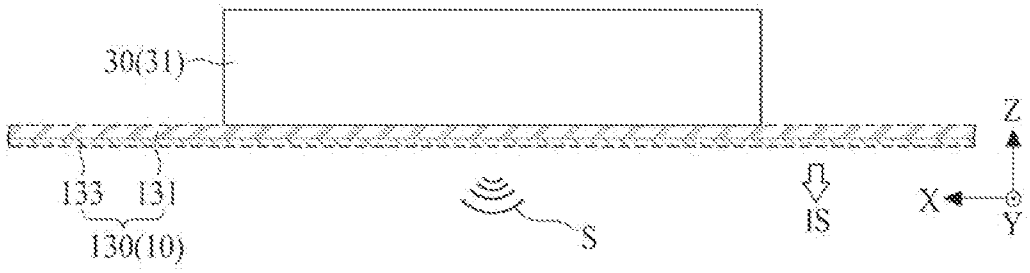
FIG. 2 illustrates a sound apparatus for vehicles according to another embodiment of the present disclosure.

FIG. 2 illustrates a sound apparatus for vehicles according to another embodiment of the present disclosure. FIG. 2 illustrates an embodiment implemented by modifying the vehicle interior material on which the sound apparatus described above with reference to FIG. 1 is disposed. Therefore, in the following description, repetitive descriptions of elements other than a vehicle interior material are omitted or will be briefly given.

With reference to FIG. 2, the sound apparatus 30 according to another embodiment of the present disclosure can include a sound generating device 31 which vibrates a vehicle interior material 130 including one or more materials of metal, wood, rubber, plastic, carbon, glass, fiber, cloth, paper, a mirror, and leather to output a sound S. But embodiments of the present disclosure are not limited thereto.

The vehicle interior material 130 according to another embodiment of the present disclosure can include a base member 131 and a surface member 133. For example, the base member 131 can be an injection material, a first interior material, an inner interior material, or a rear interior material, but embodiments of the present disclosure are not limited thereto. The surface member 133 can be a second interior material, an outer interior material, a front interior material, an outer surface member, a reinforcement member, or a decoration member, but embodiments of the present disclosure are not limited thereto.

The base member 131 can include a plastic material. The base member 131 according to an embodiment of the present disclosure can include an injection material. For example, the base member 131 can be an injection material which is implemented by an injection process using a thermoplastic resin or a thermosetting resin, but embodiments of the present disclosure are not limited thereto. The base member 131 can be configured to cover an inner portion of a vehicle 10. For example, the base member 131 can be configured to cover one surface (or an inner surface) of at least one or more of a main frame, a side frame, a door frame, and a handle frame, which are exposed at the indoor space IS of the vehicle 10.

The base member 131 can include one or more of a flat portion and a curved portion. For example, the base member 131 can have a surface structure corresponding to a surface structure of a corresponding vehicle structure, or can have a surface structure which differs from a surface structure of a corresponding vehicle structure.

The surface member 133 can be disposed on the base member 131. The surface member 133 can cover the base member 131 at the inner portion or the indoor space IS of the vehicle 10 and can be exposed at the inner portion or the indoor space IS of the vehicle 10. For example, the surface member 133 can be disposed at or coupled to a front surface (or an interior surface) of the base member 131 exposed at the indoor space IS of the vehicle 10.

The surface member 133 according to an embodiment of the present disclosure can include one or more materials of a fiber, leather, cloth, and wood, but embodiments of the present disclosure are not limited thereto. For example, the surface member 133 including a fiber material can include one or more of a synthetic fiber, a carbon fiber (or an aramid fiber), and a natural fiber, but embodiments of the present disclosure are not limited thereto. For example, the surface member 133 including the fiber material can be a textile sheet, a knit sheet, or a nonwoven fabric, but embodiments of the present disclosure are not limited thereto. For example, the surface member 133 including the fiber material can be a fabric member, but embodiments of the present disclosure are not limited thereto.

The synthetic fiber can be a thermoplastic resin and can include a polyolefin-based fiber which is an eco-friendly material which does not relatively release a harmful substance. For example, the polyolefin-based fiber can include a polyethylene fiber, a polypropylene fiber, or a polyethylene terephthalate fiber, but embodiments of the present disclosure are not limited thereto. The polyolefin-based fiber can be a fiber of a single resin or a fiber of a core-shell structure, but embodiments of the present disclosure are not limited thereto.

The natural fiber can be a composite fiber of one or two or more of a jute fiber, a kenaf fiber, an abaca fiber, a coconut fiber, and a wood fiber, but embodiments of the present disclosure are not limited thereto.

The sound apparatus 30 can be covered by the vehicle interior material 130. The sound apparatus 30 can be configured to vibrate the vehicle interior material 130 including the base member 131 and the surface member 133 to output a sound S toward the inner portion or the indoor space IS of the vehicle 10.

The sound apparatus 30 according to another embodiment of the present disclosure can output the sound S toward the indoor space IS of the vehicle 10 by using the vehicle interior material as a vibration plate or a sound vibration plate and can output a realistic sound S or stereo sound including a multichannel toward the indoor space IS of the vehicle 10.

According to another embodiment of the present disclosure, the sound apparatus 30 can be surrounded by an enclosure. A space can be provided between the sound apparatus 30 and the enclosure, and a sound (or a sound pressure level) can be output based on a vibration of the vehicle interior material 130 based on air between the sound apparatus 30 and the enclosure. However, there can be a problem where a sound of the low-pitched sound band is not output, and there can be a problem where the flatness of a sound pressure level is reduced because the number of peaks and dips occurring in a reproduction frequency band of a sound (or a sound pressure level) generated based on a vibration of the vehicle interior material 130 increases and each of a highest sound pressure level and a lowest sound pressure level occurring in a reproduction frequency band of a sound (or a sound pressure level) generated based on a vibration of the vehicle interior material 130 increases. The peak can be a phenomenon where a sound pressure level bounces in a specific frequency, and the dip can be a phenomenon where a low sound pressure level is generated as the occurrence of a sound having a specific frequency is reduced. The flatness of a sound characteristic can be a level of a deviation between a highest sound pressure and a lowest sound pressure.

The inventors of the present disclosure have performed extensive research and experiments for implementing a sound apparatus and a vehicular apparatus including the same, in which a sound characteristic of the low-pitched sound band can be improved and the flatness of a sound pressure level can be enhanced. Based on the extensive research and experiments, the inventors of the present disclosure have invented a sound apparatus and a vehicular apparatus including the same, which can output a sound including a high-pitched sound band and the low-pitched sound band and can enhance the flatness of a sound pressure level. This will be described below in detail.

Figure 3:
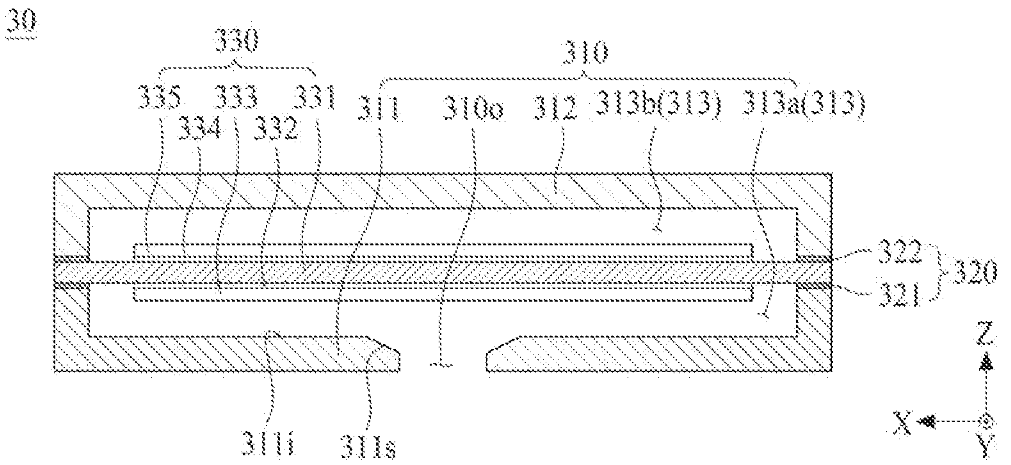
FIG. 3 illustrates a sound apparatus according to an embodiment of the present disclosure.
Figure 4:
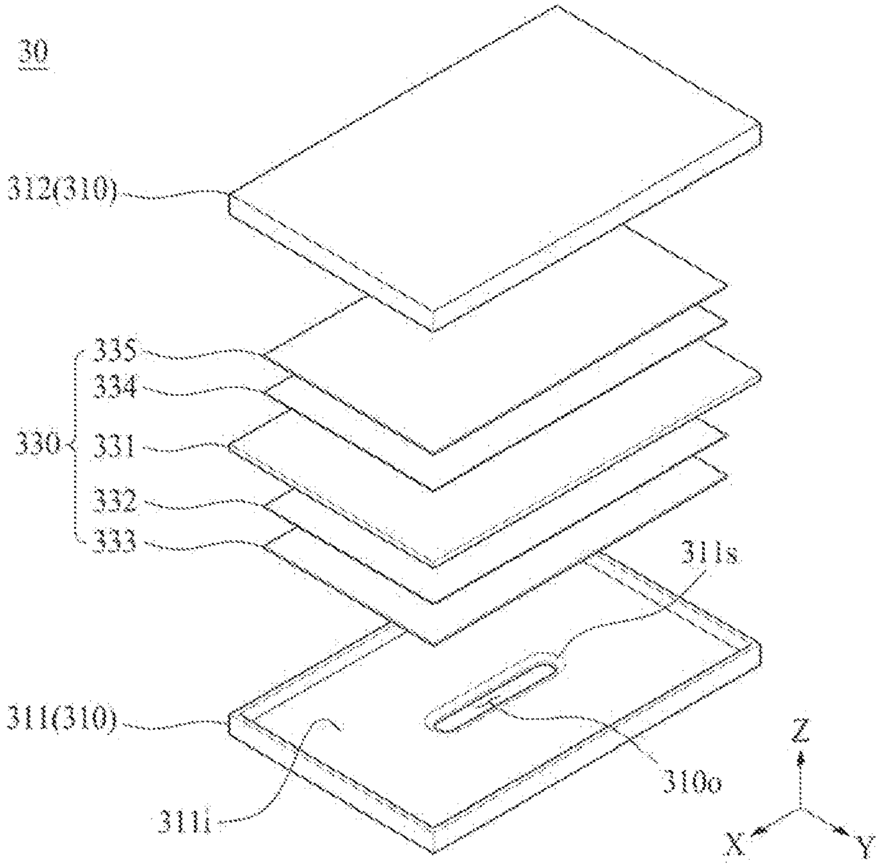
FIG. 4 is an exploded perspective view of FIG. 3 according to an embodiment of the present disclosure.

FIG. 3 illustrates a sound apparatus according to an embodiment of the present disclosure. FIG. 4 is an exploded perspective view of FIG. 3 according to an embodiment of the present disclosure.

With reference to FIGS. 3 and 4, the sound apparatus 30 according to an embodiment of the present disclosure can include an enclosure 310 and a sound generating module 330.

The sound generating module 330 according to an embodiment of the present disclosure can include a vibration member 331 and a vibration apparatus.

The vibration apparatus according to an embodiment of the present disclosure can be configured to vibrate the vibration member 331. For example, the vibration apparatus can be disposed or configured at the vibration member 331. The vibration apparatus can vibrate (or displace or drive) a driving signal (or a vibration driving signal or a voice signal) applied thereto to vibrate (or displace or drive) the vibration member 331. The vibration apparatus can be disposed with the vibration member 331 therebetween. The vibration apparatus can include one or more vibration apparatuses. For example, one or more vibration apparatuses can be configured at the vibration member 331.

The vibration apparatus according to an embodiment of the present disclosure can include a first vibration apparatus 333 and a second vibration apparatus 335. The first vibration apparatus 333 and the second vibration apparatus 335 can be configured at the vibration member 331. The vibration member 331 can generate a vibration or can output a sound (or a sound wave), based on the displacements (or driving) of the first vibration apparatus 333 and the second vibration apparatus 335. For example, the vibration member 331 can be a plate, a vibration plate, a vibration object, a vibration panel, a sound plate, a sound panel, a passive vibration plate, a passive vibration member, a passive vibration panel, a sound output plate, or a sound vibration plate, but embodiments of the present disclosure are not limited thereto. For example, the vibration member 331 can include a metal material, or can include a single nonmetal material or a composite nonmetal material of one or more of wood, rubber, plastic, carbon, glass, fiber, cloth, paper, mirror, and leather, but embodiments of the present disclosure are not limited thereto. For example, the paper can be cone paper for speakers. For example, the cone paper can be pulp or foamed plastic, or the like, but embodiments of the present disclosure are not limited thereto.

According to an embodiment of the present disclosure, the metal material of the vibration member 331 can include any one or more materials of stainless steel, aluminum (Al), an Al alloy, a magnesium (Mg), a Mg alloy, and a magnesium-lithium (Mg—Li) alloy, but embodiments of the present disclosure are not limited thereto. For example, the vibration member 331 can be configured in a metal material such as aluminum (Al) material, or configured in a plastic material such as plastic or styrene material, but embodiments of the present disclosure are not limited thereto. For example, the styrene material can be an ABS material. The ABS material can be acrylonitrile, butadiene, or styrene. For example, the vibration member 331 can be carbon fiber reinforced plastic (CFRP), polypropylene, or polycarbonate, or the like, but embodiments of the present disclosure are not limited thereto.

The vibration member 331 can include a first surface and a second surface different from (or opposite to) the first surface. The first vibration apparatus 333 can be disposed at the first surface (or a rear surface) of the vibration member 331. The second vibration apparatus 335 can be disposed at the second surface (or a front surface) of the vibration member 331.

The first vibration apparatus 333 and the second vibration apparatus 335 can be disposed with the vibration member 331 therebetween. The first vibration apparatus 333 and the second vibration apparatus 335 can vibrate (or displace or drive) based on driving signals (or a vibration driving signal or a voice signal) applied thereto to vibrate (or displace or drive) the vibration member 331. For example, the driving signals (or the vibration driving signal or the voice signal) applied to the first vibration apparatus 333 and the second vibration apparatus 335 can be the same or different. For example, the driving signals applied to the first vibration apparatus 333 and the second vibration apparatus 335 can have the same phase or different phases. For example, the first vibration apparatus 333 and the second vibration apparatus 335 can have a bimorph structure where the first and second vibration apparatuses 333 and 335 are disposed with the vibration member 331 therebetween. Each of the first vibration apparatus 333 and the second vibration apparatus 335 can independently vibrate the vibration member 331, and thus, an influence thereof on a sound characteristic based on a material and a characteristic of the vibration member 331 can be reduced. Accordingly, a sound characteristic and/or a sound pressure level characteristic of the sound apparatus 30 can be enhanced.

According to another embodiment of the present disclosure, the first vibration apparatus 333 and the second vibration apparatus 335 can be configured at any one of the first surface or the second surface of the vibration member 331. For example, the first vibration apparatus 333 can be configured at any one of the first surface or the second surface of the vibration member 331. For example, the second vibration apparatus 335 can be connected to the first vibration apparatus 333. For example, the second vibration apparatus 335 can be stacked on the first vibration apparatus 333.

The sound apparatus 30 according to an embodiment of the present disclosure can further include an adhesive member. The adhesive member can include a first adhesive member 332 and a second adhesive member 334.

According to an embodiment of the present disclosure, the first adhesive member 332 can be disposed between the vibration member 331 and the first vibration apparatus 333. The first vibration apparatus 333 can be connected or coupled to the vibration member 331 by the first adhesive member 332. For example, the first vibration apparatus 333 can be connected or coupled to the first surface of the vibration member 331 by the first adhesive member 332.

According to an embodiment of the present disclosure, the second adhesive member 334 can be disposed between the vibration member 331 and the second vibration apparatus 335. The second vibration apparatus 335 can be connected or coupled to the vibration member 331 by the second adhesive member 334. For example, the second vibration apparatus 335 can be connected or coupled to the second surface of the vibration member 331 by the second adhesive member 334.

The first adhesive member 332 and the second adhesive member 334 can include an adhesive layer (or a tacky layer) which is good in adhesive force or attaching force. For example, the first adhesive member 332 and the second adhesive member 334 can include a same or different adhesive layers (or tacky layers). For example, the first adhesive member 332 and the second adhesive member 334 can include an adhesive, a double-sided adhesive, a double-sided tape, a double-sided adhesive tape, a double-sided adhesive foam tape, a double-sided foam pad, a double-sided adhesive foam pad, a double-sided cushion tape, or a tacky sheet, but embodiments of the present disclosure are not limited thereto.

According to an embodiment of the present disclosure, the enclosure 310 can include at least one or more enclosures. The at least one or more enclosures can include a first enclosure 311 and a second enclosure 312. For example, the second enclosure 312 can be connected to the first enclosure 311. For example, the enclosure 310 can be a housing, a case, an outer case, a case member, a housing member, a cabinet, a sealing member, a sealing cap, a sealing box, a sound box, or the like, but embodiments of the present disclosure are not limited thereto. The enclosure 310 according to an embodiment of the present disclosure can include one or more of a metal material and a nonmetal material (or a composite nonmetal material), but embodiments of the present disclosure are not limited thereto. For example, the enclosure 310 can include one or more materials of a metal material, plastic, and wood, but embodiments of the present disclosure are not limited thereto. For example, the enclosure 310 can be configured in a metal material such as aluminum (Al) material, or configured in a plastic material such as plastic or styrene material, but embodiments of the present disclosure are not limited thereto. For example, the styrene material can be an ABS material. The ABS material can be acrylonitrile, butadiene, or styrene.

The enclosure 310 can include an internal space 313. The internal space 313 can be between the first enclosure 311 and the second enclosure 312. For example, the sound generating module 330 can be configured at the internal space 313 of the enclosure 310. For example, the sound generating module 330 can be configured at the internal space 313 between the first enclosure 311 and the second enclosure 312. The vibration apparatus of the sound generating module 330 can be at the internal space 313 of the enclosure 310. For example, the first vibration apparatus 333 and the second vibration apparatus 335 of the vibration apparatus can be at the internal space 313 of the enclosure 310. The first vibration apparatus 333 and the second vibration apparatus 335 can be at different spaces in the internal space 313 of the enclosure 310. For example, the first vibration apparatus 333 can be at a first space 313*a*. For example, the first vibration apparatus 333 can be between the first enclosure 311 and the vibration member 331. For example, the second vibration apparatus 335 can be at a second space 313*b*. For example, the second vibration apparatus 335 can be between the second enclosure 312 and the vibration member 331. For example, the internal space 313 can be an accommodation space, a receiving space, a gap space, an air space, a vibration space, a sound space, a sound box, or a sealing space, or the like, but embodiments of the present disclosure are not limited thereto.

According to an embodiment of the present disclosure, the internal space 313 of the enclosure 310 can include the first space 313*a* and the second space 313*b*. For example, the first space 313*a* can be between a first surface of the sound generating module 330 and the first enclosure 311. The first space 313*a* can be between the first vibration apparatus 333 and the first enclosure 311. For example, the second space 313*b* can be between a second surface which is different from (or opposite to) the first surface of the sound generating module 330 and the second enclosure 312. The second space 313*b* can be between the second vibration apparatus 335 and the second enclosure 312. For example, the second space 313*b* can be a gap space, an air space, a vibration space, a sound space, a sound box, or a sealing space, or the like, but embodiments of the present disclosure are not limited thereto.

The first enclosure 311 can include an opening portion 310*o*. The opening portion 310*o* can be configured to pass through the first enclosure 311 in a thickness direction Z (or a vertical direction) of the enclosure 310. The opening portion 310*o* can be connected to (or communicate with) the internal space 313. For example, the opening portion 310*o* can be configured to decrease an air pressure of the internal space 313 of the enclosure 310. For example, the opening portion 310*o* can be connected to (or communicate with) the first space 313*a*. The opening portion 310*o* can be configured to decrease an air pressure of the first space 313*a* of the first enclosure 311 or an air pressure of the first space 313*a* provided between the vibration member 331 and the first enclosure 311. Therefore, a band of the low-pitched sound band can extend, and thus, a sound characteristic of the low-pitched sound band can be improved. Because a pressure (or air pressure) of the first space 313*a* is reduced by the opening portion 310*o*, the amount of displacement (or a bending force) of the first vibration apparatus 333 disposed between the vibration member 331 and the first enclosure 311 can increase, and thus, a band of the low-pitched sound band can extend, thereby enhancing a sound characteristic and/or a sound pressure level characteristic of the low-pitched sound band. Accordingly, a sound characteristic (or a sound pressure level) of the low-pitched sound band generated based on a vibration of the first vibration apparatus 333 and/or the second vibration apparatus 335 can be improved.

According to an embodiment of the present disclosure, the opening portion 310*o* can have a size which is smaller than the first vibration apparatus 333. For example, the opening portion 310*o* can include or have a size which is smaller than the first vibration apparatus 333 disposed at the vibration member 331. For example, the opening portion 310*o* can include a line shape having a size (or a length) which is smaller than the first vibration apparatus 333 disposed at the vibration member 331. For example, the opening portion 310*o* can be a hole, a slot, or a slit, but embodiments of the present disclosure are not limited thereto. For example, the opening portion 310*o* can be a sound discharge portion, a first sound discharge port, a sound output portion, a sound output port, a sound output hole, or a vent hole, but embodiments of the present disclosure are not limited thereto.

The opening portion 310*o* can be a space where a sound wave generated based on a vibration of the sound generating module 330 is propagated (or transferred) to an indoor space of a vehicle. Accordingly, a vibration width (or a displacement width) of the vibration member 331 based on a vibration of the sound generating module 330 can increase, and thus, a sound characteristic and/or a sound pressure level characteristic generated based on a vibration of the vibration member 331 can be enhanced.

The first enclosure 311 including the opening portion 310*o* can be disposed closer to the vehicle interior material than the second enclosure 312. For example, the first enclosure 311 including the opening portion 310*o* can be disposed closer to the vehicle interior material than the second enclosure 312. Accordingly, a sound generated based on vibrations of one or more of the first vibration apparatus 333 and the second vibration apparatus 335 can be output to the indoor space of the vehicle, and thus, a sound including the low-pitched sound band can be output to the indoor space of the vehicle.

The first enclosure 311 can include a slope surface (or an inclined surface) 311*s* and an inner lateral surface 311*i*. The slope surface 311*s* can be configured to be inclined between the opening portion 310*o* and the inner lateral surface 311*i* of the first enclosure 311. The slope surface 311*s* can be configured to guide a sound, generated based on a vibration of the sound generating module 330, to the indoor space of the vehicle. Accordingly, a sound generated based on a vibration of the sound generating module 330 can be output to the indoor space of the vehicle, and a sound characteristic and/or a sound pressure level characteristic of a sound including the low-pitched sound band can be more enhanced. For example, the slope surface 311*s* can be a guide surface or a sound guide surface, but embodiments of the present disclosure are not limited thereto.

The vibration member 331 can be configured to be spaced apart from the opening portion 310*o*. The vibration member 331 can be configured at the internal space 313 to be spaced apart from the opening portion 310*o*. For example, the vibration member 331 can be disposed at the internal space 313 and can be configured between the first enclosure 311 and the second enclosure 312. For example, the vibration member 331 can be disposed at the internal space 313 and can be supported by the first enclosure 311 and the second enclosure 312.

The sound apparatus 30 according to an embodiment of the present disclosure can further include a coupling member 320. The coupling member 320 can include a first coupling member 321 and a second coupling member 322.

According to an embodiment of the present disclosure, the first enclosure 311 can be disposed or configured at the first surface (or rear surface) of the vibration member 331. The first enclosure 311 can be configured to support a periphery portion (or an edge portion) of the first surface of the vibration member 331. For example, the first enclosure 311 can be configured to support both periphery portions (or both edge portions) of the first surface of the vibration member 331. The first enclosure 311 can be configured to cover a first surface of the sound generating module 330. For example, the first enclosure 311 can be configured to surround the first surface of the sound generating module 330.

The first coupling member 321 can be between the vibration member 331 and the first enclosure 311. The first coupling member 321 can be between a periphery portion of the vibration member 331 and a periphery portion of the first enclosure 311. For example, the first coupling member 321 can be between both periphery portions of the vibration member 331 and both periphery portions of the first enclosure 311. The periphery portion of the first enclosure 311 can be connected to or coupled to the first surface of the vibration member 331 by the first coupling member 321. For example, the periphery portion of the first enclosure 311 can be connected to or coupled to a periphery portion of the first surface of the vibration member 331 by the first coupling member 321. For example, both periphery portions of the first enclosure 311 can be connected to or coupled to both periphery portions of the first surface of the vibration member 331 by the first coupling member 321.

According to an embodiment of the present disclosure, the second enclosure 312 can be disposed or configured at the second surface (or front surface) which is different from (or opposite to) the first surface of the vibration member 331. The second enclosure 312 can be configured to support a periphery portion of the second surface of the vibration member 331. For example, the second enclosure 312 can be configured to support both periphery portions of the second surface of the vibration member 331. The second enclosure 312 can be configured to cover a second surface of the sound generating module 330. For example, the second enclosure 312 can be configured to surround the second surface of the sound generating module 330.

The second coupling member 322 can be between the vibration member 331 and the second enclosure 312. The second coupling member 322 can be between a periphery portion of the vibration member 331 and a periphery portion of the second enclosure 312. For example, the second coupling member 322 can be between both periphery portions of the vibration member 331 and both periphery portions of the second enclosure 312. The periphery portion of the second enclosure 312 can be connected to or coupled to the second surface of the vibration member 331 by the second coupling member 322. For example, the periphery portion of the second enclosure 312 can be connected to or coupled to a periphery portion of the second surface of the vibration member 331 by the second coupling member 322. For example, both periphery portions of the second enclosure 312 can be connected to or coupled to both periphery portions of the second surface of the vibration member 331 by the second coupling member 322.

According to an embodiment of the present disclosure, the coupling member 320 can be configured to minimize or prevent the transfer of a vibration of the vibration member 331 to the enclosure 310. The coupling member 320 can include a material characteristic suitable for blocking a vibration. For example, the coupling member 320 can include a material having elasticity. For example, the coupling member 320 can include a material having elasticity for vibration absorption (or impact absorption). The coupling member 320 according to an embodiment of the present disclosure can be configured as (or comprise) polyurethane materials and/or polyolefin materials, but embodiments of the present disclosure are not limited thereto. For example, the coupling member 320 can include one or more of an adhesive, a double-sided adhesive, a double-sided tape, a double-sided adhesive tape, a double-sided foam tape, a double-sided adhesive foam tape, a double-sided foam pad, a double-sided adhesive foam pad, and a double-sided cushion tape, but embodiments of the present disclosure are not limited thereto.

The coupling member 320 according to another embodiment of the present disclosure can be configured to minimize or prevent the transfer of a vibration of the vibration member 331 to the enclosure 310 and to decrease the reflection of an incident sound wave which is generated based on a vibration of the vibration member 331.

The sound apparatus 30 according to an embodiment of the present disclosure can include the sound generating module 330 having the bimorph structure, and thus, a sound characteristic and/or a sound pressure level characteristic of a sound including the low-pitched sound band can be enhanced. Because the sound apparatus 30 according to an embodiment of the present disclosure includes the enclosure 310 including the opening portion 310*o*, an air pressure of the internal space 313 of the enclosure 310 can be reduced, and thus, a band of the low-pitched sound band can extend, thereby improving a sound characteristic and/or a sound pressure level characteristic of the low-pitched sound band.

In various embodiments of the present disclosure, a plurality of sound apparatuses 30 can be provided and arranged in various configurations. For example, two or more of the sound apparatuses can be stacked one on the other, or can be arranged side-by-side. When stacked, a hole of one sound generating module 330 can be aligned with a hole of another sound generating module 330.

Additionally, each of the enclosure 310 can include a plurality of sound generating modules 330. For example, two or more sound generating modules 330 can be provided in each enclosure 310 and can be stacked one on the other with a spacer therebetween. On the other hand, the two or more sound generating modules 330 can be arranged side by side. When side by side, each sound generating module 330 can share a common vibration member 331 or each sound generating module 330 can include a vibration member individually.

In various embodiments of the present disclosure, the first enclosure 311 and the second enclosure 312 can be formed or include the same material or different materials. But embodiments of the present disclosure are not limited thereto.

Figure 5:
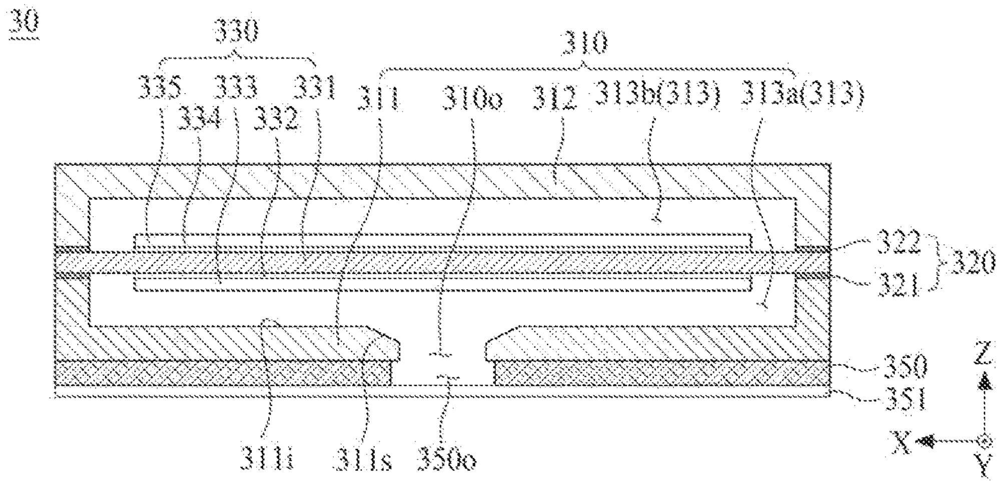
FIG. 5 illustrates a sound apparatus according to another embodiment of the present disclosure.

FIG. 5 illustrates a sound apparatus according to another embodiment of the present disclosure.

With reference to FIG. 5, a sound apparatus 30 according to another embodiment of the present disclosure can include an enclosure 310, a sound generating module 330, and a coupling member 320. Descriptions of the enclosure 310, the sound generating module 330, and the coupling member 320 can be substantially a same as the descriptions of FIGS. 3 and 4, and thus, like reference numerals refer to like elements and repeated descriptions are omitted.

The sound apparatus 30 according to another embodiment of the present disclosure can further include a connection member 350.

The connection member 350 can be configured at the enclosure 310. The connection member 350 can be disposed at a rear surface of the enclosure 310. For example, the connection member 350 can be disposed at a rear surface of a first enclosure 311. For example, the connection member 350 can be connected to the first enclosure 311. The connection member 350 can be disposed between the enclosure 310 and a vehicle interior material (or a mount object). For example, the connection member 350 can be disposed between the first enclosure 311 and the vehicle interior material (or the mount object). For example, the mount object can be a structure material with the sound apparatus 30 or the enclosure 310 mounted thereon.

According to another embodiment of the present disclosure, the first enclosure 311 can include an inner surface and an outer surface. The inner surface of the first enclosure 311 can face a vibration member 331. The outer surface of the first enclosure 311 can be a surface which is opposite to the inner surface of the first enclosure 311. The connection member 350 can be connected to a periphery of an opening portion 310*o* in the outer surface of the first enclosure 311.

According to another embodiment of the present disclosure, the connection member 350 can be configured as a stiff material (or a hard material). The connection member 350 can have high elasticity (or a young's modulus) and can include a material which is high in tensile strength. For example, the connection member 350 can include rubber, but embodiments of the present disclosure are not limited thereto. For example, the rubber can be ethylene propylene rubber or urethane rubber, but embodiments of the present disclosure are not limited thereto. For example, the ethylene propylene rubber can be ethylene propylene diene monomer (EPDM), but embodiments of the present disclosure are not limited thereto. For example, a hardness of the EPDM can be 40 to 90, but embodiments of the present disclosure are not limited thereto. For example, a tensile strength of the EPDM can be 50 $kg/cm^2$ to 200 $kg/cm^2$, but embodiments of the present disclosure are not limited thereto.

According to an embodiment of the present disclosure, the connection member 350 can further include a hole 350*o* (or a first hole). For example, the connection member 350 can further include a hole 350*o* which is connected to the opening portion 310*o* in the enclosure 310 or the first enclosure 311. The hole 350*o* can be disposed to correspond to (or overlap) the opening portion 310*o*. Accordingly, a sound based on a vibration of the sound generating module 330 can be output to an indoor space of a vehicle through the opening portion 310*o* and the hole 350*o*. The hole 350*o* can have a same shape as the opening portion 310*o*, but embodiments of the present disclosure are not limited thereto. For example, the hole 350*o* can be an opening portion, a slit, a slot, a connection hole, or an intermediate hole, but embodiments of the present disclosure are not limited thereto According to an embodiment of the present disclosure, the connection member 350 can be protected by a release film (or a protection film) 351. The release film 351 can be attached to an adhesive surface of the connection member 350. In a case where the sound apparatus 30 including the connection member 350 is mounted on the vehicle interior material (or the mount object), the release film 351 can be released (or removed) from the connection member 350.

The connection member 350 according to an embodiment of the present disclosure can prevent an undesired vibration of the sound generating module 330 from being transferred to the indoor space of the vehicle, and thus, can improve a sound characteristic and/or a sound pressure level characteristic of the sound apparatus 30. In addition, the connection member 350 can decrease heat which occurs when the sound generating module 330 is vibrating.

Figure 6:
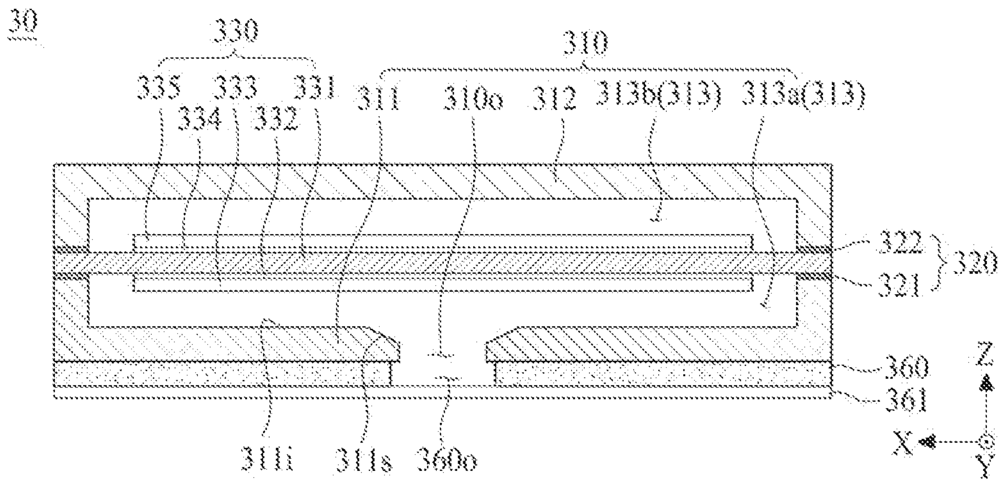
FIG. 6 illustrates a sound apparatus according to another embodiment of the present disclosure.

FIG. 6 illustrates a sound apparatus according to another embodiment of the present disclosure.

With reference to FIG. 6, a sound apparatus 30 according to another embodiment of the present disclosure can include an enclosure 310, a sound generating module 330, and a coupling member 320. Descriptions of the enclosure 310, the sound generating module 330, and the coupling member 320 can be substantially a same as the descriptions of FIGS. 3 and 4, and thus, like reference numerals refer to like elements and repeated descriptions are omitted.

The sound apparatus 30 according to another embodiment of the present disclosure can further include a soft member 360.

The soft member 360 can be configured at the enclosure 310. The soft member 360 can be disposed at a rear surface of the enclosure 310. For example, the soft member 360 can be disposed at a rear surface of a first enclosure 311. For example, the soft member 360 can be connected to the first enclosure 311. The soft member 360 can be disposed between the enclosure 310 and a vehicle interior material (or a mount object). For example, the soft member 360 can be disposed between the first enclosure 311 and the vehicle interior material (or the mount object).

According to an embodiment of the present disclosure, the first enclosure 311 can include an inner surface and an outer surface. The inner surface of the first enclosure 311 can face a vibration member 331. The outer surface can be a surface which is opposite to the inner surface. The soft member 360 can be connected to a periphery of an opening portion 310*o* in the outer surface of the first enclosure 311.

According to an embodiment of the present disclosure, the soft member 360 can be configured as a material which differs from a connection member 350. The soft member 360 can be configured as a material having elasticity (or a young's modulus) which differs from an elasticity (or a young's modulus) of the connection member 350. For example, the soft member 360 can be configured as a material having low elasticity. The soft member 360 can be configured as a soft material. For example, the soft member 360 can be ethylene propylene rubber or urethane rubber, but embodiments of the present disclosure are not limited thereto. For example, the ethylene propylene rubber can be ethylene propylene diene monomer (EPDM), and as a foaming rate is changed in EPDM, the ethylene propylene rubber can be configured as EPDM having low elasticity, but embodiments of the present disclosure are not limited thereto. For example, the soft member 360 can include a single-sided tape, a single-sided sponge tape, a single-sided porous tape, a single-sided cushion tape, a double-sided tape, a double-sided sponge tape, a double-sided porous tape, or a double-sided cushion tape, or the like, but embodiments of the present disclosure are not limited thereto.

According to an embodiment of the present disclosure, the soft member 360 can further include a hole 360*o* (or a second hole). For example, the soft member 360 can further include a hole 360*o* which is connected to the opening portion 310*o* in the sound generating module 330. The hole 360*o* can be disposed to correspond to (or overlap) the opening portion 310*o*. Accordingly, a sound based on a vibration of the sound generating module 330 can be output to an indoor space of a vehicle through the opening portion 310*o* and the hole 360*o*. The hole 360*o* can have a same shape as the opening portion 310*o*, but embodiments of the present disclosure are not limited thereto. For example, the hole 360*o* can be an opening portion, a slit, a slot, a connection hole, or an intermediate hole, but embodiments of the present disclosure are not limited thereto. The soft member 360 according to an embodiment of the present disclosure can absorb an external impact, and thus, can protect the sound apparatus 30 from the external impact. For example, the soft member 360 can be a porous member, a buffer member, or a protection member, or the like, but embodiments of the present disclosure are not limited thereto.

In various embodiments of the present disclosure, holes in elements can vary in size or can be the same. For example, the hole 310*o* of the first enclosure 311 can be of a same or a similar size as the hole 360*o* of the soft member 360, but embodiments of the present disclosure are not limited thereto. For example, the hole 310*o* can be different in size from that of the hole 360*o*. In various embodiments of the present disclosure, the hole 360*o* of the soft member 360 can be greater or larger than the hole 310*o* of the first enclosure. When greater, the hole 360*o* can allow sound to be better emitted from the enclosure 310, but when smaller, the hole 360*o* can modulate the among of sound that is emitted. In various embodiments of the present disclosure, at least one of the sizes of the holes 310*o* and 360*o* can vary at will to increase or decrease in size in real time, such as by use of a cover that can close or open, or vary the size of each of the holes 310*o* and 360*o* to modulate the sound being emitted from the enclosure 310. Also, the holes 310*o* and 360*o* need not be aligned or overlapping but can be partially overlapping or can be offset from each other. When offset from each other, there can be a communication hole that extends from the hole 310*o* to the hole 360*o* to enable sound to be emitted from the enclosure 310.

In various embodiments of the present disclosure, a shape of the hole 310*o* and a shape of the hole 360*o* can correspond as discussed below, but embodiments of the present disclosure are not limited thereto. For example, the shapes of the holes 310*o* and 360*o* can be different from each other in various embodiments. Also, the shapes of the holes 310*o* and 360*o* can vary in real time by use of a cover such as an iris diaphragm or a rotating diaphragm.

According to an embodiment of the present disclosure, the soft member 360 can be protected by a release film (or a protection film) 361. The release film 361 can be attached to an adhesive surface of the soft member 360. In a case where the sound apparatus 30 including the soft member 360 is mounted on the vehicle interior material (or the mount object), the release film 361 can be released (or removed) from the soft member 360.

The soft member 360 can absorb an external impact, and thus, can prevent the damage of the sound generating module 330. Accordingly, the durability and reliability of the sound apparatus 30 can be enhanced.

According to another embodiment of the present disclosure, the soft member 360 can be configured at the enclosure 310 instead of the connection member 350 described above with reference to FIG. 5, or can be stacked on the connection member 350. For example, the connection member 350 and the soft member 360 can be disposed between the first enclosure 311 and the vehicle interior material (or the mount object). For example, the connection member 350 can be connected to the first enclosure 311, and the soft member 360 can be disposed between the connection member 350 and the vehicle interior material (or the mount object).

Figure 7:
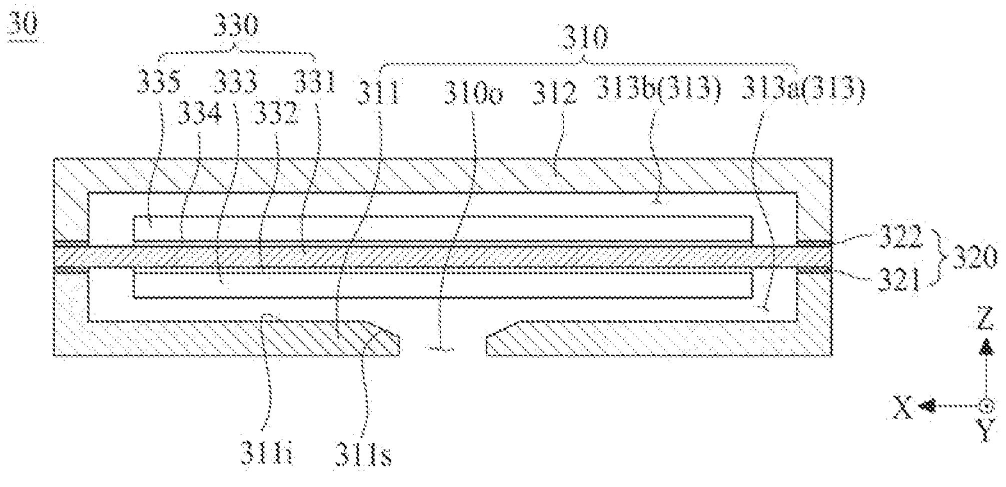
FIG. 7 illustrates a sound apparatus according to another embodiment of the present disclosure.

FIG. 7 illustrates a sound apparatus according to another embodiment of the present disclosure.

With reference to FIG. 7, a sound apparatus 30 according to another embodiment of the present disclosure can include an enclosure 310, a sound generating module 330, and a coupling member 320. Descriptions of the enclosure 310, the sound generating module 330, and the coupling member 320 can be substantially a same as the descriptions of FIGS. 3 and 4, and thus, like reference numerals refer to like elements and repeated descriptions are omitted.

The sound apparatus 30 according to another embodiment of the present disclosure can include vibration apparatuses 333 and 335 each including one or more vibration generators. For example, the vibration apparatuses 333 and 335 can include one or more vibration generators.

A first vibration apparatus 333 of the vibration apparatuses 333 and 335 can include one or more vibration generators. The first vibration apparatus 333 can include a first vibration generator and a second vibration generator. For example, the first vibration generator can be stacked on the second vibration generator.

A second vibration apparatus 335 of the vibration apparatuses 333 and 335 can include one or more vibration generators. The second vibration apparatus 335 can include a first vibration generator and a second vibration generator. For example, the first vibration generator can be stacked on the second vibration generator. The vibration apparatuses 333 and 335 each including the one or more vibration generators will be described below with reference to FIG. 30.

According to another embodiment of the present disclosure, the vibration apparatuses 333 and 335 each including the one or more vibration generators can be configured at a first surface or a second surface of a vibration member 331. For example, one of the first and second vibration apparatuses 333 and 335 each including the one or more vibration generators can be configured at only the first surface of the vibration member 331. For example, one of the first and second vibration apparatuses 333 and 335 each including the one or more vibration generators can be configured at a first space 313*a*. For example, the first vibration apparatus 333 including the one or more vibration generators can be configured at the first surface of the vibration member 331, and the second vibration apparatus 335 including the one or more vibration generators can be omitted.

According to another embodiment of the present disclosure, one of the first and second vibration apparatuses 333 and 335 each including the one or more vibration generators can be configured at only the second surface of the vibration member 331. For example, one of the first and second vibration apparatuses 333 and 335 each including the one or more vibration generators can be configured at a second space 313*b*. For example, the second vibration apparatus 335 including the one or more vibration generators can be configured at the second surface of the vibration member 331, and the first vibration apparatus 333 including the one or more vibration generators can be omitted.

The vibration apparatuses 333 and 335 according to another embodiment of the present disclosure can each include the one or more vibration generators which are stacked (or overlap or overlay) to vibrate in a same direction, and thus, the amount of displacement or an amplitude displacement can be maximized or increase, thereby maximizing or increasing the amount of displacement (or a bending force or a driving force) or an amplitude displacement of the vibration member 331.

Figure 8:
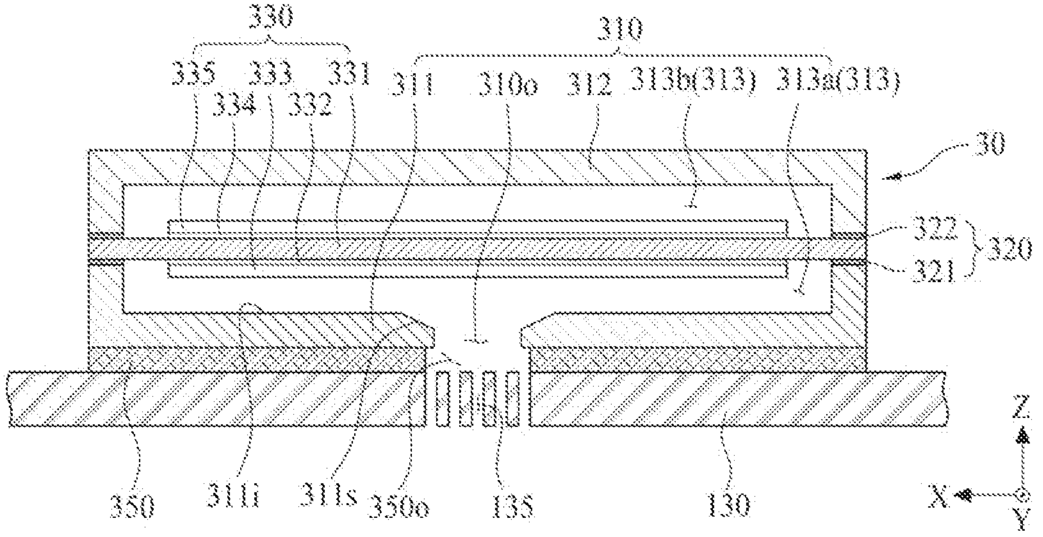
FIG. 8 illustrates a sound apparatus according to another embodiment of the present disclosure.
Figure 9:
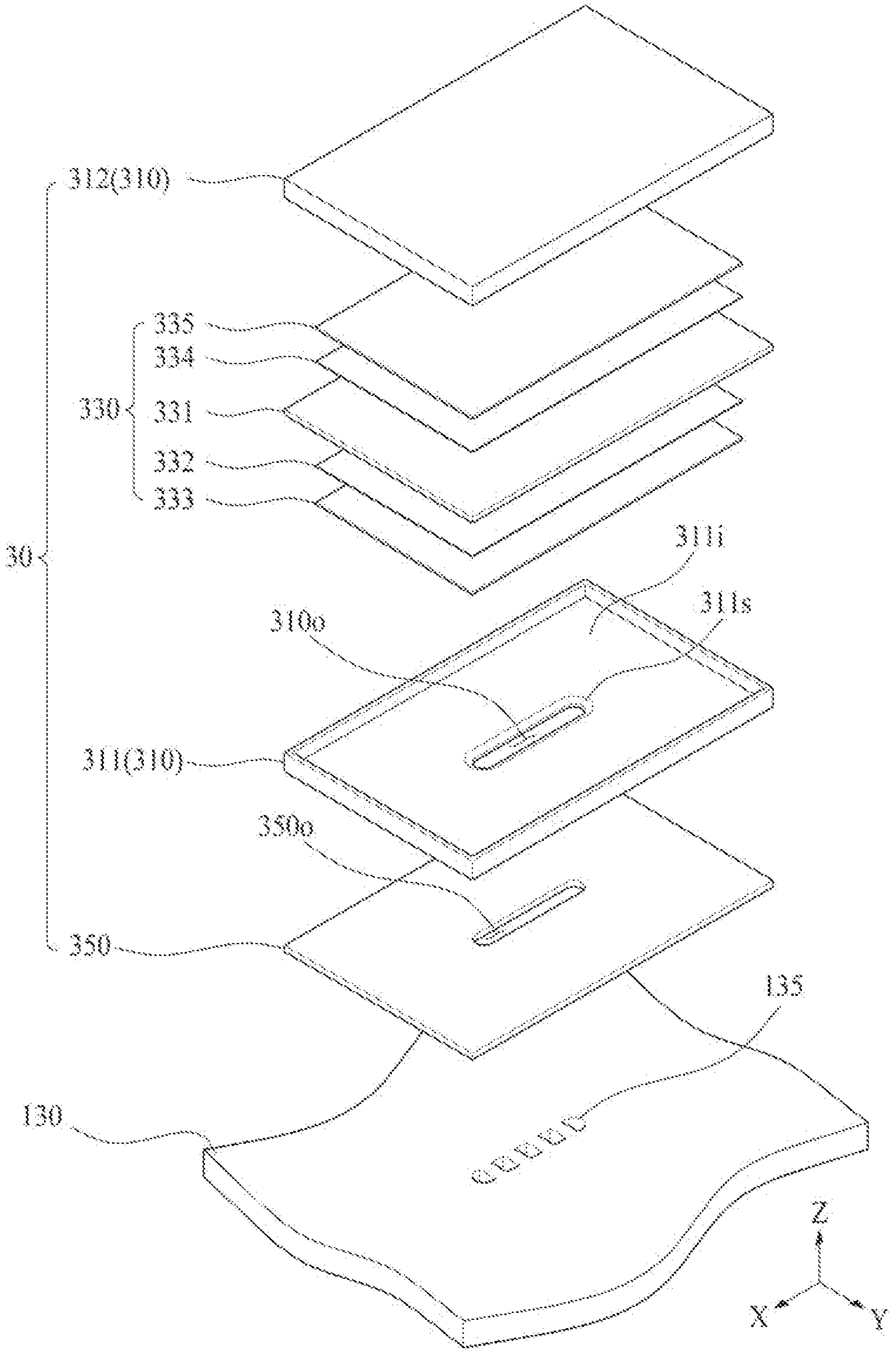
FIG. 9 is an exploded perspective view of FIG. 8 according to another embodiment of the present disclosure.

FIG. 8 illustrates a sound apparatus according to another embodiment of the present disclosure. FIG. 9 is an exploded perspective view of FIG. 8 according to another embodiment of the present disclosure.

With reference to FIGS. 8 and 9, a sound apparatus 30 according to another embodiment of the present disclosure can include an enclosure 310, a sound generating module 330, and a coupling member 320. Descriptions of the enclosure 310, the sound generating module 330, and the coupling member 320 can be substantially a same as the descriptions of FIGS. 3 to 5, and thus, like reference numerals refer to like elements and repeated descriptions are omitted.

The sound apparatus 30 according to another embodiment of the present disclosure can further include a connection member 350. A description of the connection member 350 can be substantially a same as the description of FIG. 5, and thus, repeated descriptions are omitted or will be briefly given below.

The connection member 350 according to another embodiment of the present disclosure can be disposed at a rear surface of the enclosure 310. The vehicle interior material 130 can be connected or coupled to the enclosure 310 by a connection member 350. For example, the connection member 350 can be disposed at a rear surface of the first enclosure 311. For example, the connection member 350 can be connected or coupled to the rear surface of the first enclosure 311. The connection member 350 can be disposed between the enclosure 310 and the vehicle interior material 130. For example, the connection member 350 can be disposed between the first enclosure 311 and the vehicle interior material 130.

According to an embodiment of the present disclosure, the connection member 350 can include a relatively stiff material (or a hard material), and thus, can transfer a vibration of a first enclosure 311, based on a vibration of a vibration apparatus, to a vehicle interior material 130. Accordingly, the vehicle interior material 130 can vibrate based on a vibration transferred through the connection member 350 to generate a sound. For example, when the connection member 350 includes a stiff material (or a hard material), the vehicle interior material 130 connected to the connection member 350 can be a vibration plate for generating a sound.

According to an embodiment of the present disclosure, the connection member 350 can further include a first hole **350*o* (or a hole). For example, the connection member 350 can further include the first hole 350*o* which is connected to an opening portion 310*o* in the enclosure 310. The first hole 350*o* can be disposed to correspond to the opening portion 310*o*. The first hole 350*o* can have a same shape as the opening portion 310*o*, but embodiments of the present disclosure are not limited thereto. For example, the first hole 350*o*** can be an opening portion, a slit, a slot, a connection hole, or an intermediate hole, but embodiments of the present disclosure are not limited thereto.

According to an embodiment of the present disclosure, the vehicle interior material 130 can further include a second hole 135 (or a hole). The second hole 135 (or the hole) can include one hole or a plurality of holes. For example, the one hole can correspond to (or overlap) the opening portion **310*o* and the first hole 350*o*, have a size which is greater than or equal to the opening portion 310*o*, and have a same size as the first hole 350*o*. For example, the plurality of holes can be arranged at equal or different intervals. The second hole 135 (or the hole) can be disposed to correspond to (or overlap) the opening portion 310*o* and/or the first hole 350*o*. For example, the second hole 135 (or the hole) can be accommodated in the opening portion 310*o* and/or the first hole 350*o*. For example, the second hole 135** can be an opening portion, a slit, a sound hole, a sound discharge hole, or a sound output hole, but embodiments of the present disclosure are not limited thereto.

According to an embodiment of the present disclosure, a sound generated based on a vibration of the sound generating module 330 can be output to an indoor space of a vehicle through the opening portion **310*o*, the first hole 350*o*, and the second hole 135. In addition, the sound apparatus 30 or the enclosure 310 can be connected or coupled to the vehicle interior material 130 by the connection member 350**.

Figure 10:
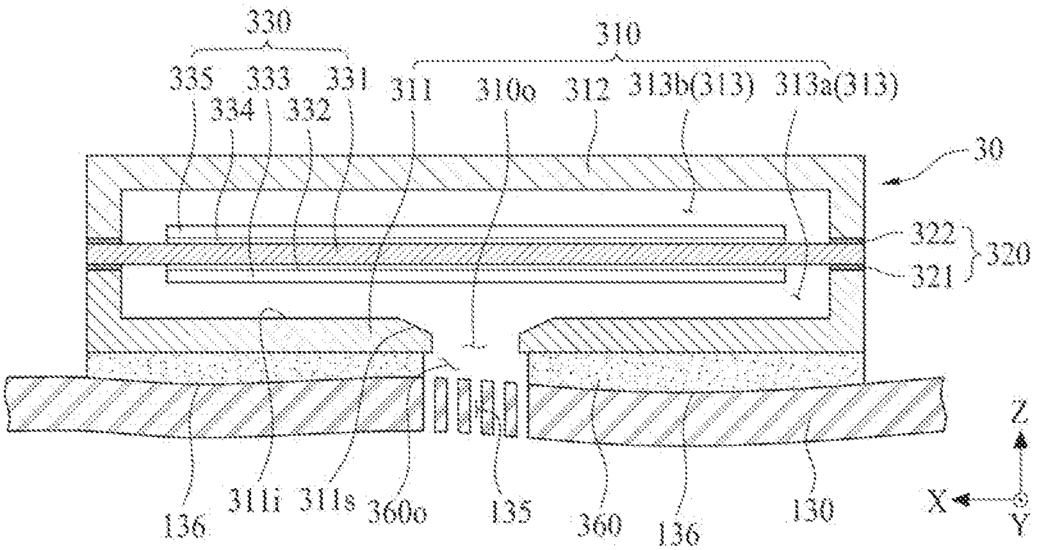
FIG. 10 illustrates a sound apparatus according to another embodiment of the present disclosure.

FIG. 10 illustrates a sound apparatus according to another embodiment of the present disclosure.

With reference to FIG. 10, a sound apparatus 30 according to another embodiment of the present disclosure can include an enclosure 310, a sound generating module 330, and a coupling member 320. Descriptions of the enclosure 310, the sound generating module 330, and the coupling member 320 can be substantially a same as the descriptions of FIGS. 3 to 5, and thus, like reference numerals refer to like elements and repeated descriptions are omitted.

The sound apparatus 30 according to another embodiment of the present disclosure can further include a soft member 360. A description of the soft member 360 can be substantially a same as the description of FIG. 6, and thus, repeated descriptions are omitted or will be briefly given below.

The vehicle interior material 130 according to another embodiment of the present disclosure can include at least one or more curved portions 136. The soft member 360 can be configured to correspond to the at least one or more curved portions 136. The soft member 360 can contact with the at least one or more curved portions 136.

According to another embodiment of the present disclosure, the soft member 360 can include a relatively soft material (or a smooth material). For example, the soft member 360 can include a single-sided tape, a single-sided sponge tape, a single-sided porous tape, a single-sided cushion tape, a double-sided tape, a double-sided sponge tape, a double-sided porous tape, or a double-sided cushion tape, or the like, but embodiments of the present disclosure are not limited thereto. The soft member 360 can be filled in the at least one or more curved portions 136 of the vehicle interior material 130. The soft member 360 can be disposed between the enclosure 310 and the at least one or more curved portions 136 of the vehicle interior material 130. For example, the sound generating module 330 can be connected or coupled to the at least one or more curved portions 136 of the vehicle interior material 130 by the soft member 360. The soft member 360 can be disposed between the first enclosure 311 and the at least one or more curved portions 136 of the vehicle interior material 130. For example, the first enclosure 311 can be connected or coupled to the at least one or more curved portions 136 of the vehicle interior material 130 by the soft member 360. Accordingly, the soft member 360 can be filled in the at least one or more curved portions 136 of the vehicle interior material 130 and can absorb an external impact, thereby protecting the sound apparatus 30.

According to an embodiment of the present disclosure, the soft member 360 can further include a first hole **360*o* (or a hole). For example, the soft member 360 can further include the first hole 360*o* which is connected to the opening portion 310*o* in the enclosure 310 or the first enclosure 311**.

The first hole 360*o* can be disposed to correspond to the opening portion 310*o*. The first hole 360*o* can have a same shape as the opening portion 310*o*, but embodiments of the present disclosure are not limited thereto. For example, the first hole 360*o* can be an opening portion, a slit, a slot, a connection hole, or an intermediate hole, but embodiments of the present disclosure are not limited thereto.

According to an embodiment of the present disclosure, the vehicle interior material 130 can further include a second hole 135 (or a hole). The second hole 135 (or the hole) can include one hole or a plurality of holes. For example, the one hole can correspond to (or overlap) the opening portion 310*o* and the first hole 360*o*, have a size which is greater than or equal to the opening portion 310*o*, and have a same size as the first hole 360*o*. The second hole 135 (or the hole) can be disposed to correspond to (or overlap) the opening portion 310*o* and/or the first hole 360*o*. For example, the second hole 135 (or the hole) can be accommodated in the opening portion 310*o* and/or the first hole 360*o*. For example, the second hole 135 can be an opening portion or a slit, but embodiments of the present disclosure are not limited thereto.

According to an embodiment of the present disclosure, a sound generated based on a vibration of the sound generating module 330 can be output to an indoor space of a vehicle through the opening portion 310*o*, the first hole 350*o*, and the second hole 135. In addition, the sound generating module 330 can be connected or coupled to the at least one or more curved portions 136 of the vehicle interior material 130 by the soft member 360. Moreover, the soft member 360 can absorb an external impact, and thus, can protect the sound apparatus 30 from the external impact.

Figure 11:
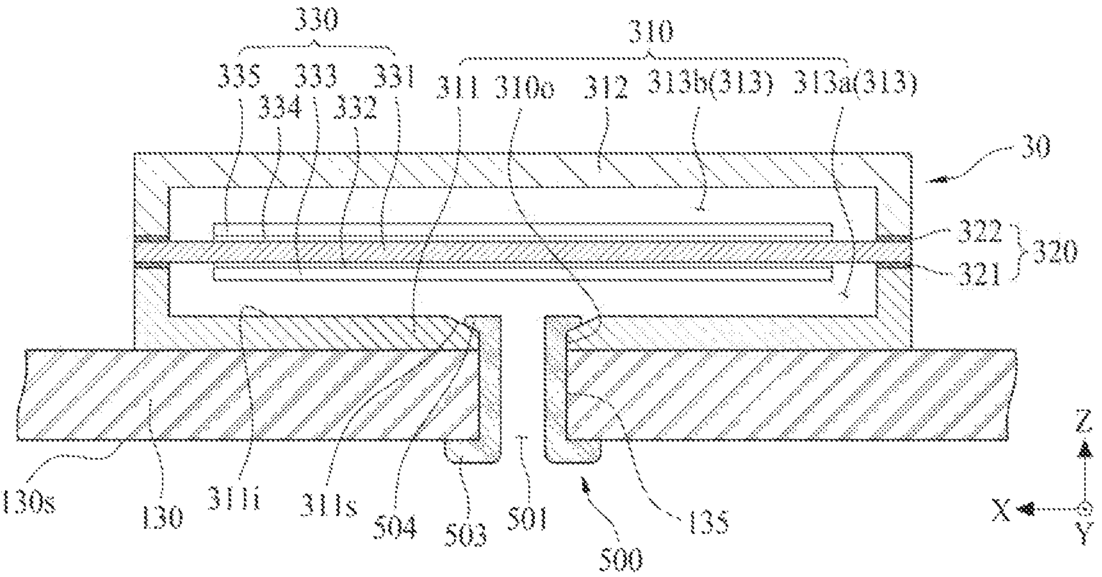
FIG. 11 illustrates a sound apparatus according to another embodiment of the present disclosure.

FIG. 11 illustrates a sound apparatus according to another embodiment of the present disclosure.

With reference to FIG. 11, a sound apparatus 30 according to another embodiment of the present disclosure can include an enclosure 310, a sound generating module 330, and a coupling member 320. Descriptions of the enclosure 310, the sound generating module 330, and the coupling member 320 can be substantially a same as the descriptions of FIGS. 3 to 10, and thus, like reference numerals refer to like elements and repeated descriptions are omitted.

In a case where a sound apparatus 30 is connected to a vehicle interior material 130, the sound apparatus 30 can be connected to the vehicle interior material 130 by an adhesive. In a case where the sound apparatus 30 is connected to the vehicle interior material 130 by the adhesive, there can be a problem where it is difficult to perform a rework or replacement when a defect or a breakdown of the sound apparatus 30 occurs, and there can be a problem where the damage of the sound apparatus 30 occurs in performing a rework or replacement. Accordingly, the inventors of the present disclosure have performed extensive research and experiments for facilitating the rework or replacement of the sound apparatus 30 connected to the vehicle interior material 130 and preventing the damage of the sound apparatus 30. Based on the extensive research and experiments, the inventors of the present disclosure have invented a sound apparatus where the rework or replacement of the sound apparatus 30 connected to the vehicle interior material 130 is easily performed, and the damage of the sound apparatus 30 does not occur in performing a rework or replacement. This will be described below.

The sound apparatus 30 according to another embodiment of the present disclosure can further include a coupling part 500.

The coupling part 500 can be at a rear surface of an enclosure 310. The coupling part 500 can be between the rear surface of the enclosure 310 and the vehicle interior material 130. For example, the coupling part 500 can be configured to couple the enclosure 310 and the vehicle interior material 130 (or a mount object). The coupling part 500 can be configured to couple the enclosure 310 to the vehicle interior material 130 (or the mount object) with the enclosure 310 mounted thereon. For example, the coupling part 500 can be configured to couple a first enclosure 311 to the vehicle interior material 130 (or the mount object) with the first enclosure 311 mounted thereon. The coupling part 500 can be configured to connect or couple the enclosure 310 to the vehicle interior material 130. For example, the sound apparatus 30 or the enclosure 310 can be connected or coupled to the vehicle interior material 130 by the coupling part 500. A sound based on a vibration of the sound generating module 330 can be output to an indoor space of a vehicle through the coupling part 500. For example, the coupling part 500 can be a coupling means, a coupling structure, a sound guide member, or a sound discharge member, or the like, but embodiments of the present disclosure are not limited thereto.

According to an embodiment of the present disclosure, the coupling part 500 can be accommodated or inserted into an opening portion 310*o* of the enclosure 310. The coupling part 500 can be accommodated or inserted into a hole 135 of the vehicle interior material 130. The coupling part 500 can be accommodated or inserted into the opening portion 310*o* and the hole 135 of the first enclosure 311.

According to an embodiment of the present disclosure, the enclosure 310 can surround both sides of the sound generating module 330 (or a vertical direction with respect to a horizontal direction), and thus, an internal space 313 can be minimized. For example, the first enclosure 311 and a second enclosure 312 can surround the both sides of the sound generating module 330 (or the vertical direction with respect to the horizontal direction), and thus, a first space (or a first internal space) 313*a* and a second space (or a second internal space) 313*b* can be minimized. Accordingly, a thickness of the sound generating module 330 can be reduced, and thus, a thickness of the sound apparatus 30 can decrease.

The coupling part 500 according to an embodiment of the present disclosure can further include a hollow portion 501. For example, the hollow portion 501 can be connected to the internal space 313 through the opening portion 310*o* of the enclosure 310. For example, the hollow portion 501 can be connected to the first space 313*a* through the opening portion 310*o* of the first enclosure 311. A sound based on a vibration of the sound generating module 330 can be output to an indoor space of a vehicle through the hollow portion 501. For example, the hollow portion 501 can be a sound discharge port or a sound output port, but embodiments of the present disclosure are not limited thereto.

The coupling part 500 according to an embodiment of the present disclosure can further include a hook member 504.

The first enclosure 311 can include an inner surface 311*i* and an outer surface. The inner surface of the first enclosure 311 can face a vibration member 331. The outer surface of the first enclosure 311 can be a surface which is opposite to the inner surface of the first enclosure 311. The hook member 504 can be coupled to the inner surface 311*i* or a slope surface 311*s* of the first enclosure 311 facing the sound generating module 330. The hook member 504 can pass through the vehicle interior material 130 or the mount object and can be accommodated or inserted into the opening portion 310*o* of the first enclosure 311. The hook member 504 can be configured to correspond to the slope surface 311*s* of the first enclosure 311. For example, the hook member 504 can be connected or coupled to the slope surface 311*s* of the first enclosure 311. For example, the hook member 504 can be connected or coupled to a rear surface (or an interior surface) 130*s* of the vehicle interior material 130 and the slope surface 311*s* of the first enclosure 311. The hook member 504 can cover the hole 135 of the vehicle interior material 130, and thus, can minimize the penetration of dusts or foreign materials from the outside, thereby protecting the sound apparatus 30. For example, the slope surface 311*s* can be a fastening guide surface with the coupling part 500. For example, the hook member 504 can be a protrusion, but embodiments of the present disclosure are not limited thereto.

According to an embodiment of the present disclosure, the sound apparatus 30 can be connected or coupled to the vehicular interior member 130 by the coupling part 500, and thus, the rework or replacement of the sound apparatus 30 connected with the vehicle interior material 130 can be easily performed, thereby preventing the damage of the sound generating module 330 in performing the rework or replacement. According to an embodiment of the present disclosure, because the coupling part 500 is provided, the sound apparatus 30 can be easily attached or mounted on a narrow area (or space) between the vehicle interior material 130 and a vehicular structure. According to an embodiment of the present disclosure, because the sound apparatus 30 is coupled to or mounted on the vehicle interior material 130 by the coupling part 500, a shaking sound may not occur between the sound apparatus 30 and the vehicle interior material 130, and thus, a sound characteristic and/or a sound pressure level characteristic of the sound apparatus 30 can be improved.

Figure 12:
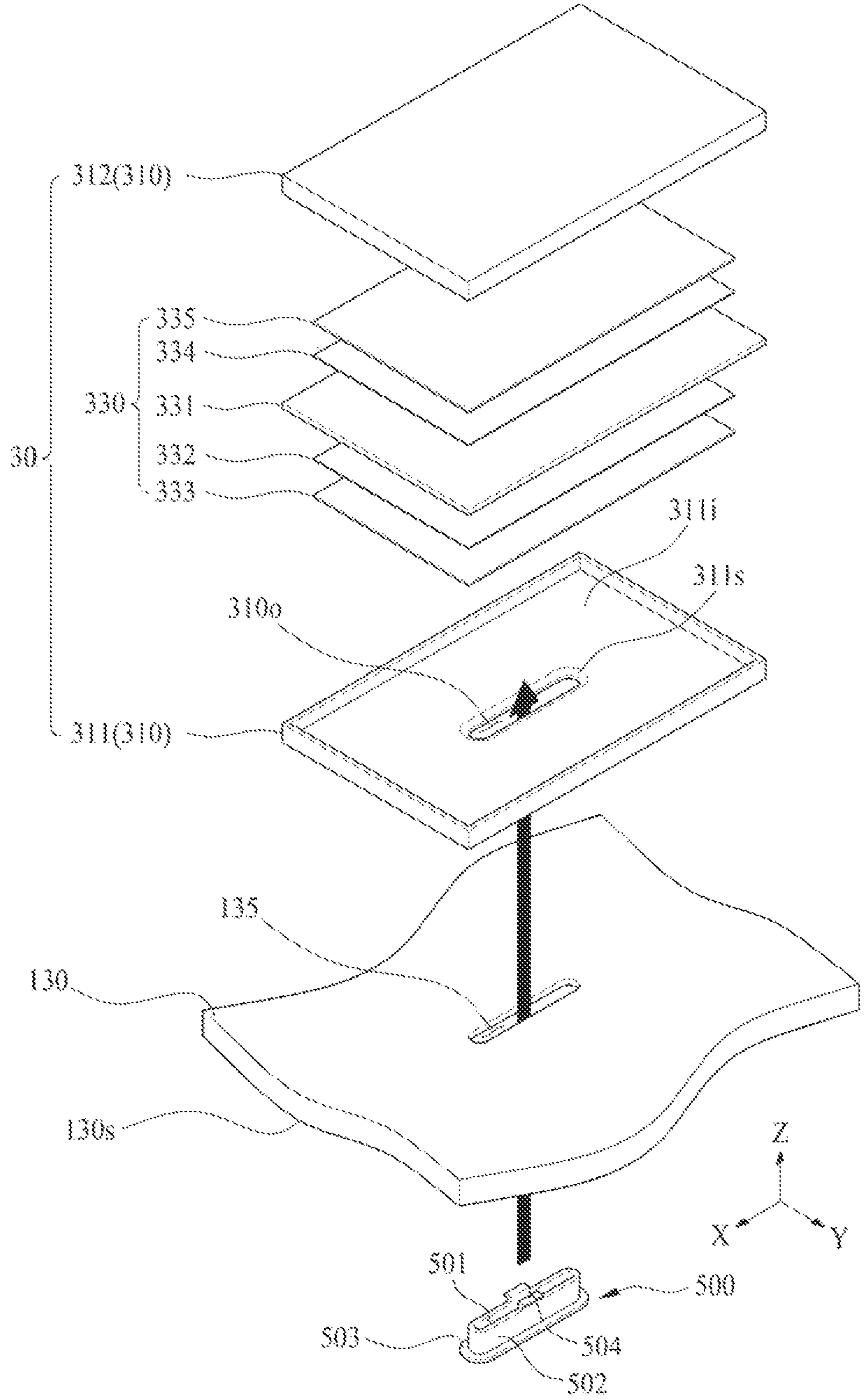
FIG. 12 illustrates a sound apparatus according to another embodiment of the present disclosure.
Figure 13A:
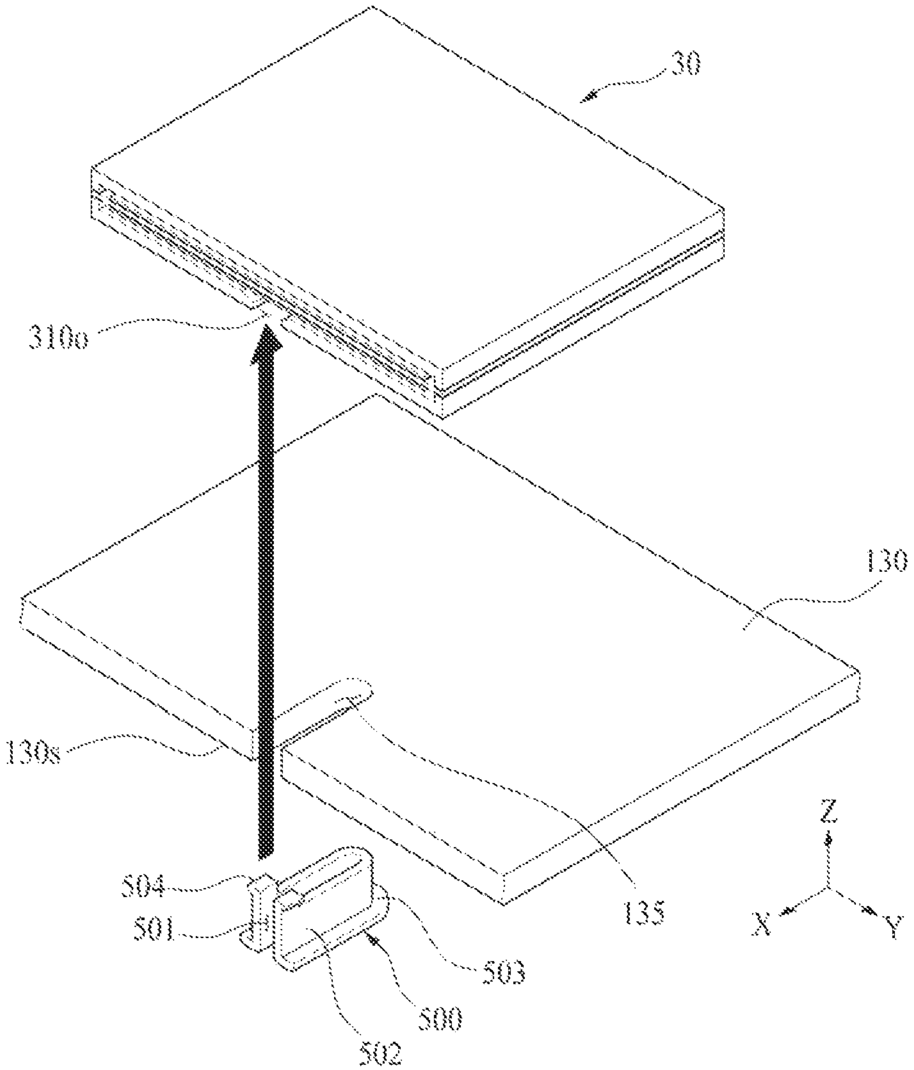
FIG. 13A illustrates a method of connecting a sound apparatus to a coupling part according to another embodiment of the present disclosure.
Figure 13B:
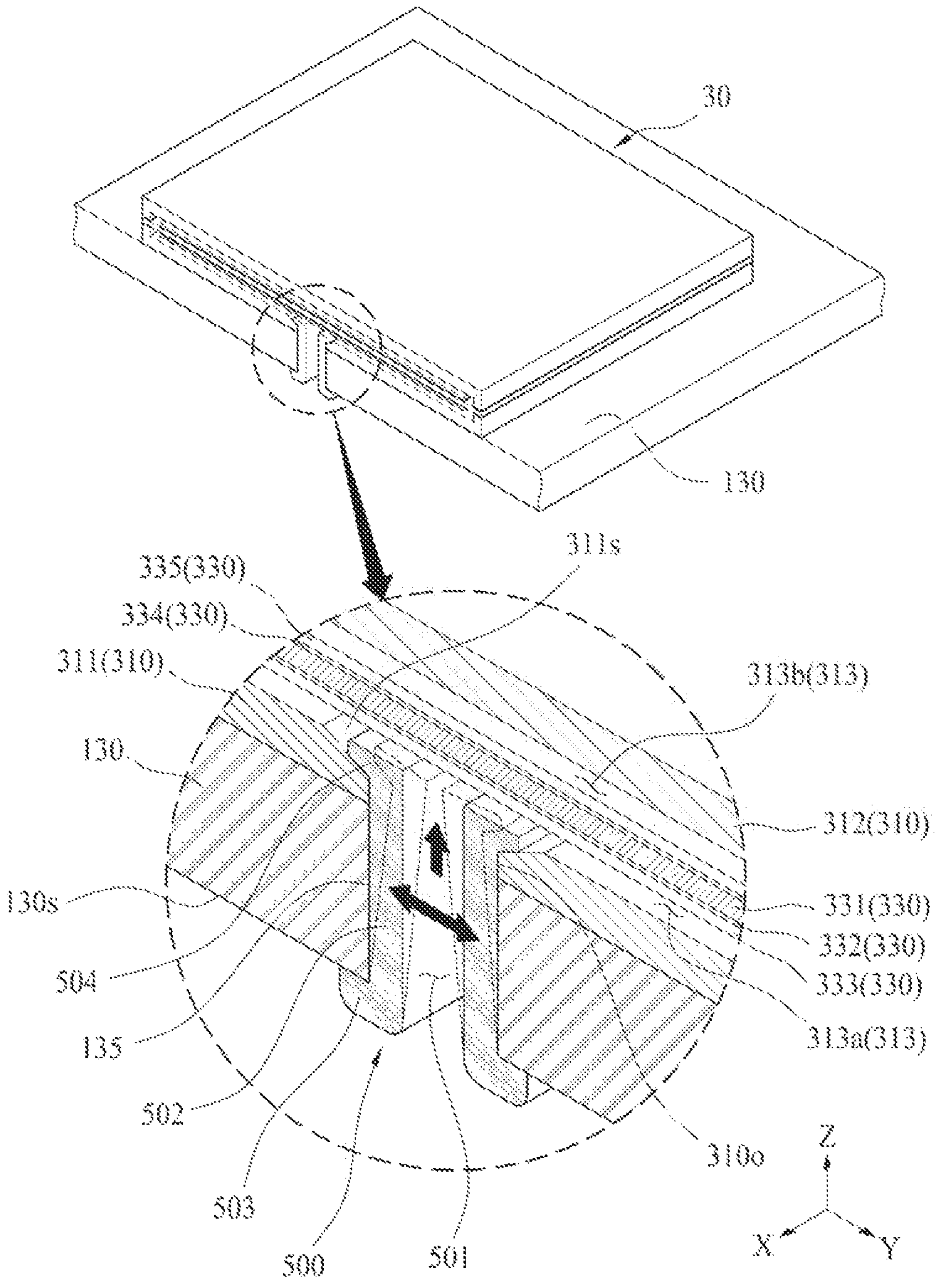
FIG. 13B illustrates a method of connecting a sound apparatus to a coupling part according to another embodiment of the present disclosure.

FIG. 12 illustrates a sound apparatus according to another embodiment of the present disclosure. FIGS. 13A and 13B illustrate a method of connecting a sound apparatus to a coupling part illustrated in FIG. 12 according to another embodiment of the present disclosure.

With reference to FIGS. 12 to 13B, a sound apparatus 30 according to another embodiment of the present disclosure can include an enclosure 310 and a sound generating module 330. Descriptions of the enclosure 310 and the sound generating module 330 can be substantially a same as the descriptions of FIGS. 3 to 10, and thus, like reference numerals refer to like elements and repeated descriptions are omitted.

The sound apparatus 30 according to another embodiment of the present disclosure can include a coupling part 500 connected to a vehicle interior material 130. The coupling part 500 can include a hollow portion 501. Descriptions of the coupling part 500 and the hollow portion 501 can be substantially a same as the description of FIG. 11, and thus, like reference numerals refer to like elements and repeated descriptions are omitted or will be briefly given below.

The coupling part 500 according to an embodiment of the present disclosure can further include a hollow member 502 and a latch member 503.

The hollow member 502 can include the hollow portion 501. The hollow portion 501 can be connected or coupled to a hole (or a first hole) 135 of the vehicle interior material 130. The hollow member 502 can be connected or coupled to the hole 135 of the vehicle interior material 130 and an opening portion 310*o* of the enclosure 310. For example, the hollow member 502 can be connected or coupled to the hole 135 of the vehicle interior material 130 and the opening portion 310*o* of a first enclosure 311. For example, the hollow member 502 can pass through the hole 135 of the vehicle interior material 130 and can be accommodated or inserted into the opening portion 310*o* of the first enclosure 311.

The latch member 503 can be configured to be connected or coupled to the vehicle interior material 130 (or a mount object) equipped with the enclosure 310. The latch member 503 can be connected or coupled to a periphery of the hole 135 of the vehicle interior material 130. The latch member 503 can be connected or coupled to a rear surface (or an interior surface) 130*s* of the vehicle interior material 130 at a periphery of the hole 135 of the vehicle interior material 130. For example, the latch member 503 can be a latch or the like, but embodiments of the present disclosure are not limited thereto.

With reference to FIGS. 11 and 12, the coupling part 500 can further include a hook member 504. The hook member 504 can be connected to a first side of the hollow member 502. The hook member 504 can be coupled to an inner surface 311*i* of the enclosure 310 facing the sound generating module 330 or the sound apparatus 30. The latch member 503 can be connected to a second side of the hollow member 502. The latch member 503 can be coupled to the rear surface (or the interior surface) 130*s* of the vehicle interior material 130 exposed at an indoor space of a vehicle.

With reference to FIG. 12, the coupling part 500 can be connected or coupled to the enclosure 310 or the sound apparatus 30 through the hole 135 of the vehicle interior material 130 and an opening portion 310*o* of the enclosure 310. For example, the coupling part 500 can be connected or coupled to the enclosure 310 or the sound apparatus 30 through the hole 135 of the vehicle interior material 130 and an opening portion 310*o* of a first enclosure 311 (an arrow direction).

With reference to FIG. 13A, the coupling part 500 can be connected or coupled to the enclosure 310 or the sound apparatus 30 through the hole 135 of the vehicle interior material 130 (an arrow direction), in the indoor space of the vehicle. For example, the coupling part 500 can be accommodated or inserted into the opening portion 310*o* of the first enclosure 311 through the hole 135 of the vehicle interior material 130, in the indoor space of the vehicle. For example, the hook member 504 of the coupling part 500 can be connected or coupled to the opening portion 310*o* of the first enclosure 311. For example, the hook member 504 of the coupling part 500 can be inserted (or accommodated) into the opening portion 310*o* of the first enclosure 311 and can be connected or couple to a slope surface 311*s* of the first enclosure 311.

FIG. 13B is an enlarged view of a portion where the sound apparatus 30 or the enclosure is coupled or coupled to the vehicle interior material 130.

With reference to FIG. 13B, the hook member 504 of the coupling part 500 can be connected or coupled to the opening portion 310*o* of the first enclosure 311. For example, the hollow member 502 of the coupling part 500 can be inserted (or accommodated) into the opening portion 310*o* of the first enclosure 311 (a vertical arrow direction), and thus, the hook member 504 of the coupling part 500 is pushed (or compressed) to a center (or an inner side) (a dotted-line direction) of the hollow portion 501 by an elastic force (a horizontal arrow direction) and can then be compressed and restored along the slope surface 311*s* of the first enclosure 311 by an elastic restoring force and can be connected or coupled to the opening portion 310*o* of the first enclosure 311. For example, the hook member 504 can be connected or coupled to the slope surface 311*s* of the first enclosure 311.

According to an embodiment of the present disclosure, the sound apparatus 30 can be connected or coupled to the vehicle interior material 130 by the coupling part 500. According to an embodiment of the present disclosure, the sound apparatus 30 can be easily connected or coupled to the vehicle interior material 130 by the latch member 503 and the hook member 504 of the coupling part 500.

Figure 14:
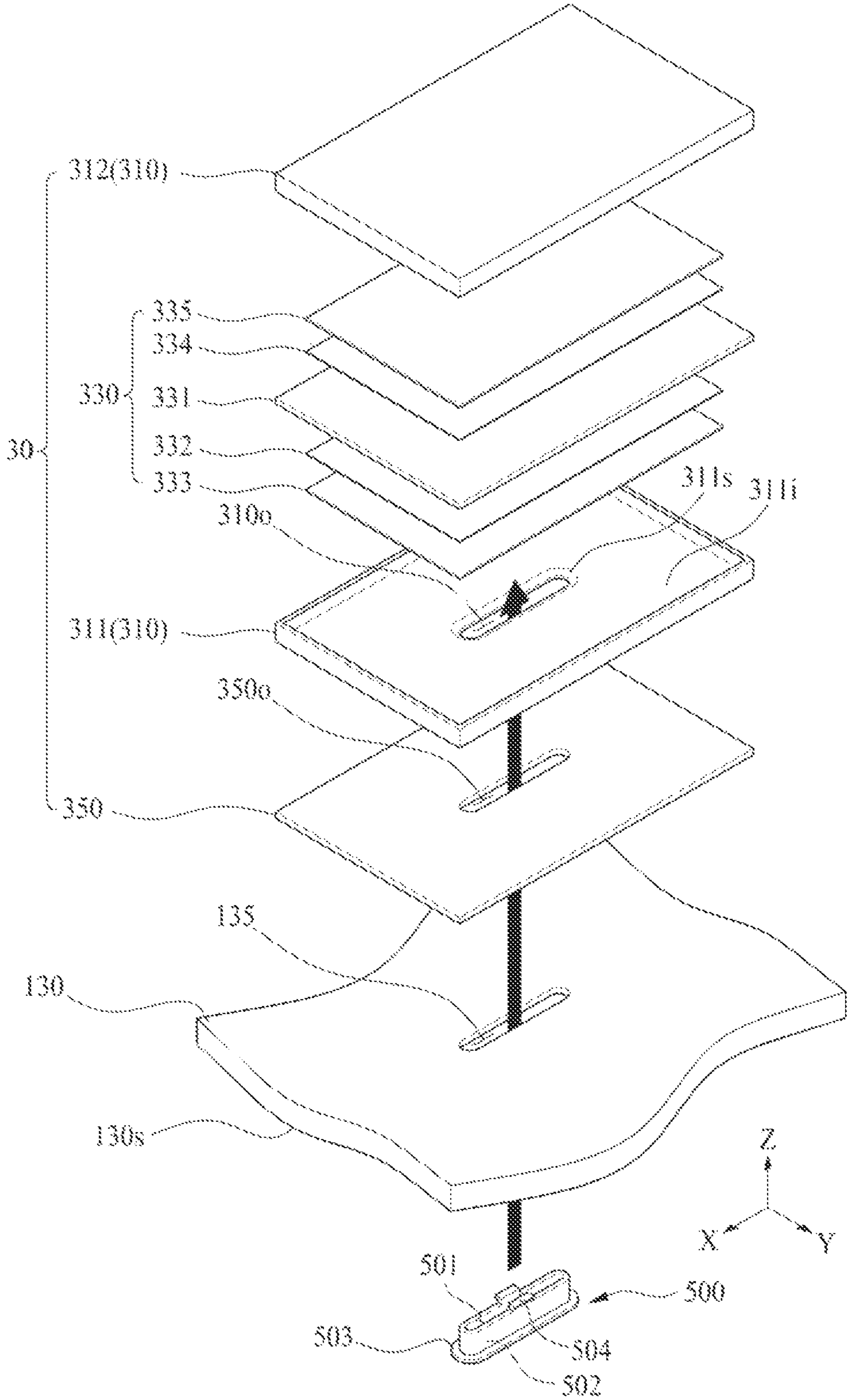
FIG. 14 illustrates a sound apparatus according to another embodiment of the present disclosure.
Figure 15A:
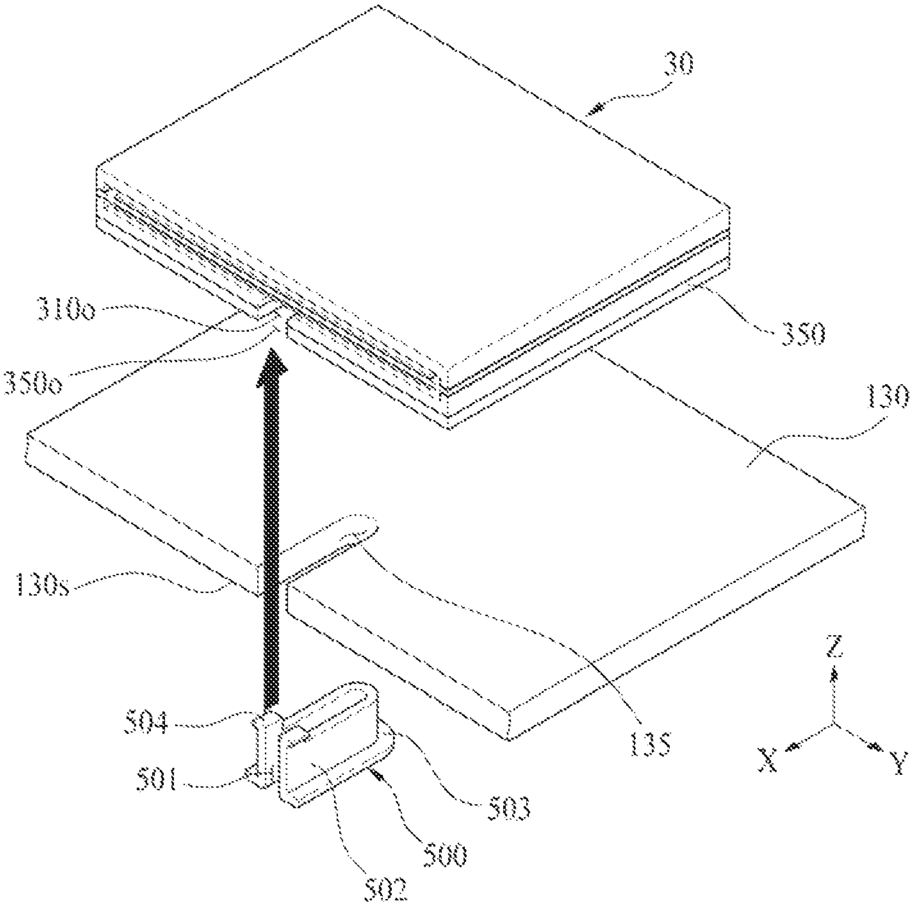
FIG. 15A illustrates a method of connecting a sound apparatus to a coupling part according to another embodiment of the present disclosure.
Figure 15B:
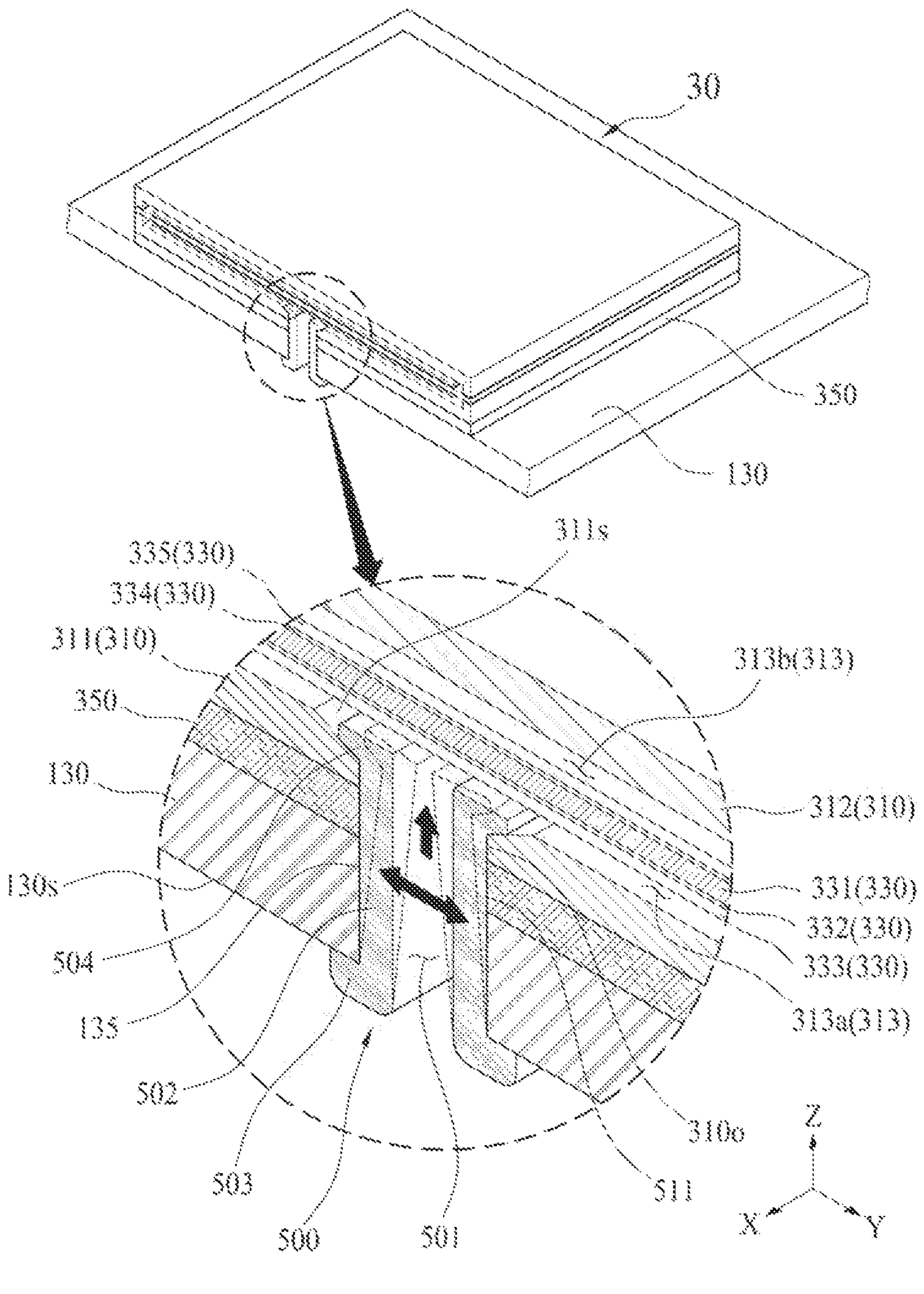
FIG. 15B illustrates a method of connecting a sound apparatus to a coupling part according to another embodiment of the present disclosure.

FIG. 14 illustrates a sound apparatus according to another embodiment of the present disclosure. FIGS. 15A and 15B illustrate a method of connecting a sound apparatus to a coupling part illustrated in FIG. 14 according to another embodiment of the present disclosure.

With reference to FIGS. 14 to 15B, a sound apparatus 30 according to another embodiment of the present disclosure can include an enclosure 310 and a sound generating module 330. Descriptions of the enclosure 310 and the sound generating module 330 can be substantially a same as the descriptions of FIGS. 3 to 10, and thus, like reference numerals refer to like elements and repeated descriptions are omitted.

The sound apparatus 30 according to another embodiment of the present disclosure can include a coupling part 500 connected to a vehicle interior material 130. A description of the coupling part 500 can be substantially a same as the description of FIGS. 11 to 13B, and thus, like reference numerals refer to like elements and repeated descriptions are omitted or will be briefly given below.

FIG. 14 illustrates an embodiment where a connection member is additionally provided in the sound apparatus described above with reference to FIGS. 12 to 13B.

According to another embodiment of the present disclosure, the sound apparatus 30 can further include a connection member 350.

The connection member 350 can be disposed between the vehicle interior material 130 and the enclosure 310. The connection member 350 can be disposed between the vehicle interior material 130 and a first enclosure 311. The connection member 350 can further include a second hole (or a hole) 350*o*. For example, the second hole 350*o* can be between the first hole 135 of the vehicle interior material 130 and an opening portion 310*o* of the enclosure 310. For example, the second hole 350*o* can be between the first hole 135 of the vehicle interior material 130 and the opening portion 310*o* of the first enclosure 311. The second hole 350*o* can be connected to the opening portion 310*o* of the enclosure 310. For example, the second hole 350*o* can be connected to the opening portion 310*o* of the first enclosure 311. The second hole 350*o* can be disposed to correspond to the opening portion 310*o*.

With reference to FIG. 14, the coupling part 500 can be connected or coupled to the sound apparatus 30 through the first hole 135 of the vehicle interior material 130, the second hole 350*o* of the connection member 350, and an opening portion 310*o* of the enclosure 310 (an arrow direction). For example, the coupling part 500 can pass through the first hole 135 of the vehicle interior material 130 and the second hole 350*o* of the connection member 350, in the indoor space of the vehicle and can be connected or coupled to the opening portion 310*o* of the first enclosure 311.

With reference to FIG. 15A, the coupling part 500 can be connected or coupled to the enclosure 310 or the sound apparatus 30 through the first hole 135 of the vehicle interior material 130 (an arrow direction), in the indoor space of the vehicle. For example, the coupling part 500 can be accommodated or inserted into the opening portion 310*o* of the first enclosure 311 and the second hole 350*o* of the connection member 350 through the first hole 135 of the vehicle interior material 130, in the indoor space of the vehicle. For example, the hook member 504 of the coupling part 500 can be connected or coupled to the opening portion 310*o* of the first enclosure 311. For example, the hook member 504 of the coupling part 500 can be inserted (or accommodated) into the opening portion 310*o* of the first enclosure 311 and can be connected or couple to a slope surface 311*s* of the first enclosure 311.

FIG. 15B is an enlarged view of a portion where the sound apparatus 30 or the enclosure is coupled or coupled to the vehicle interior material 130.

With reference to FIG. 15B, the hook member 504 of the coupling part 500 can be connected or coupled to the opening portion 310*o* of the first enclosure 311. For example, the hollow member 502 of the coupling part 500 can be inserted (or accommodated) into the opening portion 310*o* of the first enclosure 311 (a vertical arrow direction), and thus, the hook member 504 of the coupling part 500 is pushed (or compressed) to a center (or an inner side) (a dotted-line direction) of the hollow portion 501 by an elastic force (a horizontal arrow direction) and can then be compressed and restored 511 along the slope surface 311*s* of the first enclosure 311 by an elastic restoring force and can be connected or coupled to the opening portion 310*o* of the first enclosure 311. For example, the hook member 504 can be connected or coupled to the slope surface 311*s* of the first enclosure 311.

According to an embodiment of the present disclosure, the sound apparatus 30 can be connected or coupled to the vehicle interior material 130 by the coupling part 500. According to an embodiment of the present disclosure, the sound apparatus 30 can be easily connected or coupled to the vehicle interior material 130 by the latch member 503 and the hook member 504 of the coupling part 500.

Figure 16:
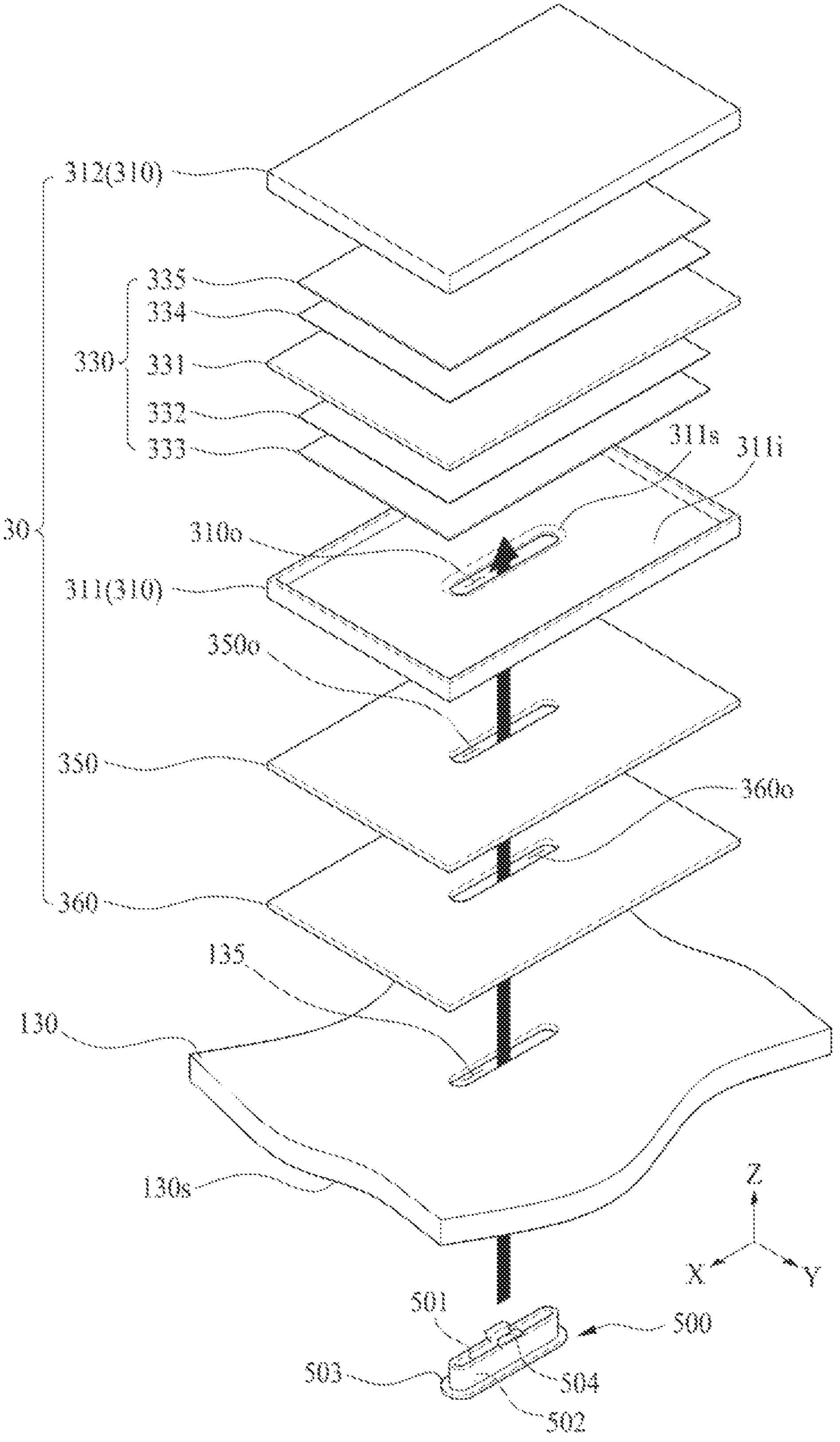
FIG. 16 illustrates a sound apparatus according to another embodiment of the present disclosure.

FIG. 16 illustrates a sound apparatus according to another embodiment of the present disclosure.

With reference to FIG. 16, a sound apparatus 30 according to another embodiment of the present disclosure can include an enclosure 310 and a sound generating module 330. Descriptions of the enclosure 310 and the sound generating module 330 can be substantially a same as the descriptions of FIGS. 3 to 10, and thus, like reference numerals refer to like elements and repeated descriptions are omitted.

The sound apparatus 30 according to another embodiment of the present disclosure can include a coupling part 500 connected to a vehicle interior material 130. A description of the coupling part 500 can be substantially a same as the description of FIGS. 11 to 13B, and thus, like reference numerals refer to like elements and repeated descriptions are omitted or will be briefly given below.

The sound apparatus 30 according to an embodiment of the present disclosure can further include a connection member 350. A description of the connection member 350 can be substantially a same as the description of FIGS. 8, 9, and 14 to 15B, and thus, like reference numerals refer to like elements and repeated descriptions are omitted or will be briefly given below.

FIG. 16 illustrates an embodiment where a soft member 360 is additionally provided in the sound apparatus described above with reference to FIGS. 14 to 15B.

According to another embodiment of the present disclosure, the sound apparatus 30 can further include a soft member 360.

The soft member 360 can be disposed between the vehicle interior material 130 and the connection member 350. The soft member 360 can further include a third hole (or a hole) 360*o*. For example, the third hole 360*o* can be disposed to correspond to the second hole 350*o*. The third hole 360*o* can be disposed to correspond to the opening portion 310*o*. For example, third hole 360*o* can be between the first hole 135 of the vehicle interior material 130 and the second hole 350*o* of the connection member 350. For example, the third hole 360*o* can be connected to the second hole 350*o* of the connection member 350. For example, the third hole 360*o* can be connected to the opening portion 310*o* of the first enclosure 311.

With reference to FIG. 16, the coupling part 500 can be connected or coupled to the sound apparatus 30 through the first hole 135 of the vehicle interior material 130, the second hole 350*o* of the connection member 350, the third hole 360*o* of the soft member 360, and the opening portion 310*o* of the enclosure 310 (an arrow direction). For example, the coupling part 500 can be connected or coupled to the sound apparatus 30 through the first hole 135 of the vehicle interior material 130, the second hole 350*o* of the connection member 350, the third hole 360*o* of the soft member 360, and the opening portion 310*o* of the first enclosure 311 (an arrow direction).

The method of connecting the vehicle interior material 130 and the sound apparatus 30 involves adding the soft member 360 to the descriptions in FIGS. 15A and 15B, and thus, the descriptions are omitted.

According to an embodiment of the present disclosure, the sound apparatus 30 can be connected or coupled to the vehicle interior material 130 by the coupling part 500.

Figure 17:
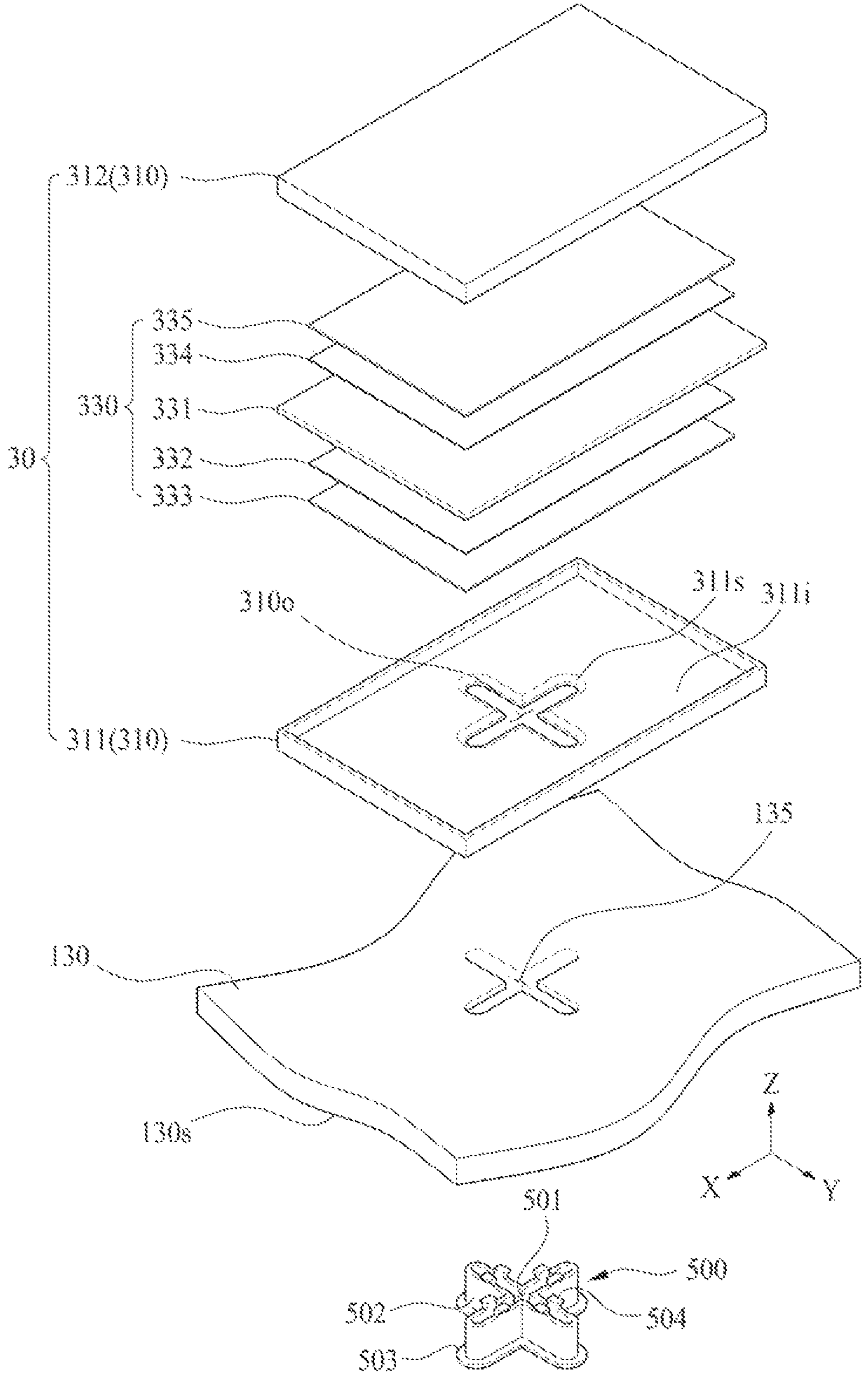
FIG. 17 illustrates a sound apparatus and an interior material according to an embodiment of the present disclosure.
Figure 18:
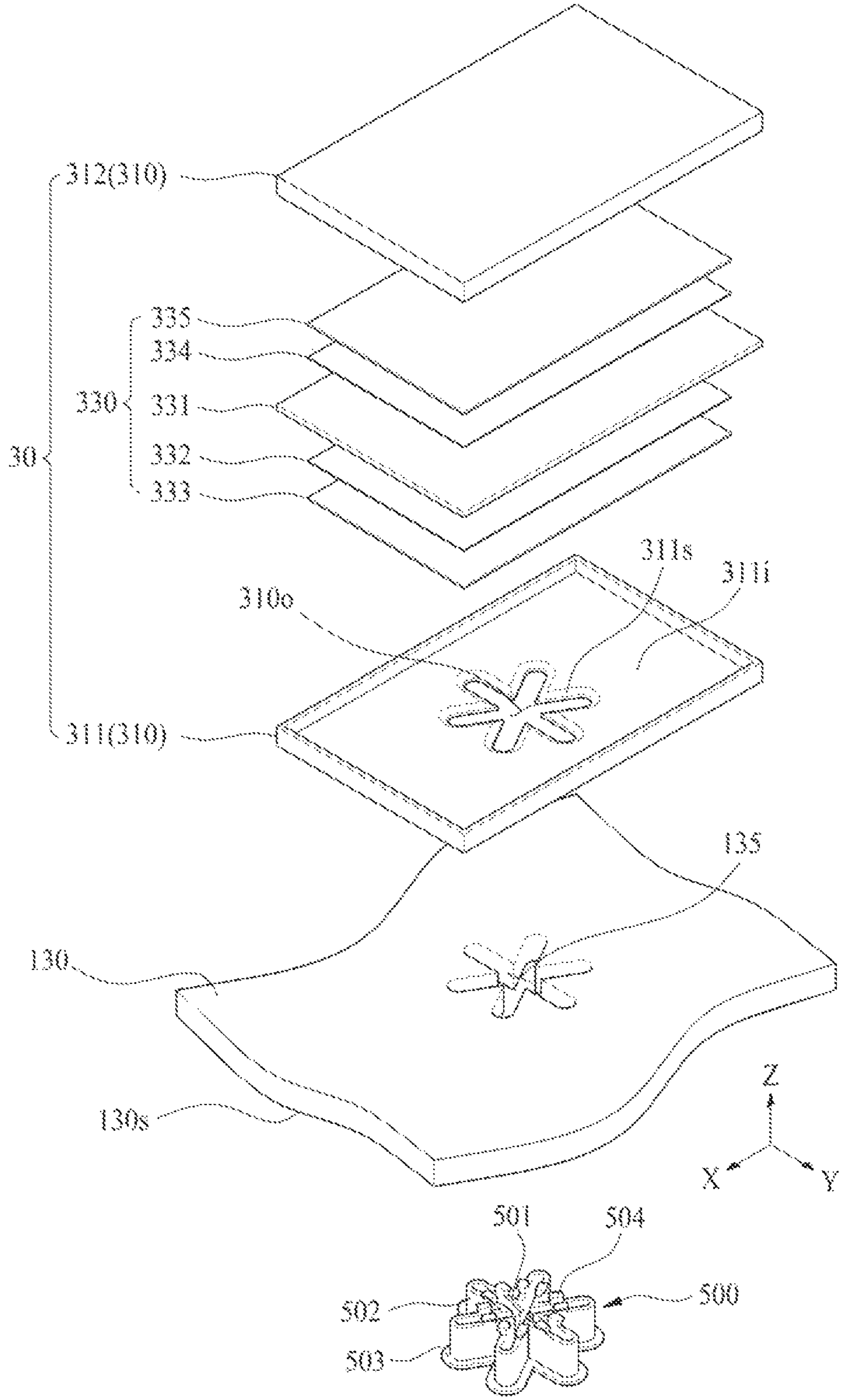
FIG. 18 illustrates a sound apparatus and an interior material according to another embodiment of the present disclosure.

FIG. 17 illustrates a sound apparatus and an interior material according to an embodiment of the present disclosure. FIG. 18 illustrates a sound apparatus and an interior material according to another embodiment of the present disclosure.

With reference to FIGS. 17 and 18, a sound apparatus 30 according to another embodiment of the present disclosure can include an enclosure 310 and a sound generating module 330. Descriptions of the enclosure 310 and the sound generating module 330 can be substantially a same as the descriptions of FIGS. 3 to 10, and thus, like reference numerals refer to like elements and repeated descriptions are omitted.

The sound apparatus 30 according to another embodiment of the present disclosure can include a coupling part 500 connected to a vehicle interior material 130. A description of the coupling part 500 can be substantially a same as the description of FIGS. 11 to 13B, and thus, like reference numerals refer to like elements and repeated descriptions are omitted or will be briefly given below.

With reference to FIG. 17, the enclosure 310 can include an opening portion 310*o*. For example, a first enclosure 311 can include the opening portion 310*o*. The opening portion 310*o* of the enclosure 310 or the first enclosure 311 can include two (or a pair of) opening lines (or line holes) intersecting with each other. The opening portion 310*o* of the enclosure 310 or the first enclosure 311 can include a "+"-shape. A vehicle interior material 130 can include a hole 135. The hole 135 can be disposed to correspond to the opening portion 310*o*. For example, the hole 135 can be disposed to correspond to a shape of the opening portion 310*o*. For example, a shape of the hole 135 can be a same as the shape of the opening portion 310*o*, but embodiments of the present disclosure are not limited thereto. For example, the shape of the hole 135 can be a "+"-shape.

The coupling part 500 can include a hollow portion 501. The hollow portion 501 can be disposed to correspond to the opening portion 310*o*. For example, the hollow portion 501 can be disposed to correspond to a shape of the opening portion 310*o*. A shape of the hollow portion 501 can be a same as the shape of the opening portion 310*o*, but embodiments of the present disclosure are not limited thereto. For example, the shape of the hollow portion 501 can be a "+"-shape. A hook member 504 of the coupling part 500 can be changed based on a shape of the hollow portion 501. For example, the hook member 504 can include a plurality of hook members or latches, based on a "+"-shape of the hollow portion 501.

With reference to FIG. 18, the opening portion 310*o* of the enclosure 310 or the first enclosure 311 can include three opening lines (or line holes) intersecting with each other. The opening portion 310*o* of the enclosure 310 or the first enclosure 311 can include a "*"-shape (an asterisk shape). The vehicle interior material 130 can include a hole 135. The hole 135 can be disposed to correspond to the opening portion 310*o*. For example, the hole 135 can be disposed to correspond to a shape of the opening portion 310*o*. For example, a shape of the hole 135 can be a same as the shape of the opening portion 310*o*, but embodiments of the present disclosure are not limited thereto. For example, the shape of the hole 135 can be a "*"-shape.

The hollow portion 501 can be disposed to correspond to the opening portion 310*o*. For example, the hollow portion 501 can be disposed to correspond to a shape of the opening portion 310*o*. A shape of the hollow portion 501 can be a same as the shape of the opening portion 310*o*, but embodiments of the present disclosure are not limited thereto. For example, the shape of the hollow portion 501 can be a "*"-shape. The hook member 504 can be changed based on a shape of the hollow portion 501. For example, the hook member 504 can include a plurality of hook members or latches, based on a "*"-shape of the hollow portion 501.

According to an embodiment of the present disclosure, because the opening portion 310*o* is configured in a "+"-shape or a "*"-shape, the amount of discharged sound in the sound apparatus 30 can increase, and a sense of beauty of an external appearance can be enhanced. In addition, the hook member 504 can cover the hole 135 of the vehicle interior material 130, and thus, can minimize the penetration of dusts or foreign materials from the outside, thereby protecting the sound apparatus 30. But embodiment of the present disclosure are not limited thereto.

In FIGS. 17 and 18, the sound apparatus 30 according to another embodiment of the present disclosure can further include a connection member 350 described in FIGS. 14 to 15B. For example, a shape of a hole 350*o* of the connection member 350 can be disposed to correspond to a shape of the opening portion 310*o* of the enclosure 310. For example, the shape of the hole 350*o* of the connection member 350 can be a "+"-shape or a "*"-shape.

In FIGS. 17 and 18, the sound apparatus 30 according to another embodiment of the present disclosure can further include a connection member 350 described in FIGS. 14 to 15B and a soft member 360 described in FIG. 16. For example, a shape of a hole 350*o* of the connection member 350 can be disposed to correspond to a shape of the opening portion 310*o* of the enclosure 310. For example, the shape of the hole 350*o* of the connection member 350 can be a "+"-shape or a "*"-shape. For example, a shape of a hole 360*o* of the soft member 360 can be disposed to correspond to a shape of the opening portion 310*o* of the enclosure 310.

For example, the shape of the hole 360*o* of the soft member 360 can be a "+"-shape or a "*"-shape.

In FIGS. 17 and 18, the sound apparatus 30 according to another embodiment of the present disclosure can further include at least one of a connection member 350 described in FIGS. 14 to 15B and a soft member 360 described in FIG. 16. For example, the at least one of a hole 350*o* of the connection member 350 and a hole 360*o* of the soft member 360 can be disposed to correspond to a shape of the opening portion 310*o* of the enclosure 310. For example, the at least one of the hole 350*o* of the connection member 350 and the hole 360*o* of the soft member 360 can be a "+"-shape or a "*"-shape.

Figure 19:
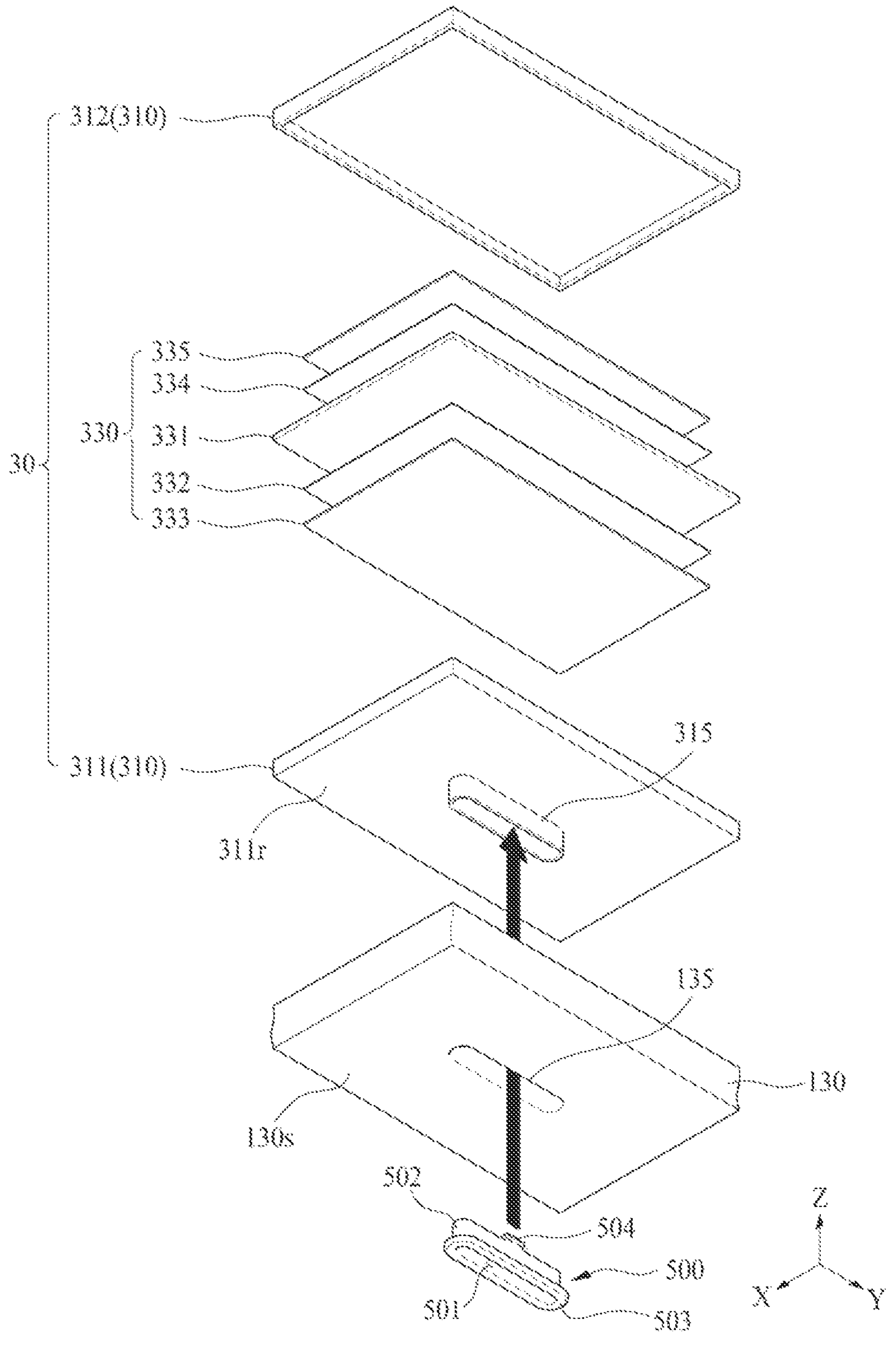
FIG. 19 illustrates a sound apparatus according to another embodiment of the present disclosure.
Figure 20:
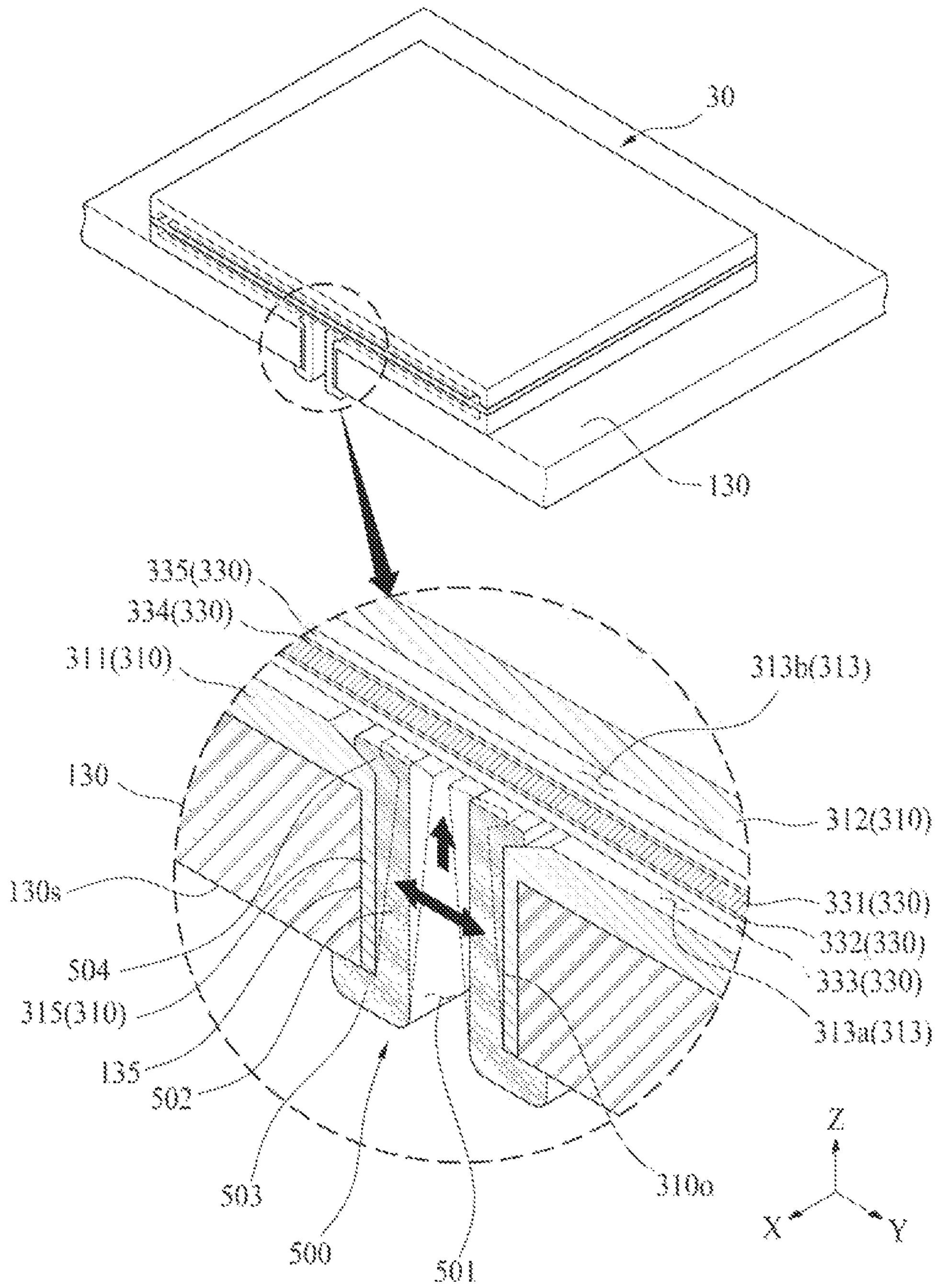
FIG. 20 illustrates a method of connecting a sound apparatus to a coupling part according to another embodiment of the present disclosure.

FIG. 19 illustrates a sound apparatus according to another embodiment of the present disclosure. FIG. 20 illustrates a method of connecting a sound apparatus to a coupling part according to another embodiment of the present disclosure.

With reference to FIGS. 19 and 20, a sound apparatus 30 according to another embodiment of the present disclosure can include an enclosure 310 and a sound generating module 330. Descriptions of the enclosure 310 and the sound generating module 330 can be substantially a same as the descriptions of FIGS. 3 to 10, and thus, like reference numerals refer to like elements and repeated descriptions are omitted.

According to another embodiment of the present disclosure, the enclosure 310 can include a protrusion portion 315. A first enclosure 311 can include the protrusion portion 315. The protrusion portion 315 can protrude from the first enclosure 311. The protrusion portion 315 can protrude from a rear surface (or an outer surface) 311*r* of the first enclosure 311.

For example, the first enclosure 311 can include an inner surface and an outer surface 311*r*. The inner surface of the first enclosure 311 can face a vibration member 331. The outer surface 311*r* of the first enclosure 311 can be a surface which is opposite to the inner surface of the first enclosure 311. For example, the protrusion portion 315 can protrude from the outer surface 311*r* of the first enclosure 311.

The sound apparatus 30 according to another embodiment of the present disclosure can include a coupling part 500 connected to a vehicle interior material 130. A description of the coupling part 500 can be substantially a same as the description of FIGS. 11 to 13B, and thus, like reference numerals refer to like elements and repeated descriptions are omitted or will be briefly given below.

With reference to FIGS. 11 and 19, the coupling part 500 can include a hollow portion 501. The hollow portion 501 can be connected or coupled to the protrusion portion 315. The protrusion portion 315 can surround an opening portion 310*o* of the enclosure 310. For example, the protrusion portion 315 can surround the opening portion 310*o* of the first enclosure 311. The protrusion portion 315 can include an opening hole corresponding (or connected) to the opening portion 310*o* of the first enclosure 311. For example, the hollow portion 501 can be connected to an internal space 313 of the enclosure 310 through the opening hole of the protrusion portion 315. For example, the hollow portion 501 can be connected to the internal space 313 of the enclosure 310 through the opening hole of the protrusion portion 315 and the opening portion 310*o*.

According to an embodiment of the present disclosure, the coupling part 500 can include a hollow member 502 and a latch member 503.

The hollow member 502 can include the hollow portion 501. The hollow member 502 can be inserted (or accommodated) into the protrusion portion 315. The hollow member 502 can be inserted (or accommodated) into the opening hole of the protrusion portion 315. The hollow member 502 can be inserted (or accommodated) into the protrusion portion 315 and can be connected or coupled to the opening portion 310*o* of the enclosure 310 or the first enclosure 311.

The latch member 503 can be connected to the hollow member 502. The latch member 503 can be configured to be coupled to a vehicle interior material 130 (or a mount object) equipped with the enclosure 310. For example, the latch member 503 can be configured to be coupled to the vehicle interior material 130 (or the mount object) equipped with the first enclosure 311.

For example, the vehicle interior material 130 (or the mount object) can include a first surface and a second surface different from (or opposite to) the first surface. The first surface can be a surface facing the enclosure 310. A hole 135 can be configured to pass through the first surface and the second surface. For example, the latch member 503 can be configured to pass through the hole 135 and can be configured to be coupled to the second surface (or an interior surface) 130*s* of the vehicle interior material 130 (or the mount object).

According to an embodiment of the present disclosure, the coupling part 500 can include a hook member 504.

The hook member 504 can pass through the vehicle interior material 130 (or the mount object) and the protrusion portion 315 and can be accommodated or inserted into the opening portion 310*o* of the first enclosure 311. The hook member 504 can be connected or coupled to the inner surface of the first enclosure 311. For example, the hook member 504 can be connected or coupled to the inner surface of the first enclosure 311 facing the sound generating module 330. For example, the hook member 504 can be connected or coupled to a slope surface 311*s* of the first enclosure 311.

With reference to FIGS. 11 and 19, the hook member 504 can be connected to a first side of the hollow member 502. The hook member 504 can be coupled to the inner surface or the slope surface 311*s* of the enclosure 310 facing the sound generating module 330. For example, the latch member 503 can be connected to a second side of the hollow member 502. The latch member 503 can be coupled to one surface (or an interior surface) 130*s* of the vehicle interior material 130 exposed at an indoor space of a vehicle.

With reference to FIG. 19, the coupling part 500 can be connected or coupled to the protrusion portion 315 of the enclosure 310 through the first hole 135 of the vehicle interior material 130 (an arrow direction). For example, the coupling part 500 can be connected or coupled to the protrusion portion 315 of the first enclosure 311 through the first hole 135 of the vehicle interior material 130.

FIG. 20 is an enlarged view of a portion where the sound apparatus 30 or the enclosure is connected or coupled to the vehicle interior material 130.

With reference to FIG. 20, the hook member 504 of the coupling part 500 can be connected or coupled to the protrusion portion 315 of the first enclosure 311. For example, the hollow member 502 of the coupling part 500 can be inserted (or accommodated) into the opening portion 310*o* of the first enclosure 311 (a vertical arrow direction), and thus, the hook member 504 of the coupling part 500 is pushed (or compressed) to a center (or an inner side) (a dotted-line direction) of the hollow portion 501 by an elastic force (a horizontal arrow direction) and can then be compressed and restored along the slope surface 311*s* of the first enclosure 311 by an elastic restoring force and can be connected or coupled to the protrusion portion 315 of the first enclosure 311. For example, the hook member 504 can be connected or coupled to the slope surface 311*s* of the first enclosure 311.

According to an embodiment of the present disclosure, the sound apparatus 30 can be connected or coupled to the vehicle interior material 130 by the coupling part 500. According to an embodiment of the present disclosure, the enclosure 310 can include the protrusion portion 315, and thus, the coupling part 500 can be easily connected or coupled to the protrusion portion 315. Accordingly, a connection process or a coupling process between the vehicle interior material 130 and the sound apparatus 30 can be simplified.

Figure 21:
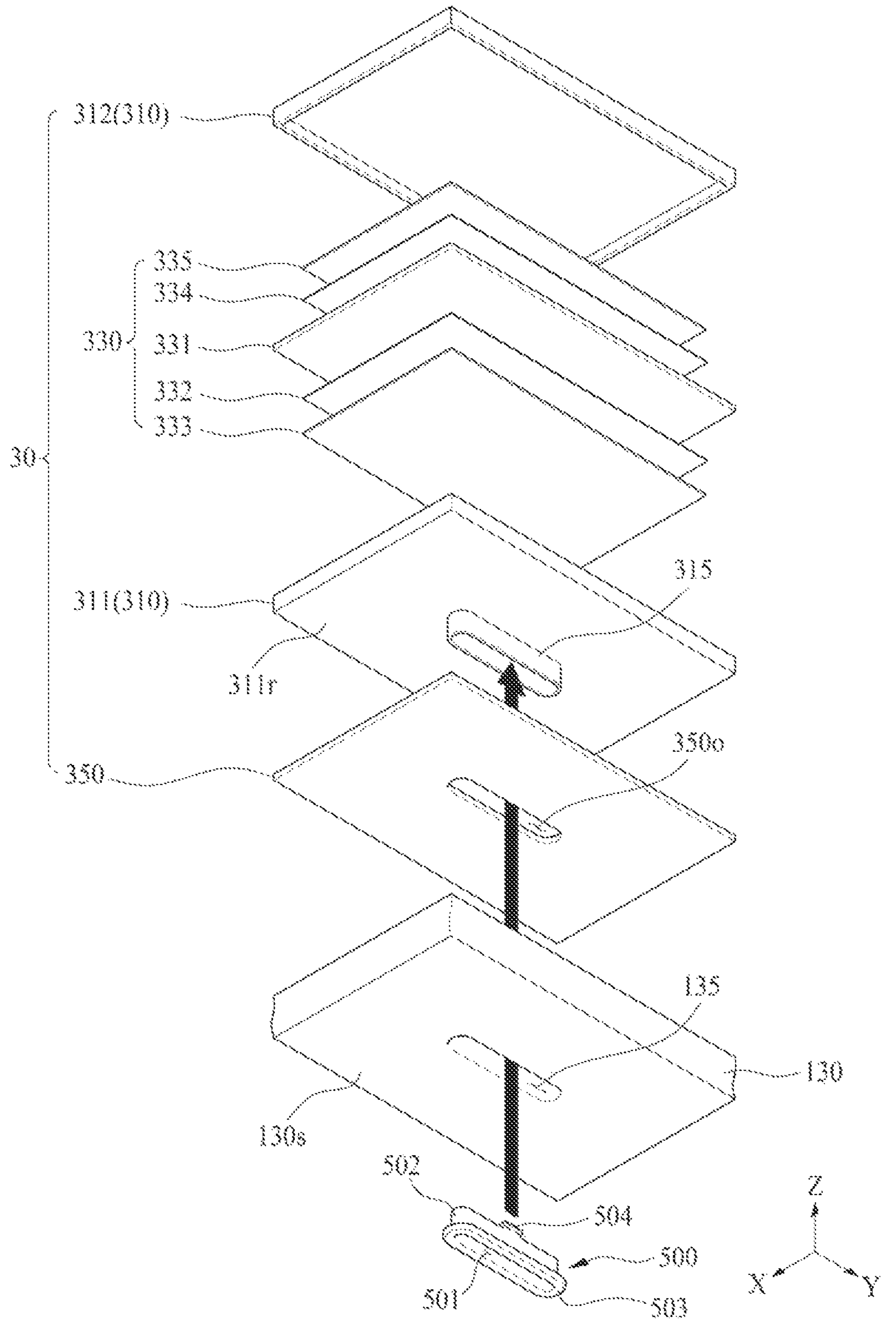
FIG. 21 illustrates a sound apparatus according to another embodiment of the present disclosure.

FIG. 21 illustrates a sound apparatus according to another embodiment of the present disclosure.

With reference to FIG. 21, a sound apparatus 30 according to another embodiment of the present disclosure can include an enclosure 310 and a sound generating module 330. Descriptions of the enclosure 310 and the sound generating module 330 can be substantially the same as the descriptions of FIGS. 3 to 10, and thus, like reference numerals refer to like elements and repeated descriptions are omitted.

The sound apparatus 30 according to another embodiment of the present disclosure can include a coupling part 500 connected to a vehicle interior material 130. A description of the coupling part 500 can be substantially a same as the description of FIGS. 19 and 20, and thus, like reference numerals refer to like elements and repeated descriptions are omitted or will be briefly given below.

According to an embodiment of the present disclosure, the enclosure 310 can include a protrusion portion 315. A description of the protrusion portion 315 can be substantially a same as the description of FIGS. 19 and 20, and thus, like reference numerals refer to like elements and repeated descriptions are omitted or will be briefly given below.

FIG. 21 illustrates an embodiment where a connection member is additionally provided in the sound apparatus described above with reference to FIGS. 19 and 20.

According to another embodiment of the present disclosure, the sound apparatus 30 can further include a connection member 350.

The connection member 350 can be disposed between the vehicle interior material 130 and the enclosure 310. The connection member 350 can be disposed between the vehicle interior material 130 and a first enclosure 311. The connection member 350 can further include a second hole (or a hole) 350*o*. For example, the second hole 350*o* can be between the first hole 135 of the vehicle interior material 130 and the protrusion portion 315 of the enclosure 310. For example, the second hole 350*o* can be between the first hole 135 of the vehicle interior material 130 and the protrusion portion 315 of the first enclosure 311. The second hole 350*o* can be connected to the protrusion portion 315 of the enclosure 310. The second hole 350*o* can be connected to the protrusion portion 315 of the first enclosure 311. The second hole 350*o* can be disposed to correspond to the protrusion portion 315.

With reference to FIG. 21, the coupling part 500 can be connected or coupled to the sound apparatus 30 through the first hole 135 of the vehicle interior material 130, the second hole 350*o* of the connection member, and the protrusion portion 315 of the enclosure 310 (an arrow direction). For example, the coupling part 500 can be connected or coupled to the sound apparatus 30 through the first hole 135 of the vehicle interior material 130, the second hole 350*o* of the connection member 350, and the protrusion portion 315 of the first enclosure 311 (an arrow direction).

According to an embodiment of the present disclosure, the sound apparatus 30 can be connected or coupled to the vehicle interior material 130 by the coupling part 500. According to an embodiment of the present disclosure, the enclosure 310 can include the protrusion portion 315, and thus, the coupling part 500 can be easily connected or coupled to the protrusion portion 315. Accordingly, a connection process or a coupling process between the vehicle interior material 130 and the sound apparatus 30 can be simplified.

In FIG. 21, the sound apparatus 30 according to another embodiment of the present disclosure can further include a soft member 360 described in FIG. 16. The soft member 360 can be between the vehicle interior material 130 and the connection member 350. The soft member 360 can include a third hole (or a hole) 360*o*. For example, third hole 360*o* can be between the first hole 135 of the vehicle interior material 130 and the second hole 350*o* of the connection member 350. The third hole 350*o* can be connected to the protrusion portion 315 of the enclosure 310 through the second hole 350*o* of the connection member 350. For example, the third hole 350*o* can be connected to the protrusion portion 315 of the first enclosure 311 through the second hole 350*o* of the connection member 350. For example, the third hole 360*o* can be disposed to correspond to the protrusion portion 315 of the first enclosure 311. For example, the coupling part 500 can be connected or coupled to the sound apparatus 30 through the first hole 135 of the vehicle interior material 130, the second hole 350*o* of the connection member 350, the third hole 360*o* of the soft member 360, and the protrusion portion 315 of the enclosure 310. For example, the coupling part 500 can be connected or coupled to the sound apparatus 30 through the first hole 135 of the vehicle interior material 130, the second hole 350*o* of the connection member 350, the third hole 360*o* of the soft member 360, and the protrusion portion 315 of the first enclosure 311.

In FIG. 21, the sound apparatus 30 according to another embodiment of the present disclosure can further include at least one of a connection member 350 described in FIGS. 14 to 15B and a soft member 360 described in FIG. 16. For example, the at least one of a second hole 350*o* of the connection member 350 and a third hole 360*o* of the soft member 360 can be disposed to correspond to the protrusion portion 315 of the enclosure 310. For example, the at least one of a second hole 350*o* of the connection member 350 and a third hole 360*o* of the soft member 360 can be disposed to correspond to the protrusion portion 315 of the first enclosure 311.

Figure 22:
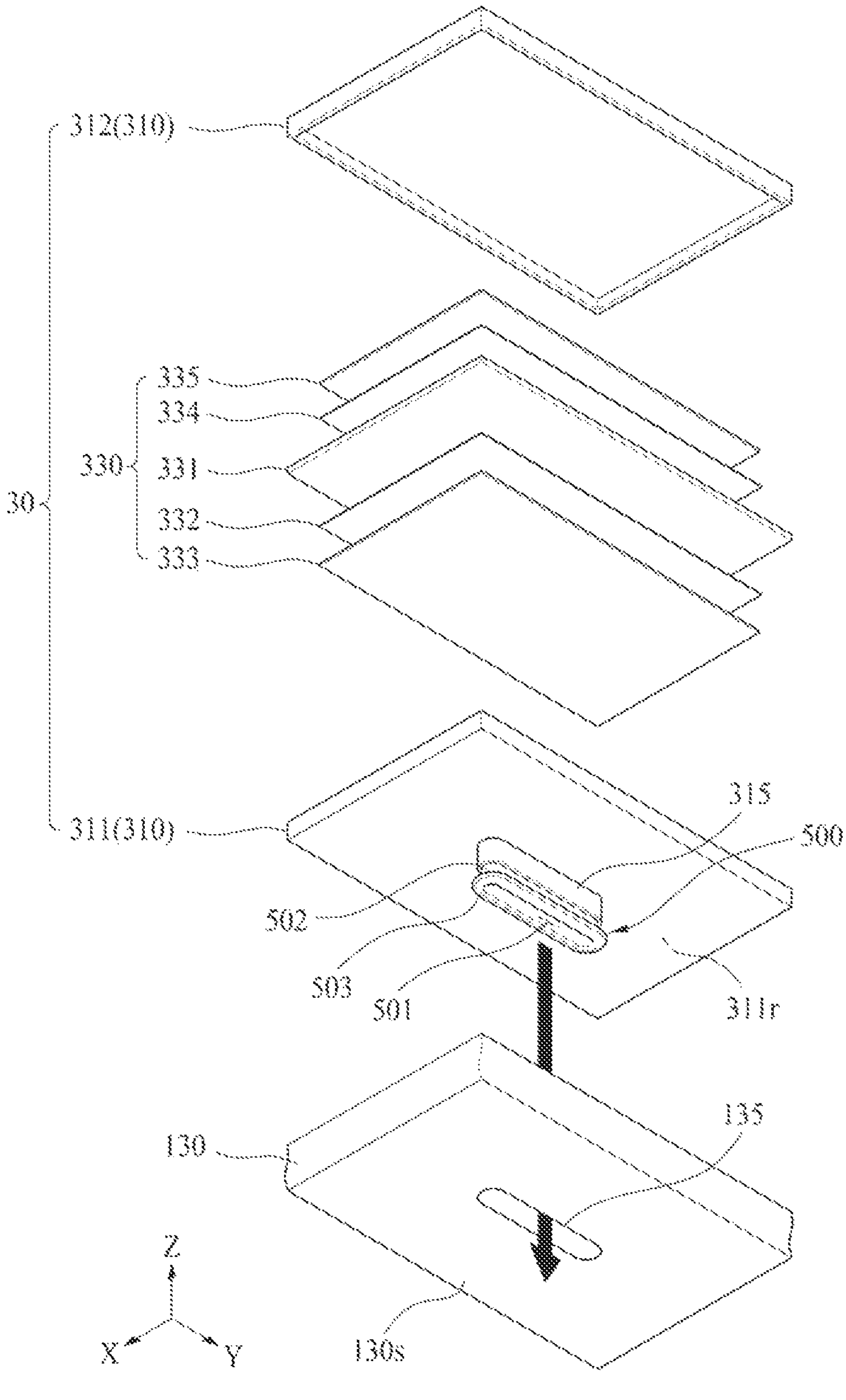
FIG. 22 illustrates a sound apparatus according to another embodiment of the present disclosure.
Figure 23A:
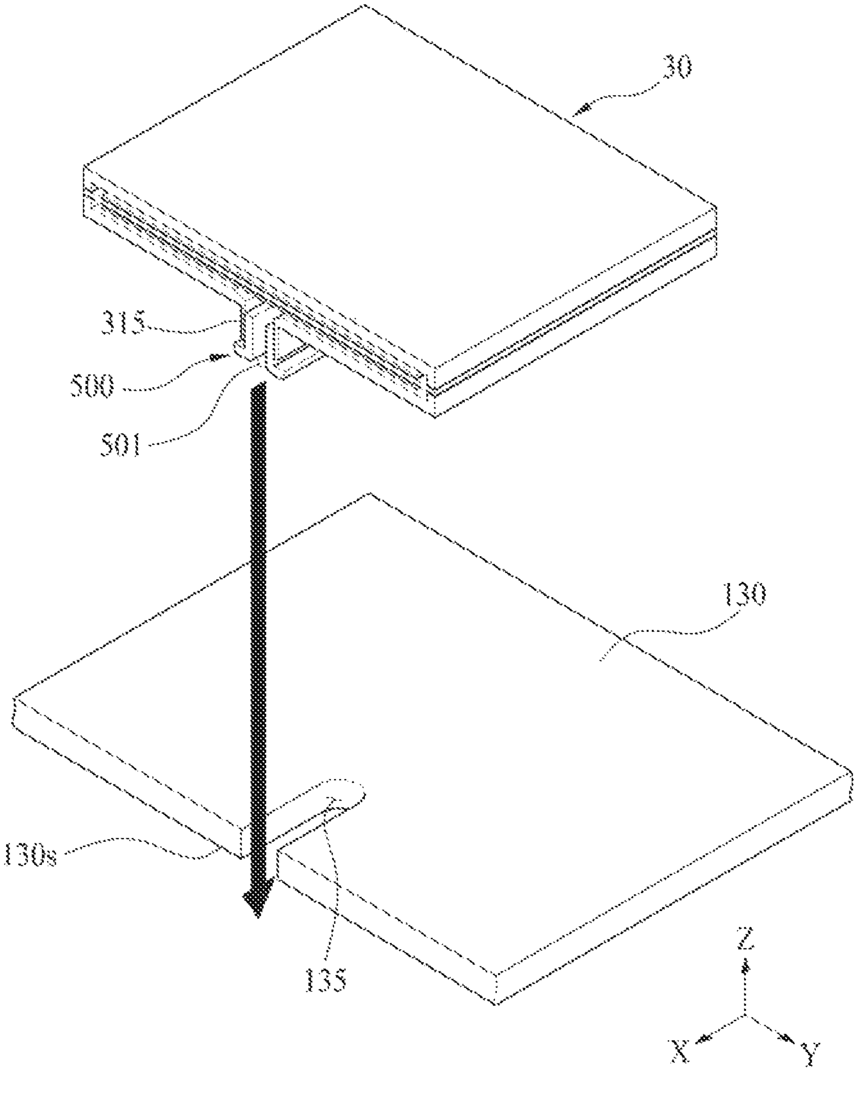
FIG. 23A illustrates a method of connecting a sound apparatus to a coupling part according to another embodiment of the present disclosure.
Figure 23B:
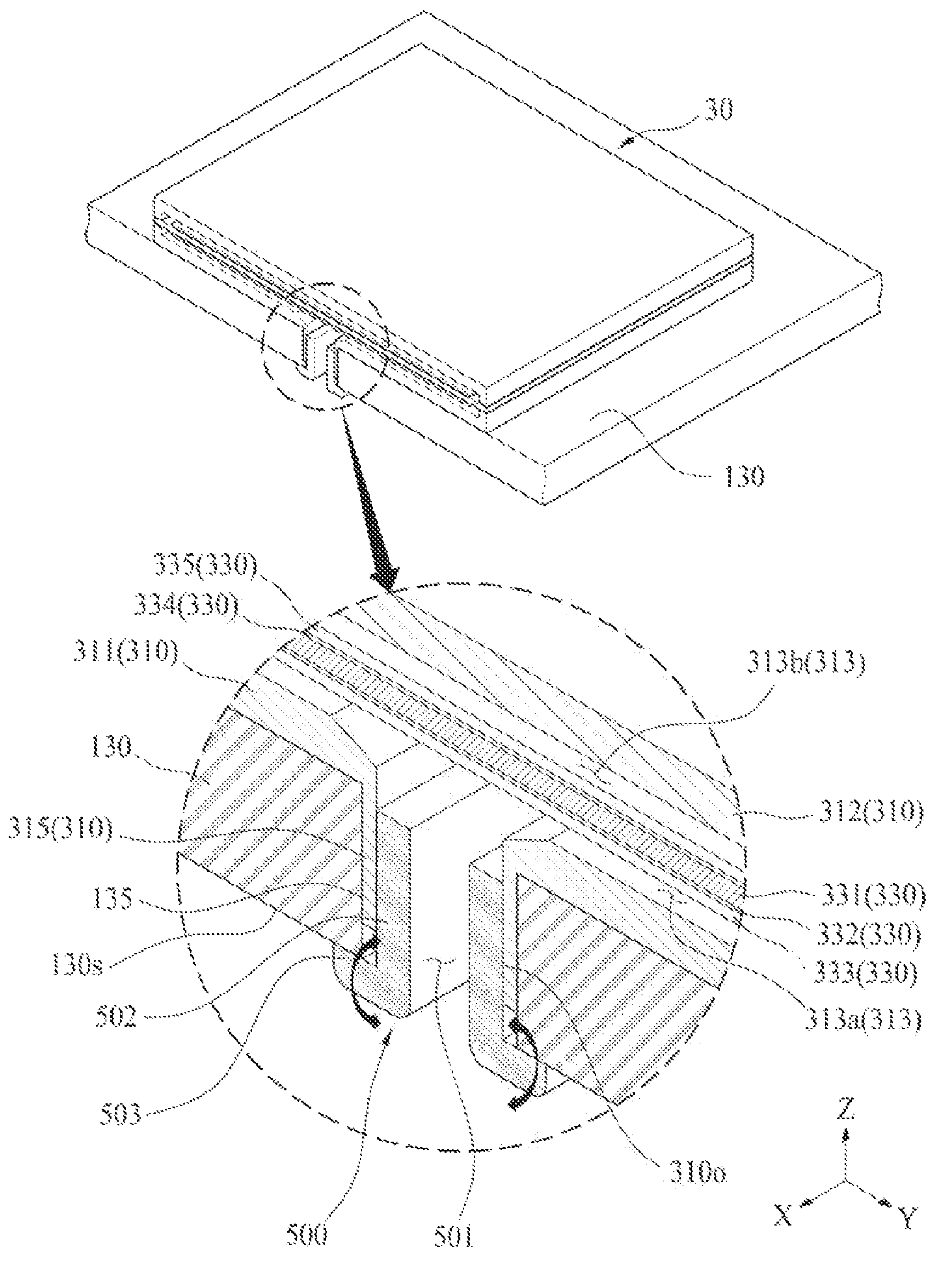
FIG. 23B illustrates a method of connecting a sound apparatus to a coupling part according to another embodiment of the present disclosure.

FIG. 22 illustrates a sound apparatus according to another embodiment of the present disclosure. FIGS. 23A and 23B illustrate a method of connecting a sound apparatus to a coupling part illustrated in FIG. 22 according to another embodiment of the present disclosure.

With reference to FIGS. 22 to 23B, a sound apparatus 30 according to another embodiment of the present disclosure can include an enclosure 310 and a sound generating module 330. Descriptions of the enclosure 310 and the sound generating module 330 can be substantially a same as the descriptions of FIGS. 3 to 10, and thus, like reference numerals refer to like elements and repeated descriptions are omitted.

According to another embodiment of the present disclosure, the enclosure 310 can include a protrusion portion 315. A first enclosure 311 can include the protrusion portion 315. The protrusion portion 315 can protrude from a rear surface (or an outer surface) 311*r* of the first enclosure 311.

For example, the first enclosure 311 can include an inner surface and an outer surface 311*r*. The inner surface of the first enclosure 311 can face a vibration member 331. The outer surface 311*r* of the first enclosure 311 can be a surface which is opposite to the inner surface of the first enclosure 311. For example, the protrusion portion 315 can protrude from the outer surface 311*r* of the first enclosure 311.

The sound apparatus 30 according to another embodiment of the present disclosure can include a coupling part 500 connected to a vehicle interior material 130. A description of the coupling part 500 can be substantially a same as the description of FIGS. 11 to 13B, and thus, like reference numerals refer to like elements and repeated descriptions are omitted or will be briefly given below.

With reference to FIGS. 11 and 22, the coupling part 500 can include a hollow portion 501. The hollow portion 501 can be connected or coupled to the protrusion portion 315. The protrusion portion 315 can surround an opening portion 310*o* of the enclosure 310. For example, the protrusion portion 315 can surround the opening portion 310*o* of the first enclosure 311. The protrusion portion 315 can include an opening hole corresponding (or connected) to the opening portion 310*o* of the first enclosure 311. For example, the hollow portion 501 can be connected to an internal space 313 of the enclosure 310 through the opening hole of the protrusion portion 315. For example, the hollow portion 501 can be connected to the internal space 313 of the enclosure 310 through the opening hole of the protrusion portion 315 and the opening portion 310*o*.

According to an embodiment of the present disclosure, the coupling part 500 can include a hollow member 502 and a latch member 503.

The hollow member 502 can include the hollow portion 501. The hollow member 502 can be inserted (or accommodated) into the protrusion portion 315. The hollow member 502 can be inserted (or accommodated) into the opening hole of the protrusion portion 315. The hollow member 502 can be inserted (or accommodated) into the protrusion portion 315 and can be connected or coupled to the opening portion 310*o* of the enclosure 310 or the first enclosure 311.

The latch member 503 can be connected to the hollow member 502. The latch member 503 can be configured to be coupled to a vehicle interior material 130 (or a mount object) equipped with the enclosure 310. For example, the latch member 503 can be configured to be coupled to the vehicle interior material 130 (or the mount object) equipped with the first enclosure 311.

The vehicle interior material 130 (or the mount object) can include a first surface and a second surface different from (or opposite to) the first surface. The first surface can be a surface facing the enclosure 310. A hole 135 can be configured to pass through the first surface and the second surface. For example, the latch member 503 can be configured to pass through the hole 135 and can be configured to be coupled to the second surface (or an interior surface) 130*s* of the vehicle interior material 130 (or the mount object).

The latch member 503 can be configured as a flexible material, but embodiments of the present disclosure are not limited thereto. For example, the latch member 503 can be configured as rubber, but embodiments of the present disclosure are not limited thereto.

With reference to FIG. 22, the coupling part 500 can be connected or coupled to the protrusion portion 315. Thus, the coupling part 500 can be configured (or integrated) as one body with the protrusion portion 315. For example, the coupling part 500 and the protrusion portion 315 can be configured by a double injection process using different materials, but embodiments of the present disclosure are not limited thereto. According to an embodiment of the present disclosure, the coupling part 500 and the protrusion portion 315 can be configured as one part (or one component), thereby realizing an effect of uni-materialization.

The coupling part 500 and the protrusion portion 315 can be connected or coupled to the vehicle interior material 130 through the hollow portion 501 (an arrow direction).

With reference to FIG. 23A, the coupling part 500 and the protrusion portion 315 can be connected or coupled to the first hole 135 of the vehicle interior material 130 through the hollow portion 501 (an arrow direction).

FIG. 23B is an enlarged view of a portion where the sound apparatus 30 or the enclosure is coupled or coupled to the vehicle interior material 130.

With reference to FIG. 23B, the coupling part 500 and the protrusion portion 315 can be connected or coupled to the first hole 135 of the vehicle interior material 130. The latch member 503 can be configured as the flexible material, and thus, a sound generating module 330 or the sound apparatus 30 can be connected or coupled to the first hole 135 of the vehicle interior material 130 by the movement (an arrow direction) of the latch member 503.

According to an embodiment of the present disclosure, the sound apparatus 30 can be connected or coupled to the vehicle interior material 130 by the coupling part 500. According to an embodiment of the present disclosure, in the enclosure 310, the protrusion portion 315 can be configured (or integrated) as one body with the coupling part 500, and thus, a connection process or a coupling process between the vehicle interior material 130 and the sound apparatus 30 can be simplified. According to an embodiment of the present disclosure, the protrusion portion 315 and the coupling part 500 can be configured as one part (or one component), thereby realizing an effect of uni-materialization.

Figure 24:
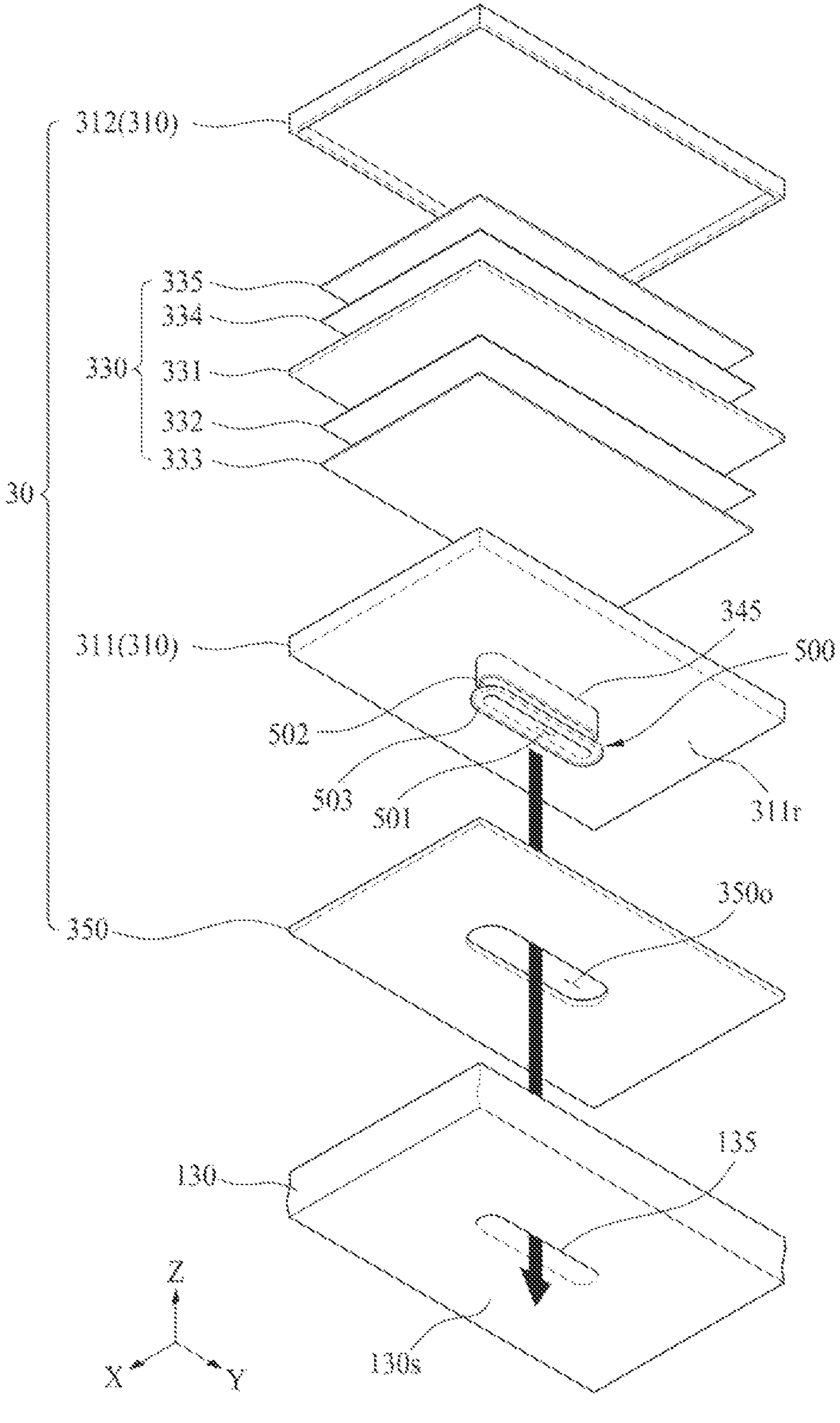
FIG. 24 illustrates a sound apparatus according to another embodiment of the present disclosure.

FIG. 24 illustrates a sound apparatus according to another embodiment of the present disclosure.

With reference to FIG. 24, a sound apparatus 30 according to another embodiment of the present disclosure can include an enclosure 310 and a sound generating module 330. Descriptions of the enclosure 310 and the sound generating module 330 can be substantially a same as the descriptions of FIGS. 3 to 10, and thus, like reference numerals refer to like elements and repeated descriptions are omitted.

The sound apparatus 30 according to another embodiment of the present disclosure can include a coupling part 500 connected to a vehicle interior material 130. A description of the coupling part 500 can be substantially a same as the description of FIGS. 11 to 13B, and thus, like reference numerals refer to like elements and repeated descriptions are omitted or will be briefly given below.

FIG. 24 illustrates an embodiment where a connection member is additionally provided in the sound apparatus described above with reference to FIGS. 22 to 23B.

According to another embodiment of the present disclosure, the sound apparatus 30 can further include a connection member 350.

The connection member 350 can be disposed between the vehicle interior material 130 and the enclosure 310. The connection member 350 can be disposed between the vehicle interior material 130 and a first enclosure 311. The connection member 350 can further include a second hole (or a hole) 350*o*. For example, the second hole 350*o* can be between the first hole 135 of the vehicle interior material 130 and the protrusion portion 315 of the enclosure 310. For example, the second hole 350*o* can be between the first hole 135 of the vehicle interior material 130 and the protrusion portion 315 of the first enclosure 311. For example, the second hole 350*o* can be between the first hole 135 of the vehicle interior material 130 and the coupling part 500. The second hole 350*o* can be connected to the coupling part 500. For example, the second hole 350*o* can be connected to the protrusion portion 315 of the first enclosure 311 and the coupling part 500. The coupling part 500 and the protrusion portion 315 can be connected or coupled to the first hole 135 of the vehicle interior material 130 through the second hole 350*o* of the connection member 350 and the hollow portion 501 (an arrow direction).

According to an embodiment of the present disclosure, the sound apparatus 30 can be connected or coupled to the vehicle interior material 130 by the coupling part 500. According to an embodiment of the present disclosure, in the enclosure 310, the protrusion portion 315 can be configured (or integrated) as one body with the coupling part 500, and thus, a connection process or a coupling process between the vehicle interior material 130 and the sound apparatus 30 can be simplified. According to an embodiment of the present disclosure, the protrusion portion 315 and the coupling part 500 can be configured as one part (or one component), thereby realizing an effect of uni-materialization.

In FIG. 24, the sound apparatus 30 according to another embodiment of the present disclosure can further include a soft member 360 described in FIG. 16. The soft member 360 can be between the vehicle interior material 130 and the connection member 350. The soft member 360 can include a third hole (or a hole) 360*o*. For example, third hole 360*o* can be between the first hole 135 of the vehicle interior material 130 and the second hole 350*o* of the connection member 350. The third hole 360*o* can be disposed to correspond to the protrusion portion 315 of the enclosure 310. For example, the third hole 360*o* of the soft member 360 can be disposed to correspond to the protrusion portion 315 of the first enclosure 311. The third hole 350*o* can be connected to the protrusion portion 315 of the enclosure 310 through the second hole 350*o* of the connection member 350. For example, the third hole 350*o* can be connected to the protrusion portion 315 of the first enclosure 311 through the second hole 350*o* of the connection member 350. For example, the third hole 350*o* can be connected to the protrusion portion 315 of the first enclosure 311 and the coupling part 500 through the second hole 350*o* of the connection member 350. For example, the coupling part 500 and the protrusion portion 315 can be connected or coupled to the first hole 135 of the vehicle interior material 130 through the second hole 350*o* of the connection member 350, the third hole 360*o* of the soft member 360, and the hollow portion 501.

In FIG. 24, the sound apparatus 30 according to another embodiment of the present disclosure can further include at least one of a connection member 350 described in FIGS. 14 to 15B and a soft member 360 described in FIG. 16. For example, the at least one of a second hole 350*o* of the connection member 350 and a third hole 360*o* of the soft member 360 can be disposed to correspond to the protrusion portion 315 of the enclosure 310. For example, the at least one of a second hole 350*o* of the connection member 350 and a third hole 360*o* of the soft member 360 can be disposed to correspond to the protrusion portion 315 of the first enclosure 311. For example, the at least one of a second hole 350*o* of the connection member 350 and a third hole 360*o* of the soft member 360 can be disposed to correspond to the protrusion portion 315 of the first enclosure 311. For example, the at least one of a second hole 350*o* of the connection member 350 and a third hole 360*o* of the soft member 360 can be disposed to correspond to the protrusion portion 315 of the first enclosure 311 and the coupling part 500. For example, the coupling part 500 and the protrusion portion 315 can be connected or coupled to the first hole 135 of the vehicle interior material 130 through the hollow portion 501 and at least one of the second hole 350*o* of the connection member 350 and the third hole 360*o* of the soft member 360.

Figure 25:
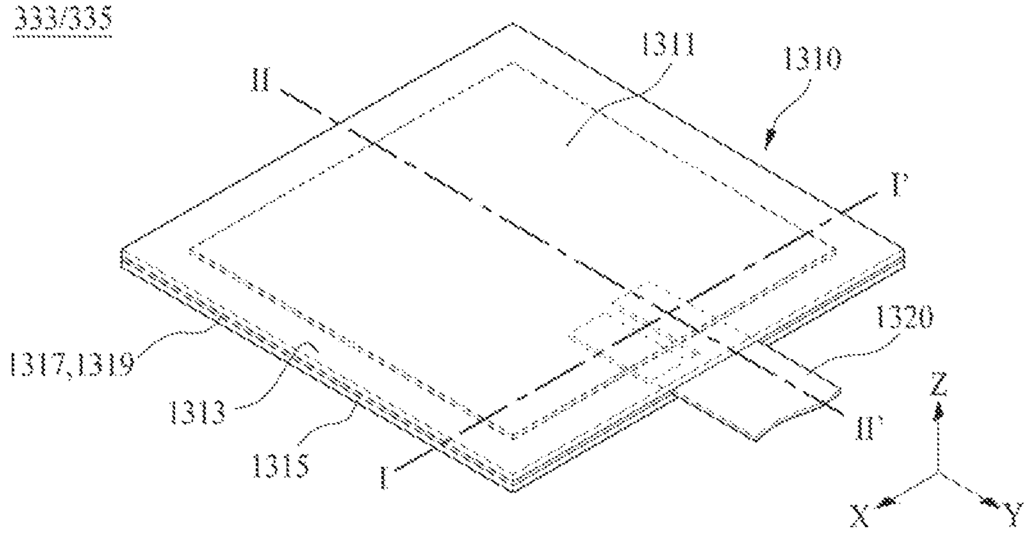
FIG. 25 illustrates a vibration apparatus according to an embodiment of the present disclosure.
Figure 26:
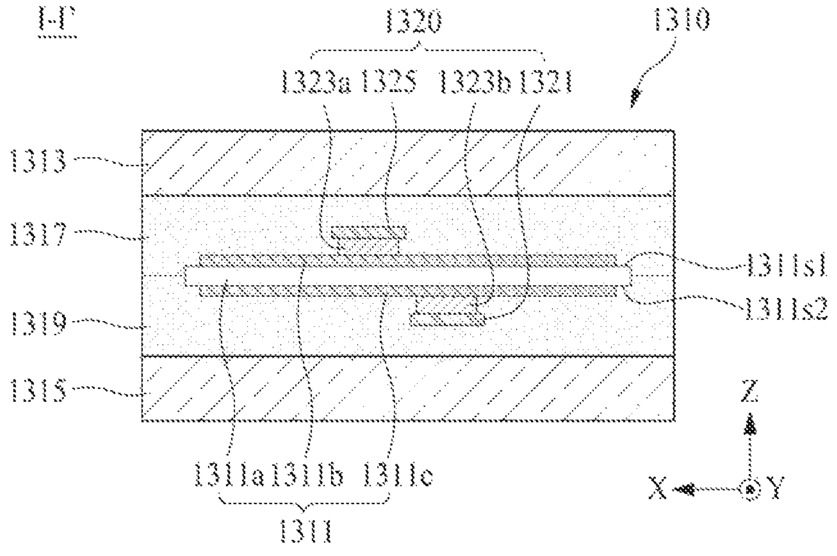
FIG. 26 is a cross-sectional view taken along line I-I' illustrated in FIG. 25 according to an embodiment of the present disclosure.
Figure 27:
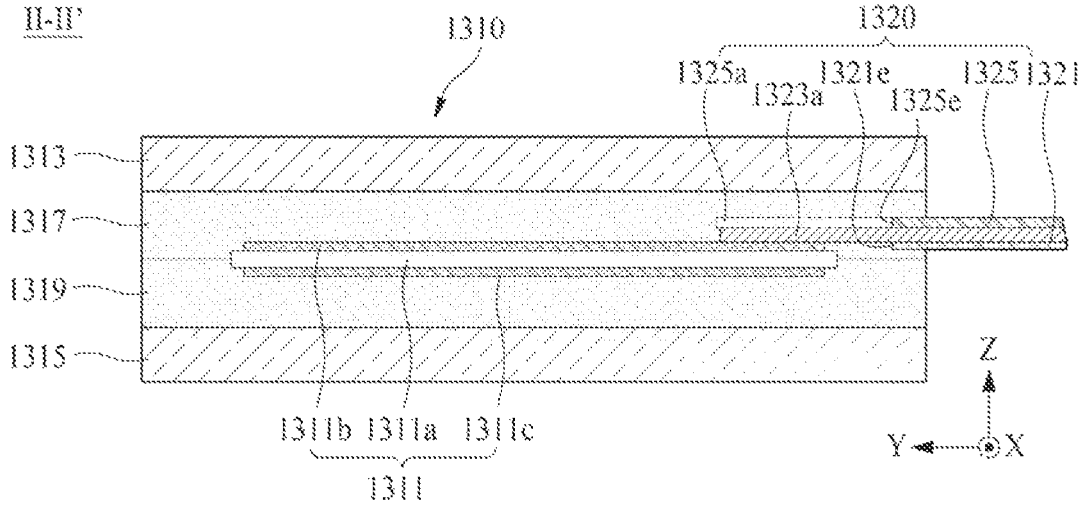
FIG. 27 is a cross-sectional view taken along line II-II' illustrated in FIG. 25 according to an embodiment of the present disclosure.

FIG. 25 illustrates a vibration apparatus according to an embodiment of the present disclosure. FIG. 26 is a cross-sectional view taken along line I-I' illustrated in FIG. 25 according to an embodiment of the present disclosure. FIG. 27 is a cross-sectional view taken along line II-II' illustrated in FIG. 25 according to an embodiment of the present disclosure.

With reference to FIGS. 25 to 27, a sound generating module 330 according to an embodiment of the present disclosure can include a vibration apparatus 333 and 335. The vibration apparatus 333 and 335 can include one or more vibration generator 1310.

The vibration generator 1310 can include a piezoelectric material having a piezoelectric characteristic. The vibration generator 1310 can vibrate (or displace or drive) a vibration member (or a vehicle interior material) based on a vibration (or displacement or driving) of the piezoelectric material based on an electric signal (or a voice signal or a sound signal) applied to the piezoelectric material. For example, the vibration generator 1310 can alternately repeat contraction and/or expansion by a piezoelectric effect (or a piezoelectric characteristic) to vibrate (or displace or drive). For example, the vibration generator 1310 can vibrate (or displace or drive) in a vertical direction (or a thickness direction) Z as contraction and/or expansion are alternately repeated by an inverse piezoelectric effect.

The vibration generator 1310 can be configured as a ceramic-based piezoelectric material capable of implementing a relatively strong vibration, or can be configured as a piezoelectric ceramic having a perovskite-based crystal structure. For example, the vibration generator 1310 can be a vibration generating device, a vibration film, a vibration generating film, a vibrator, an active vibrator, an active vibration generator, an actuator, an exciter, a film actuator, a film exciter, an ultrasonic actuator, or an active vibration member, or the like, but embodiments of the present disclosure are not limited thereto.

The vibration generator 1310 according to an embodiment of the present disclosure can include a vibration generating part 1311.

The vibration generating part 1311 can be configured to vibrate by the piezoelectric effect based on a driving signal. For example, the vibration generating part 1311 can include a piezoelectric type vibration part or a piezoelectric vibration part. The vibration generating part 1311 can include at least one or more of a piezoelectric inorganic material and a piezoelectric organic material. For example, the vibration generating part 1311 can be a vibration device, a piezoelectric device, a piezoelectric device part, a piezoelectric device layer, a piezoelectric structure, a piezoelectric vibration portion, or a piezoelectric vibration layer, or the like, but embodiments of the present disclosure are not limited thereto.

The vibration generating part 1311 according to an embodiment of the present disclosure can include a vibration portion 1311*a*, a first electrode portion 1311*b*, and a second electrode portion 1311*c*.

The vibration portion 1311*a* can include a piezoelectric material or an electroactive material which includes a piezoelectric effect. For example, the piezoelectric material can have a characteristic in which, when pressure or twisting phenomenon is applied to a crystalline structure by an external force, a potential difference occurs due to dielectric polarization caused by a relative position change of a positive (+) ion and a negative (−) ion, and thus a vibration is generated by an electric field based on a reverse voltage applied thereto. For example, the vibration portion 1311*a* can be a piezoelectric layer, a piezoelectric material layer, an electroactive layer, a piezoelectric composite layer, a piezoelectric composite, or a piezoelectric ceramic composite, or the like, but embodiments of the present disclosure are not limited thereto.

The vibration portion 1311*a* can be configured as a ceramic-based material capable of implementing a relatively strong vibration, or can be configured as a piezoelectric ceramic having a perovskite-based crystalline structure. The perovskite crystalline structure can have a piezoelectric effect and/or an inverse piezoelectric effect and can be a plate-shaped structure having orientation or alignment. The perovskite crystalline structure can be represented by a chemical formula "$ABO_3$". In the chemical formula, "A" can include a divalent metal element, and "B" can include a tetravalent metal element. As an embodiment of the present disclosure, in the chemical formula "$ABO_3$", "A", and "B" can be cations, and "O" can be anions. For example, the vibration portion 1311*a* can include at least one or more of lead titanate ($PbTiO_3$), lead zirconate ($PbZrO_3$), lead zirconate titanate ($PbZrTiO_3$), barium titanate ($BaTiO_3$), and strontium titanate ($SrTiO_3$), but embodiments of the present disclosure are not limited thereto.

The piezoelectric ceramic can be configured as a single crystalline ceramic having a crystalline structure, or can be configured as a ceramic material having a polycrystalline structure or polycrystalline ceramic. A piezoelectric material including the single crystalline ceramic can include $\alpha$-$AlPO_4$, $\alpha$-$SiO_2$, $LiNbO_3$, $Tb_2(MoO_4)_3$, $Li_2B_4O_7$, or ZnO, but embodiments of the present disclosure are not limited thereto. A piezoelectric material including the polycrystalline ceramic can include a lead zirconate titanate (PZT)-based material, including lead (Pb), zirconium (Zr), and titanium (Ti), or can include a lead zirconate nickel niobate (PZNN)-based material, including lead (Pb), zirconium (Zr), nickel (Ni), and niobium (Nb), but embodiments of the present disclosure are not limited thereto. For example, the vibration portion 1311*a* can include at least one or more of calcium titanate ($CaTiO_3$), $BaTiO_3$, and $SrTiO_3$, without lead (Pb), but embodiments of the present disclosure are not limited thereto.

The first electrode portion 1311*b* can be disposed at a first surface (or an upper surface or a front surface) 1311*s*1 of the vibration portion 1311*a*. The first electrode portion 1311*b* can have a same size as the vibration portion 1311*a*, or can have a size which is smaller than the vibration portion 1311*a*.

The second electrode portion 1311*c* can be disposed at a second surface (or a lower surface or a rear surface) 1311*s*2 which is opposite to or different from the first surface 1311*s*1 of the vibration portion 1311*a*. The second electrode portion 1311*c* can have a same size as the vibration portion 1311*a*, or can have a size which is smaller than the vibration portion 1311*a*. For example, the second electrode portion 1311*c* can have a same shape as the vibration portion 1311*a*, but embodiments of the present disclosure are not limited thereto.

According to an embodiment of the present disclosure, in order to prevent electrical short circuit between the first electrode portion 1311*b* and the second electrode portion 1311*c*, each of the first electrode portion 1311*b* and the second electrode portion 1311*c* can be formed at a remaining portion except a periphery portion of the vibration portion 1311*a*. For example, the first electrode portion 1311*b* can be formed at an entire remaining portion except a periphery portion of the first surface 1311*s*1 of the vibration portion 1311*a*. For example, the second electrode portion 1311*c* can be formed at an entire remaining portion except a periphery portion of the second surface 1311*s*2 of the vibration portion 1311*a*. For example, a distance between a lateral surface (or a sidewall) of each of the first electrode portion 1311*b* and the second electrode portion 1311*c* and a lateral surface (or a sidewall) of the vibration portion 1311*a* can be at least 0.5 mm or more. For example, the distance between the lateral surface of each of the first electrode portion 1311*b* and the second electrode portion 1311*c* and the lateral surface of the vibration portion 1311*a* can be at least 1 mm or more, but embodiments of the present disclosure are not limited thereto.

One or more of the first electrode portion 1311*b* and the second electrode portion 1311*c* according to an embodiment of the present disclosure can be formed of a transparent conductive material, a semitransparent conductive material, or an opaque conductive material. For example, the transparent conductive material or the semitransparent conductive material can include indium tin oxide (ITO) or indium zinc oxide (IZO), but embodiments of the present disclosure are not limited thereto. The opaque conductive material can include gold (Au), silver (Ag), platinum (Pt), palladium (Pd), molybdenum (Mo), magnesium (Mg), carbon, or silver (Ag) including glass frit, or the like, or can be made of an alloy thereof, but embodiments of the present disclosure are not limited thereto. For example, to enhance an electrical characteristic and/or a vibration characteristic of the vibration portion 1311*a*, each of the first electrode portion 1311*b* and the second electrode portion 1311*c* can include silver (Ag) having a low resistivity. For example, the carbon can include one or more of carbon black, ketjen black, carbon nanotube, and a carbon material including graphite, but embodiments of the present disclosure are not limited thereto.

The vibration portion 1311*a* can be polarized (or poling) by a certain voltage applied to the first electrode portion 1311*b* and the second electrode portion 1311*c* in a certain temperature atmosphere, or a temperature atmosphere that can be changed from a high temperature to a room temperature, but embodiments of the present disclosure are not limited thereto. For example, a polarization direction (or a poling direction) formed in the vibration portion 1311*a* can be formed or aligned (or arranged) from the first electrode portion 1311*b* to the second electrode portion 1311*c*, but embodiments of the present disclosure are not limited thereto. For example, the polarization direction (or the poling direction) formed in the vibration portion 1311*a* can be formed or aligned (or arranged) from the second electrode portion 1311*c* to the first electrode portion 1311*b*.

The vibration portion 1311*a* can alternately and repeatedly contract and/or expand by an inverse piezoelectric effect based on a driving signal applied to the first electrode portion 1311*b* and the second electrode portion 1311*c* from the outside to vibrate. For example, the vibration portion 1311*a* can vibrate in a vertical direction (or thickness direction) and in a planar direction by the signal applied to the first electrode portion 1311*b* and the second electrode portion 1311*c*. The vibration portion 1311*a* can be displaced (or vibrated or driven) by contraction and/or expansion of the planar direction, thereby improving a sound characteristic and/or a sound pressure level characteristic of the vibration generator 1310.

The vibration generator 1310 according to an embodiment of the present disclosure can further include a first cover member 1313 and a second cover member 1315.

The first cover member 1313 can be disposed at a first surface of the vibration generating part 1311. For example, the first cover member 1313 can be configured to cover the first electrode portion 1311*b* of the vibration generating part 1311. For example, the first cover member 1313 can be at the first electrode portion 1311*b*. For example, the first cover member 1313 can be configured to have a larger size than the vibration generating part 1311. The first cover member 1313 can be configured to protect the first surface of the vibration generating part 1311 and the first electrode portion 1311*b*.

The second cover member 1315 can be disposed at a second surface of the vibration generating part 1311. For example, the second cover member 1315 can be configured to cover the second electrode portion 1311*c* of the vibration generating part 1311. For example, the second cover member 1315 can be at the second electrode portion 1311*c*. For example, the second cover member 1315 can be configured to have a larger size than the vibration generating part 1311 and can be configured to have a same size as the first cover member 1313. The second cover member 1315 can be configured to protect the second surface of the vibration generating part 1311 and the second electrode portion 1311*c*.

The first cover member 1313 and the second cover member 1315 according to an embodiment of the present disclosure can include a same material or a different material. For example, each of the first cover member 1313 and the second cover member 1315 can be a polyimide (PI) film, a polyethylene terephthalate (PET) film, or a polyethylene naphthalate (PEN) film, but embodiments of the present disclosure are not limited thereto.

The first cover member 1313 can be connected or coupled to the first surface of the vibration generating part 1311 or the first electrode portion 1311*b* by a first adhesive layer 1317. For example, the first cover member 1313 can be connected or coupled to the first surface of the vibration generating part 1311 or the first electrode portion 1311*b* by a film laminating process using the first adhesive layer 1317.

The second cover member 1315 can be connected or coupled to the second surface of the vibration generating part 1311 or the second electrode portion 1311*c* by a second adhesive layer 1319. For example, the second cover member 1315 can be connected or coupled to the second surface of the vibration generating part 1311 or the second electrode portion 1311*c* by a film laminating process using the second adhesive layer 1319.

Each of the first adhesive layer 1317 and second adhesive layer 1319 according to an embodiment of the present disclosure can include an electrically insulating material which has adhesiveness and is capable of compression and decompression. For example, each of the first adhesive layer 1317 and the second adhesive layer 1319 can include an epoxy resin, an acrylic resin, a silicone resin, or a urethane resin, but embodiments of the present disclosure are not limited thereto.

The first adhesive layer 1317 and second adhesive layer 1319 can be configured between the first cover member 1313 and the second cover member 1315 to surround the vibration generating part 1311. For example, one or more of the first adhesive layer 1317 and second adhesive layer 1319 can be configured to surround the vibration generating part 1311.

Any one of the first cover member 1313 and the second cover member 1315 can be connected or coupled to the vibration member 331 by the adhesive member 321 and 322 illustrated in FIGS. 3 to 11.

The vibration generator 1310 according to an embodiment of the present disclosure can further include a signal supply member 1320.

The signal supply member 1320 can be configured to supply the driving signal supplied from a driving circuit part to the vibration generating part 1311. The signal supply member 1320 can be configured to be electrically connected to the vibration portion 1311*a*. The signal supply member 1320 can be configured to be electrically connected to the first electrode portion 1311*b* and the second electrode portion 1311*c* of the vibration portion 1311*a*.

A portion of the signal supply member 1320 can be accommodated (or inserted) between the first cover member 1313 and the second cover member 1315. An end portion (or a distal end portion or one side) of the signal supply member 1320 can be disposed or inserted (or accommodated) between one edge portion (or one periphery portion) of the first cover member 1313 and one edge portion (or one periphery portion) of the second cover member 1315. The one edge portion of the first cover member 1313 and the one edge portion of the second cover member 1315 can accommodate or vertically (or up and down) cover the end portion (or the distal end portion or the one side) of the signal supply member 1320. Accordingly, the signal supply member 1320 can be integrated (or configured) as one body with the vibration generating part 1311. Accordingly, the sound generating module 330 or the vibration apparatus 333 and 335 can be implemented (or configured) in a film type integrated with the signal supply member 1320. For example, the signal supply member 1320 can be configured as one part (or one component) with the vibration generating part 1311, thereby realizing an effect of uni-materialization. For example, the signal supply member 1320 can be configured as a signal cable, a flexible cable, a flexible printed circuit cable, a flexible flat cable, a single-sided flexible printed circuit, a single-sided flexible printed circuit board, a flexible multilayer printed circuit, or a flexible multilayer printed circuit board, but embodiments of the present disclosure are not limited thereto.

The signal supply member 1320 according to an embodiment of the present disclosure can include a base member 1321 and a plurality of signal lines 1323*a* and 1323*b*. For example, the signal supply member 1320 can include a base member 1321, a first signal line 1323*a*, and a second signal line 1323*b*.

The base member 1321 can include a transparent or opaque plastic material, but embodiments of the present disclosure are not limited thereto. The base member 1321 can have a certain width along a first direction X and can be extended long along a second direction Y intersecting with the first direction X.

The first signal line 1323*a* and the second signal line 1323*b* can be disposed at the first surface of the base member 1321 in parallel with the second direction Y and can be spaced apart from each other or electrically separated from each other along the first direction X. The first signal line 1323*a* and the second signal line 1323*b* can be disposed in parallel to each other at the first surface of the base member 1321. For example, the first signal line 1323*a* and the second signal line 1323*b* can be implemented in a line shape by patterning of a metal layer (or a conductive layer) formed or deposited at the first surface of the base member 1321.

End portions (or distal end portions or one sides) of the first signal line 1323*a* and the second signal line 1323*b* can be separated from each other, and thus, can be individually curved or bent.

The end portion (or the distal end portion or the one side) of the first signal line 1323*a* can be electrically connected to the first electrode portion 1311*b* of the vibration generating part 1311. For example, the end portion of the first signal line 1323*a* can be electrically connected to at least a portion of the first electrode portion 1311*b* of the vibration generating part 1311 in the one edge portion of the first cover member 1313. For example, the end portion (or the distal end portion or the one side) of the first signal line 1323*a* can be electrically and directly connected to at least a portion of the first electrode portion 1311*b* of the vibration generating part 1311. For example, the end portion (or the distal end portion or the one side) of the first signal line 1323*a* can be electrically connected to or directly contact the first electrode portion 1311*b* of the vibration generating part 1311. For example, the end portion of the first signal line 1323*a* can be electrically connected to the first electrode portion 1311*b* by a conductive double-sided tape. Accordingly, the first signal line 1323*a* can be configured to transfer a first driving signal, supplied from a driving circuit part (or a vibration driver), to the first electrode portion 1311*b* of the vibration generating part 1311.

The end portion (or the distal end portion or the one side) of the second signal line 1323*b* can be electrically connected to the second electrode portion 1311*c* of the vibration generating part 1311. For example, the end portion of the second signal line 1323*b* can be electrically connected to at least a portion of the second electrode portion 1311*c* of the vibration generating part 1311 in the one edge portion of the second cover member 1315. For example, the end portion of the second signal line 1323*b* can be electrically and directly connected to at least a portion of the second electrode portion 1311*c* of the vibration generating part 1311. For example, the end portion of the second signal line 1323*b* can be electrically connected to or directly contact the second electrode portion 1311*c* of the vibration generating part 1311. For example, the end portion of the second signal line 1323*b* can be electrically connected to the second electrode portion 1311*c* by a conductive double-sided tape. Accordingly, the second signal line 1323*b* can be configured to transfer a second driving signal, supplied from the driving circuit part (or the vibration driver), to the second electrode portion 1311*c* of the vibration generating part 1311.

The signal supply member 1320 according to an embodiment of the present disclosure can further include an insulation layer 1325.

The insulation layer 1325 can be disposed at the first surface of the base member 1321 to cover each of the first signal line 1323*a* and the second signal line 1323*b* other than the end portion (or one side) of the signal supply member 1320.

An end portion (or one side) of the signal supply member 1320 including an end portion (or one side) of the base member 1321 and an end portion (or one side) 1325*a* of the insulation layer 1325 can be inserted (or accommodated) between the first cover member 1313 and the second cover member 1315 and can be fixed between the first cover member 1313 and the second cover member 1315 by a first adhesive layer 1317 and the second adhesive layer 1319. Accordingly, the end portion (or one side) of the first signal line 1323*a* can be maintained with being electrically connected to the first electrode portion 1311*b* of the vibration generating part 1311, and the end portion (or one side) of the second signal line 1323*b* can be maintained with being electrically connected to the second electrode portion 1311*c* of the vibration generating part 1311. In addition, the end portion (or one side) of the signal supply member 1320 can be inserted (or accommodated) and fixed between the vibration generating part 1311 and the first cover member 1313, and thus, a contact defect between the vibration generator 1310 and the signal supply member 1320 caused by the movement of the signal supply member 1320 can be prevented.

In the signal supply member 1320 according to an embodiment of the present disclosure, each of the end portion (or one side) of the base member 1321 and the end portion (or one side) 1325*a* of the insulation layer 1325 can be removed. For example, each of the end portion of the first signal line 1323*a* and the end portion of the second signal line 1323*b* can be exposed at the outside without being supported or covered by each of the end portion (or one side) of the base member 1321 and the end portion (or one side) 1325*a* of the insulation layer 1325, respectively. For example, the end portion (or one side) of each of the first signal line 1323*a* and the second signal line 1323*b* can protrude (or extend) to have a certain length from an end 1321*e* of the base member 1321 or an end 1325*e* of the insulation layer 1325. Accordingly, each of the end portion (or the distal end portion or the one side) of each of the first signal line 1323*a* and the second signal line 1323*b* can be individually or independently bent.

The end portion (or one side) of the first signal line 1323*a*, which is not supported by the end portion (or one side) of the base member 1321 and the end portion 1325*a* of the insulation layer 1325, can be directly connected to or directly contact the first electrode portion 1311*b* of the vibration generating part 1311. The end portion (or one side) of the second signal line 1323*b*, which is not supported by the end portion (or one side) of the base member 1321 and the end portion 1325*a* of the insulation layer 1325, can be directly connected to or directly contact the second electrode portion 1311*c* of the vibration generating part 1311.

According to an embodiment of the present disclosure, a portion of the signal supply member 1320 or a portion of the base member 1321 can be disposed or inserted (or accommodated) between the first cover member 1313 and the second cover member 1315, and thus, the signal supply member 1320 can be integrated (or configured) as one body with the vibration generating part 1311. Accordingly, the vibration generating part 1311 and the signal supply member 1320 can be configured as one part (or one component), and thus, an effect of uni-materialization can be obtained.

According to an embodiment of the present disclosure, the first signal line 1323*a* and the second signal line 1323*b* of the signal supply member 1320 can be integrated (or configured) as one body with the vibration generator 1310, and thus, a soldering process for an electrical connection between the vibration generator 1310 and the signal supply member 1320 may not be needed. Accordingly, a manufacturing process and a structure of the vibration apparatus 333 and 335 can be simplified, and hazards associated with the soldering process can be reduced.

Figure 28:
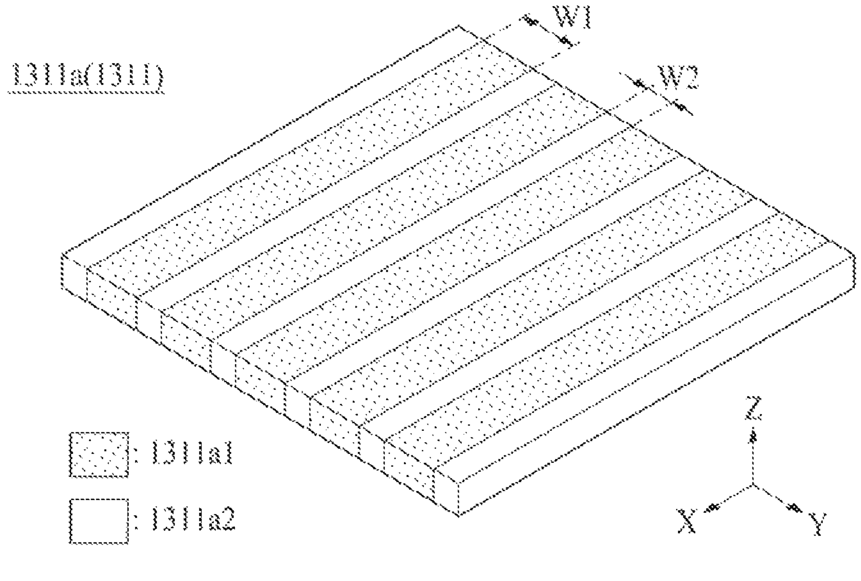
FIG. 28 illustrates a vibration part according to another embodiment of the present disclosure.

FIG. 28 illustrates a vibration portion according to another embodiment of the present disclosure. FIG. 28 illustrates another embodiment of the vibration portion described above with reference to FIGS. 25 to 27.

With reference to FIGS. 26 and 28, the vibration portion 1311*a* according to another embodiment of the present disclosure can include a plurality of first portions 1311*a*1 and a plurality of second portions 1311*a*2. For example, the plurality of first portions 1311*a*1 and the plurality of second portions 1311*a*2 can be alternately and repeatedly disposed along a first direction X (or a second direction Y).

Each of the plurality of first portions 1311*a*1 can include an inorganic material portion having a piezoelectric effect (or a piezoelectric characteristic). For example, each of the plurality of first portions 1311*a*1 can include at least one or more of a piezoelectric inorganic material and a piezoelectric organic material. For example, each of the plurality of first portions 1311*a*1 can be an inorganic portion, an inorganic material portion, a piezoelectric portion, a piezoelectric material portion, or an electroactive portion, but embodiments of the present disclosure are not limited thereto.

Each of the plurality of first portions 1311*a*1 can be configured as a ceramic-based material capable of implementing a relatively strong vibration, or can be configured as a piezoelectric ceramic having a perovskite-based crystalline structure. The perovskite crystalline structure can have a piezoelectric effect and/or an inverse piezoelectric effect and can be a plate-shaped structure having orientation or alignment. The perovskite crystalline structure can be represented by a chemical formula "$ABO_3$". In the chemical formula, "A" can include a divalent metal element, and "B" can include a tetravalent metal element. As an embodiment of the present disclosure, in the chemical formula "$ABO_3$", "A", and "B" can be cations, and "O" can be anions. For example, the vibration portion 1311*a* can include at least one or more of $PbTiO_3$, $PbZrO_3$, $PbZrTiO_3$, $BaTiO_3$, and $SrTiO_3$, but embodiments of the present disclosure are not limited thereto.

The piezoelectric ceramic can be configured as a single crystalline ceramic having a crystalline structure, or can be configured as a ceramic material having a polycrystalline structure or polycrystalline ceramic. A piezoelectric material including the single crystalline ceramic can include $\alpha$-$AlPO_4$, $\alpha$-$SiO_2$, $LiNbO_3$, $Tb_2(MoO_4)_3$, $Li_2B_4O_7$, or ZnO, but embodiments of the present disclosure are not limited thereto. A piezoelectric material including the polycrystalline ceramic can include a lead zirconate titanate (PZT)-based material, including lead (Pb), zirconium (Zr), and titanium (Ti), or can include a lead zirconate nickel niobate (PZNN)-based material, including lead (Pb), zirconium (Zr), nickel (Ni), and niobium (Nb), but embodiments of the present disclosure are not limited thereto. For example, the vibration portion 1311*a* can include at least one or more of $CaTiO_3$, $BaTiO_3$, and $SrTiO_3$, without lead (Pb), but embodiments of the present disclosure are not limited thereto.

According to an embodiment of the present disclosure, each of the plurality of first portions 1311*a*1 can have a first width W1 parallel to the second direction Y (or the first direction X) and can be extended along the first direction Y (or the second direction Y). Each of the plurality of first portions 1311*a*1 can be configured in a material which is substantially a same as a vibration portion 1311*a* described above with reference to FIGS. 25 to 27, and thus, repeated descriptions thereof are omitted.

Each of the plurality of second portions 1311*a*2 can be disposed between the plurality of first portions 1311*a*1. For example, each of the plurality of first portions 1311*a*1 can be disposed between two adjacent second portions 1311*a*2 of the plurality of second portions 1311*a*2. Each of the plurality of second portions 1311*a*2 can have a second width W2 parallel to the second direction Y (or the first direction X) and can be extended along the first direction X (or the second direction Y). The first width W1 can be a same as or different from the second width W2. For example, the first width W1 can be greater than the second width W2. For example, the first portion 1311*a*1 and the second portion 1311*a*2 can include a line shape or a stripe shape which has a same size or different sizes.

Each of the plurality of second portions 1311*a*2 can be configured to fill a gap between two adjacent first portions of the plurality of first portions 1311*a*1. Each of the plurality of second portions 1311*a*2 can be configured to fill a gap between two adjacent first portions of the plurality of first portions 1311*a*1, and thus, can be connected to or attached on lateral surfaces of the first portion 1311*a*1 adjacent thereto. According to an embodiment of the present disclosure, each of the plurality of first portions 1311*a*1 and the plurality of second portions 1311*a*2 can be disposed (or arranged) at a same plane (or a same layer) in parallel with each other. Therefore, the vibration portion 1311*a* can be expanded to a desired size or length by a lateral coupling (or connection) of the first portions 1311*a*1 and the second portions 1311*a*2.

According to an embodiment of the present disclosure, each of the plurality of second portions 1311*a*2 can absorb an impact applied to the first portions 1311*a*1, and thus, can enhance the total durability of the first portions 1311*a*1 and provide flexibility to the vibration portion 1311*a*. Each of the plurality of second portions 1311*a*2 can include an organic material having a ductile characteristic. For example, each of the plurality of second portions 1311*a*2 can include one or more of an epoxy-based polymer, an acrylic-based polymer, and a silicone-based polymer, but embodiments of the present disclosure are not limited thereto. For example, each of the plurality of second portions 1311*a*2 can be an organic portion, an organic material portion, an adhesive portion, a stretch portion, a bending portion, a damping portion, or a ductile portion, but embodiments of the present disclosure are not limited thereto.

A first surface of each of the plurality of first portions 1311*a*1 and the plurality of second portions 1311*a*2 can be connected to the first electrode portion 1311*b* in common. A second surface of each of the plurality of first portions 1311*a*1 and the plurality of second portions 1311*a*2 can be connected to the second electrode portion 1311*c* in common.

The plurality of first portions 1311*a*1 and the plurality of second portion 1311*a*2 can be disposed on (or connected to) the same plane, and thus, the vibration portion 1311*a* according to another embodiment of the present disclosure can have a single thin film-type. Accordingly, the vibration generating part 1311 or the vibration generator 1310 including the vibration portion 1311*a* according to another embodiment of the present disclosure can vibrate by the first portion 1311*a*1 having a vibration characteristic and can be bent in a curved shape by the second portion 1311*a*2 having flexibility.

Figure 29:
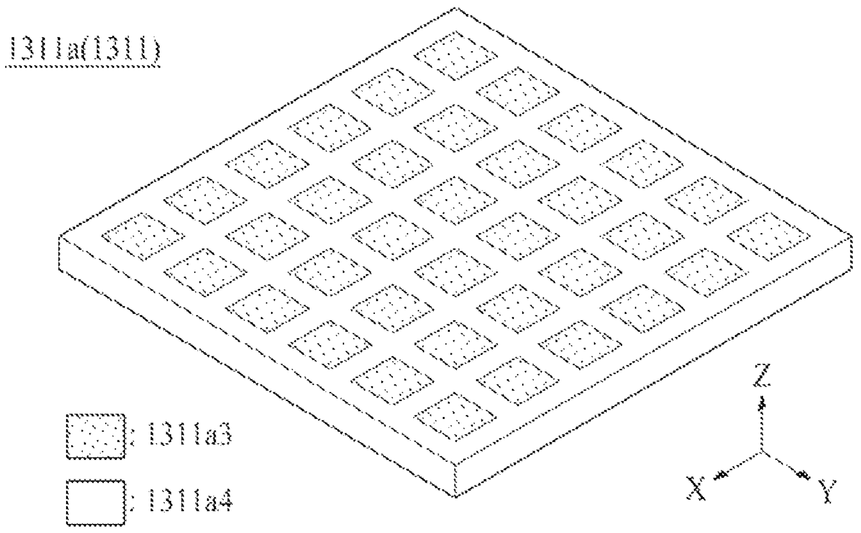
FIG. 29 illustrates a vibration part according to another embodiment of the present disclosure.

FIG. 29 illustrates a vibration portion according to another embodiment of the present disclosure. FIG. 29 illustrates another embodiment of the vibration portion described above with reference to FIGS. 25 to 27.

With reference to FIGS. 26 and 29, the vibration portion 1311*a* according to another embodiment of the present disclosure can include a plurality of first portions 1311*a*3 and a second portion 1311*a*4 disposed between the plurality of first portions 1311*a*3.

Each of the plurality of first portions 1311*a*3 can be disposed to be spaced apart from one another along each of the first direction X and the second direction Y. For example, each of the plurality of first portions 1311*a*3 can have a hexahedral shape having a same size and can be disposed in a lattice shape, but embodiments of the present disclosure are not limited thereto. For example, each of the plurality of first portions 1311a3 can have a circular shape plate, an oval shape plate, or a polygonal shape plate, which has a same size as each other, but embodiments of the present disclosure are not limited thereto.

Each of the plurality of first portions 1311a3 can include a material which is be substantially a same as the first portion 1311a1 described above with reference to FIG. 28, and thus, repeated descriptions thereof are omitted.

The second portion 1311a4 can be disposed between the plurality of first portions 1311a3 along each of the first direction X and the second direction Y. The second portion 1311a4 can be configured to fill a gap between two adjacent first portions 1311a3 or to surround each of the plurality of first portions 1311a3, and thus, the second portion 1311a4 can be connected to or attached on the first portion 1311a3 adjacent thereto. The second portion 1311a4 can include a material which is be substantially a same as the second portion 1311a2 described above with reference to FIG. 28, and thus, repeated descriptions thereof are omitted.

A first surface of each of the plurality of first portions 1311a3 and the second portions 1311a4 can be connected to the first electrode portion 1311b in common. A second surface of each of the plurality of first portions 1311a3 and the second portions 1311a4 can be connected to the second electrode portion 1311c in common.

The plurality of first portions 1311a3 and the second portion 1311a4 can be disposed on (or connected to) the same plane, and thus, the vibration portion 1311a according to another embodiment of the present disclosure can have a single thin film-type. Accordingly, the vibration generating part 1311 or the vibration generator 1310 including the vibration portion 1311a according to another embodiment of the present disclosure can vibrate by the first portion 1311a3 having a vibration characteristic and can be bent in a curved shape by the second portion 1311a4 having flexibility.

Figure 30:
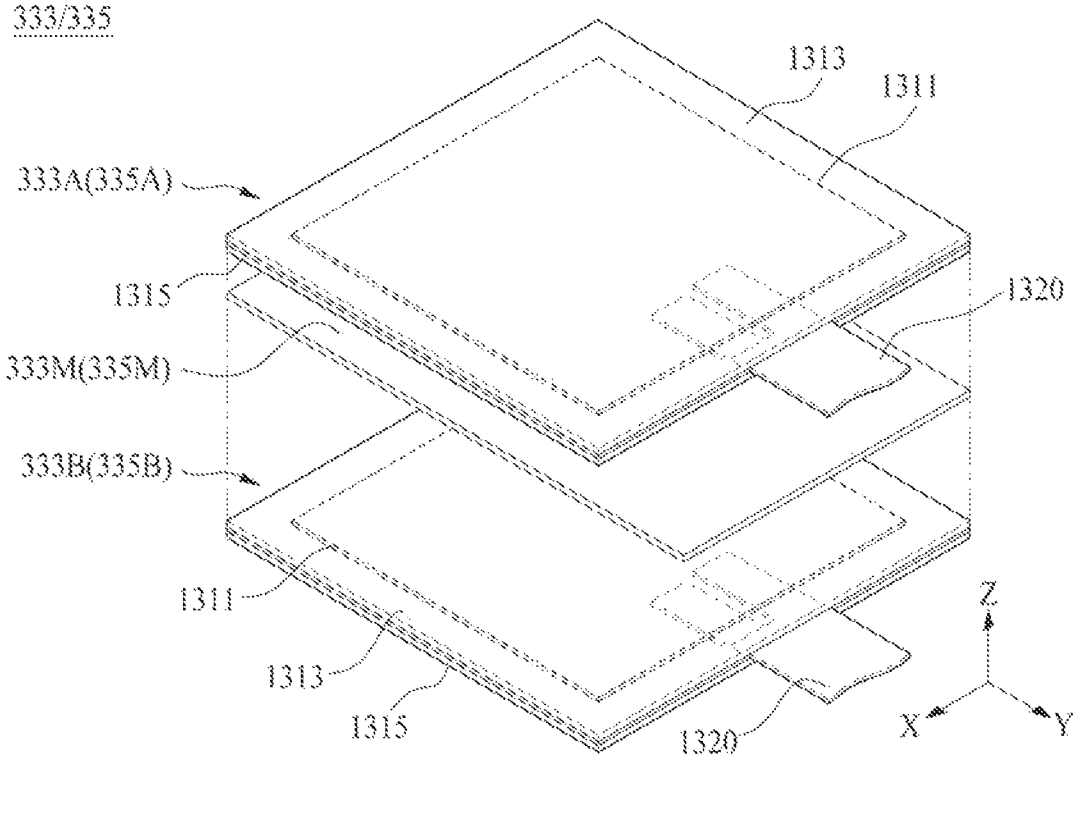
FIG. 30 illustrates a vibration apparatus according to another embodiment of the present disclosure.

FIG. 30 illustrates a vibration apparatus according to another embodiment of the present disclosure. FIG. 30 illustrates a vibration apparatus including one or more vibration generators described above with reference to FIG. 7.

With reference to FIGS. 7 and 30, the vibration apparatus 333 and 335 according to another embodiment of the present disclosure can include two or more vibration generators 333A, 333B, 335A, and 335B. For example, the vibration apparatus 333 and 335 can include a first vibration generator 333A and 335A and a second vibration generator 333B and 335B.

The first vibration generator 333A and 335A and the second vibration generator 333B and 335B can overlap or be stacked with each other to be displaced (or driven or vibrated) in a same direction to maximize an amplitude displacement of the vibration apparatus 333 and 335 or an amplitude displacement of a vibration member 331. For example, the first vibration generator 333A and 335A and the second vibration generator 333B and 335B can have substantially a same size, but embodiments of the present disclosure are not limited thereto. For example, the first vibration generator 333A and 335A and the second vibration generator 333B and 335B can have substantially a same size within an error range of a manufacturing process, but embodiments of the present disclosure are not limited thereto. Therefore, the first vibration generator 333A and 335A and the second vibration generator 333B and 335B can maximize the amplitude displacement of the vibration apparatus 333 and 335 and/or the amplitude displacement of the vibration member 331.

According to an embodiment of the present disclosure, any one of the first vibration generator 333A and 335A and the second vibration generator 333B and 335B can be connected or coupled to the vibration member 331 by an adhesive member 332 and 334 illustrated in FIGS. 3 to 24. For example, the first vibration generator 333A and 335A can be connected or coupled to the vibration member 331 by the adhesive member 332 and 334.

Each of the first vibration generator 333A and 335A and the second vibration generator 333B and 335B can be a same as or substantially a same as the vibration generator 1310 described above with reference to FIGS. 25 to 29, and thus, like reference numeral refer to like element and repeated descriptions thereof are omitted or can be briefly discussed.

The vibration apparatus 333 and 335 according to another embodiment of the present disclosure can further include an intermediate member 333M and 335M.

The intermediate member 333M and 335M can be disposed or connected between the first vibration generator 333A and 335A and the second vibration generator 333B and 335B. For example, the intermediate member 333M and 335M can be disposed or connected between the second cover member 1315 of the first vibration generator 333A and 335A and the first cover member 1313 of the second vibration generator 333B and 335B. For example, the intermediate member 333M and 335M can be an adhesive member or a connection member, but embodiments of the present disclosure are not limited thereto.

The intermediate member 333M and 335M according to an embodiment of the present disclosure can be configured in a material including an adhesive layer which is good in adhesive force or attaching force with respect to each of the first vibration generator 333A and 335A and the second vibration generator 333B and 335B. For example, the intermediate member 333M and 335M can include a foam pad, a double-sided tape, a double-sided foam tape, a double-sided foam pad, or an adhesive, or the like, but embodiments of the present disclosure are not limited thereto. For example, an adhesive layer of the intermediate member 333M and 335M can include epoxy, acrylic, silicone, or urethane, but embodiments of the present disclosure are not limited thereto. For example, the adhesive layer of the intermediate member 333M and 335M can include a urethane-based material (or substance) having relatively ductile characteristic. Accordingly, the vibration loss caused by displacement interference between the first vibration generator 333A and 335A and the second vibration generator 333B and 335B can be reduced or minimized, or each of the first vibration generator 333A and 335A and the second vibration generator 333B and 335B can be freely displaced (or vibrated or driven).

The vibration apparatus 333 and 335 according to another embodiment of the present disclosure can include the first vibration generator 333A and 335A and the second vibration generator 333B and 335B which are stacked (or piled or overlap) to vibrate (or displace or drive) in the same direction, and thus, the amount of displacement or an amplitude displacement can be maximized or increase. Accordingly, the amount of displacement (or a bending force or a driving force) or an amplitude of displacement of the vibration member 331 can be maximized or increased.

Figure 31:
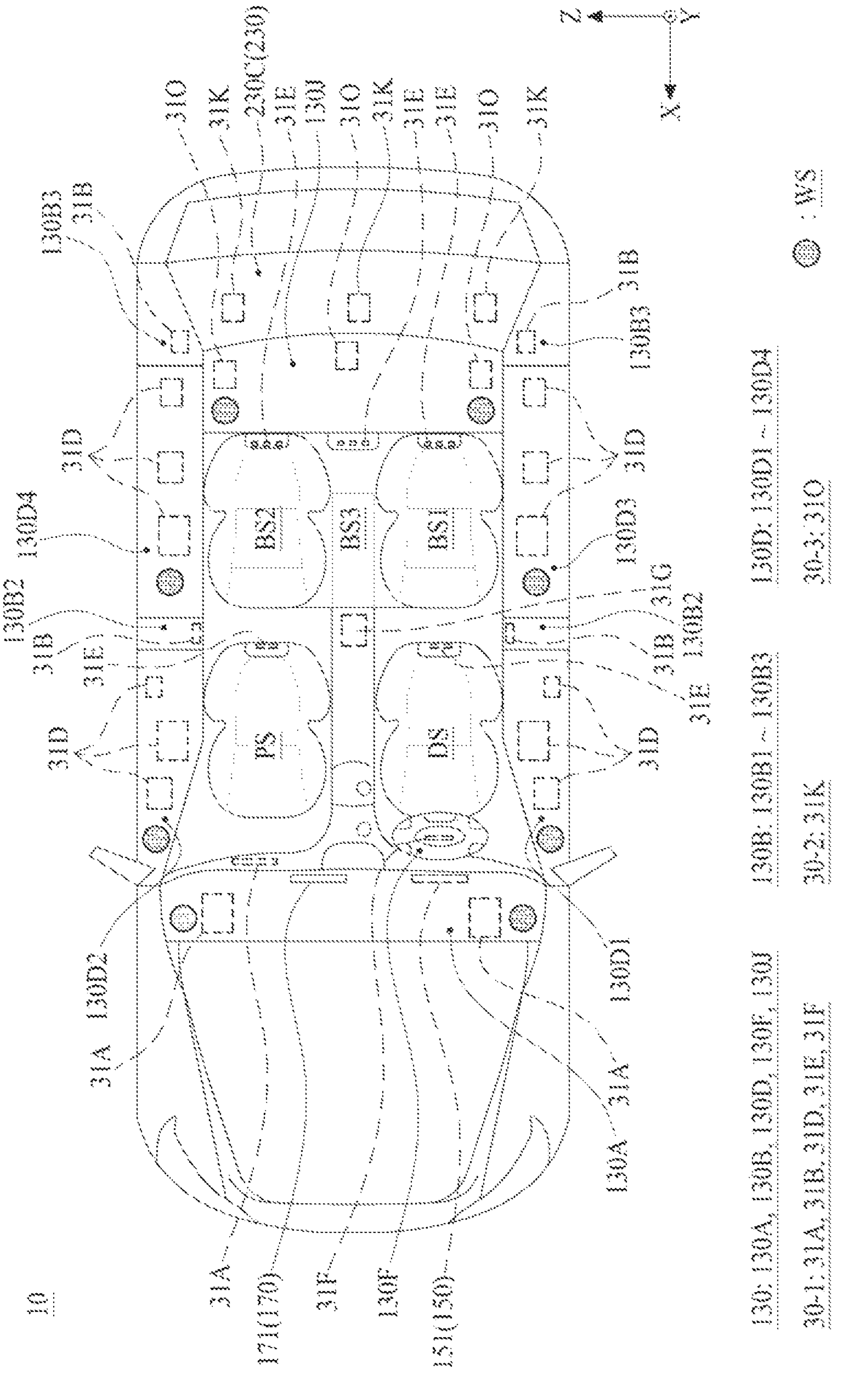
FIG. 31 illustrates a vehicular apparatus according to an embodiment of the present disclosure.
Figure 32:
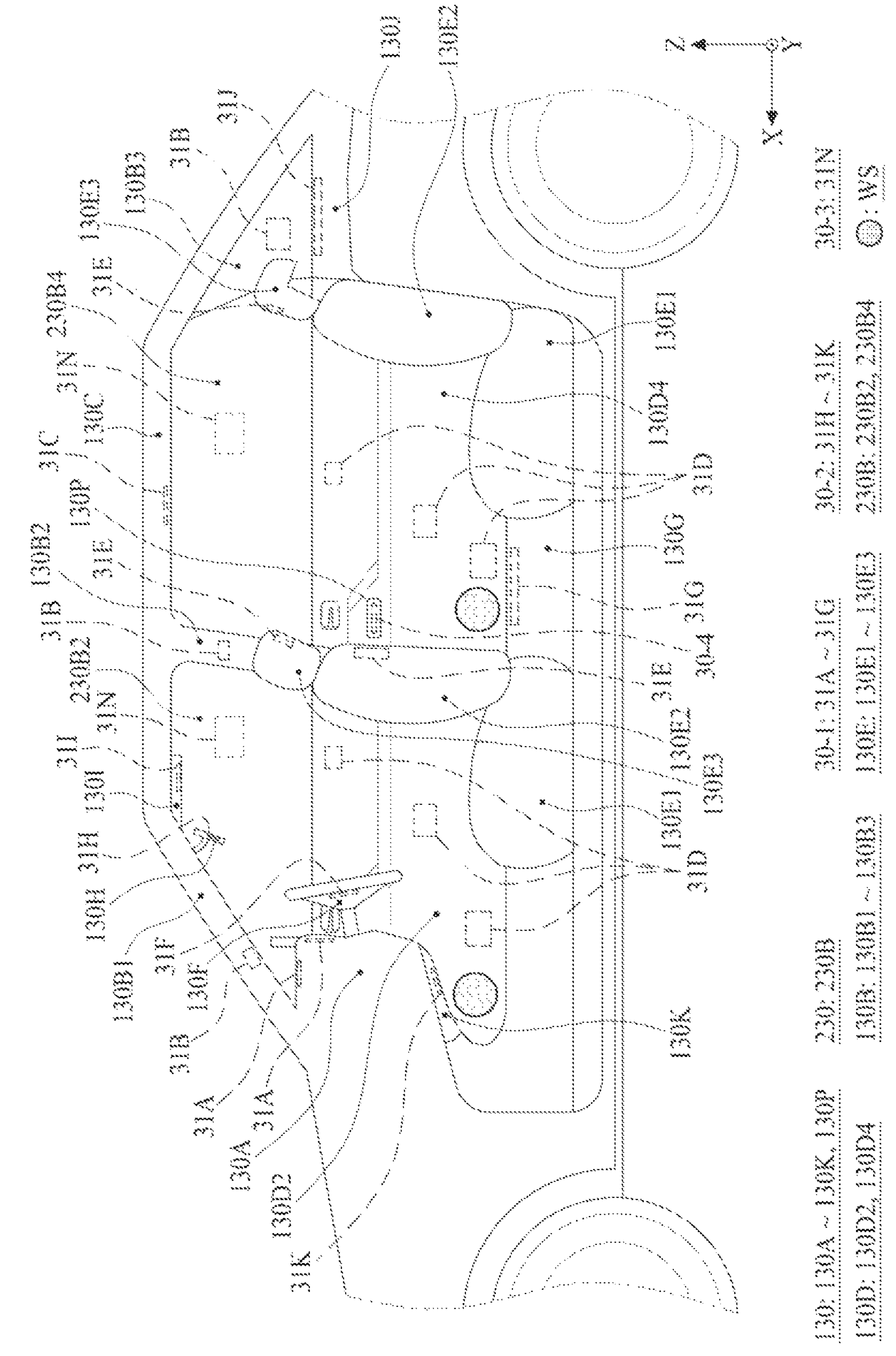
FIG. 32 illustrates a vehicular apparatus according to an embodiment of the present disclosure.
Figure 33:
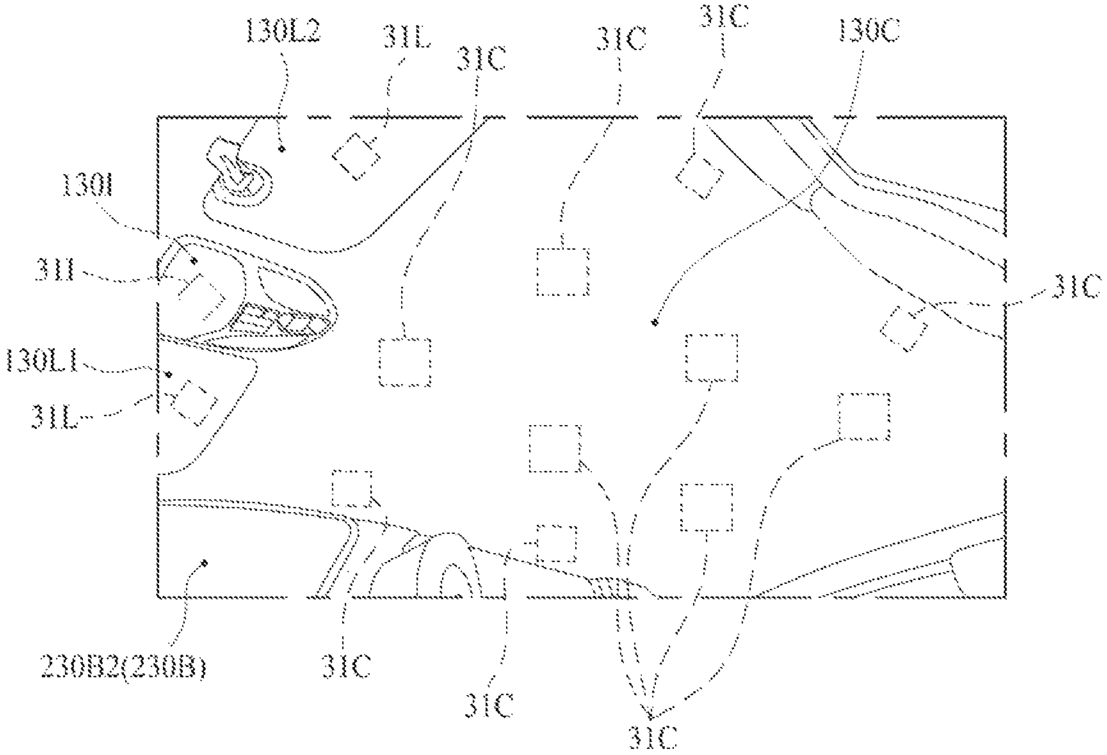
FIG. 33 illustrates a sound generating apparatus disposed at a roof of a vehicular apparatus illustrated in FIGS. 31 and 32 according to an embodiment of the present disclosure.
Figure 34:
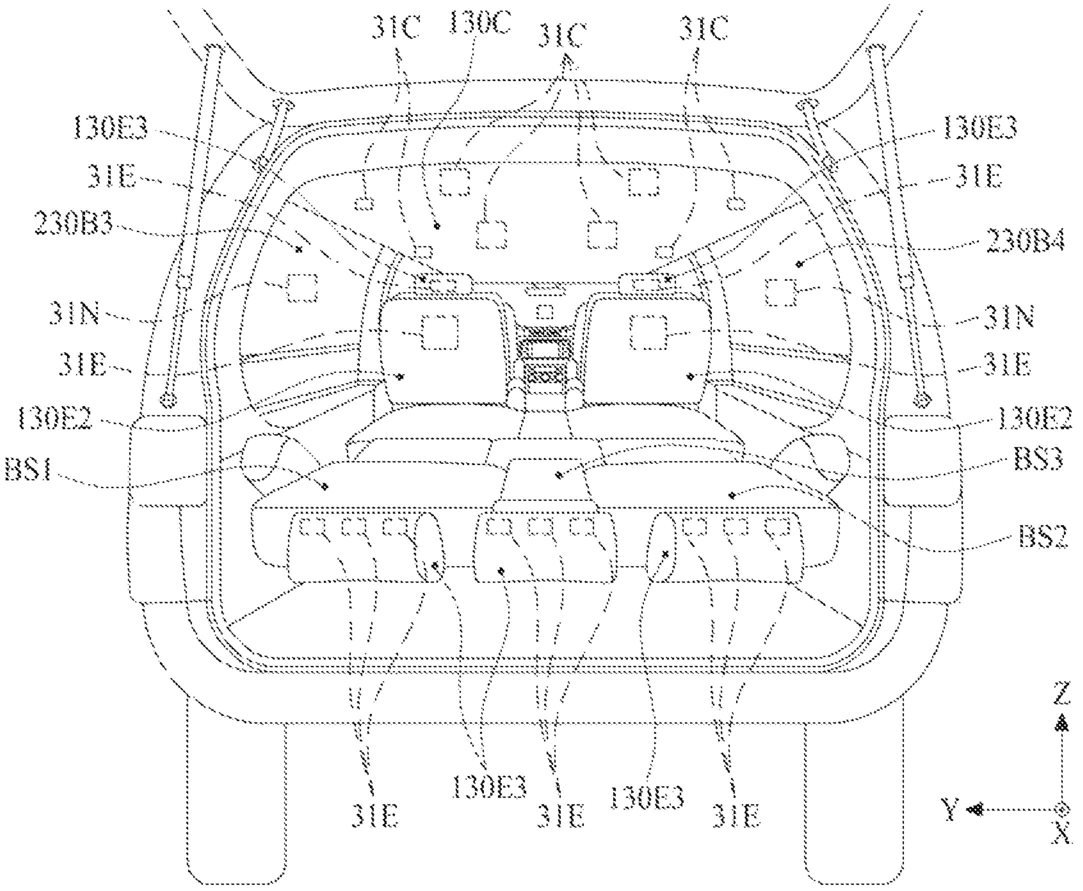
FIG. 34 illustrates a sound generating apparatus disposed at a roof and a seat of a vehicular apparatus illustrated in FIGS. 31 and 32 according to an embodiment of the present disclosure.

FIG. 31 illustrates a vehicular apparatus according to an embodiment of the present disclosure. FIG. 32 illustrates a vehicular apparatus according to an embodiment of the present disclosure. FIG. 33 illustrates a sound generating apparatus disposed at a roof of a vehicular apparatus illustrated in FIGS. 31 and 32 according to an embodiment of the present disclosure. FIG. 34 illustrates a sound generating apparatus disposed at a roof and a seat of a vehicular apparatus illustrated in FIGS. 31 and 32 according to an embodiment of the present disclosure.

With reference to FIGS. 31 to 34, a vehicular apparatus 10 according to an embodiment of the present disclosure can include a vehicle interior material 130 and a first sound generating apparatus 30-1. For example, the vehicle interior material 130 can output a sound based on a vibration of one or more first sound generating apparatuses 30-1. For example, the vehicle interior material 130 can be exposed at an indoor space.

The first sound generating apparatus 30-1 can include at least one or more sound generating modules 31A to 31G which are disposed at one or more of a dashboard 130A, a pillar interior material 130B, a roof interior material 130C, a door interior material 130D, a seat interior material 130E, a handle interior material 130F, and a floor interior material 130G. For example, the first sound generating apparatus 30-1 can include at least one or more of the first to seventh sound generating modules 31A to 31G, and thus, can output sounds of one or more channels.

With reference to FIGS. 31 to 34, the first sound generating module 31A according to an embodiment of the present disclosure can be disposed between the dashboard 130A and a dash panel and can vibrate the dashboard 130A to output a sound based on a vibration of the dashboard 130A. For example, the first sound generating module 31A can be configured to directly vibrate the dashboard 130A to output a sound based on a vibration of the dashboard 130A. For example, the first sound generating module 31A can include a sound generating module 330 or a sound apparatus 30 described above with reference to FIGS. 3 to 24, and thus, repeated descriptions are omitted. For example, the first sound generating module 31A can be a dashboard speaker.

According to an embodiment of the present disclosure, at least one or more of the dash panel and the dashboard 130A can include a first region corresponding to a driver seat DS, a second region corresponding to a passenger seat PS, and a third region (or a middle region) between the first region and the second region. At least one or more of the dash panel and the dashboard 130A can include a fourth region which is inclined to face the passenger seat PS. According to an embodiment of the present disclosure, the first sound generating module 31A can be disposed to vibrate at least one or more of the first to fourth regions of the dashboard 130A. For example, the first sound generating module 31A can be disposed at each of the first and second regions of the dashboard 130A, or can be disposed at each of the first to fourth regions of the dashboard 130A. For example, the first sound generating module 31A can be disposed at each of the first and second regions of the dashboard 130A, or can be disposed at at least one or more of the first to fourth regions of the dashboard 130A. For example, the first sound generating module 31A can be configured to output a sound of about 150 Hz to about 20 kHz. For example, the first sound generating module 31A configured to vibrate at least one or more of the first to fourth regions of the dashboard 130A can have a same sound output characteristic or different sound output characteristics. For example, the first sound generating module 31A configured to vibrate each of the first to fourth regions of the dashboard 130A can have a same sound output characteristic or different sound output characteristics.

The second sound generating module 31B according to an embodiment of the present disclosure can be disposed between the pillar interior material 130B and a pillar panel and can vibrate the pillar interior material 130B to output a sound based on a vibration of the pillar interior material 130B. For example, the second sound generating module 31B can directly vibrate the pillar interior material 130B to output a sound based on a vibration of the pillar interior material 130B. For example, the second sound generating module 31B can include a sound generating module 330 or a sound apparatus 30 described above with reference to FIGS. 3 to 24, and thus, repeated descriptions are omitted. For example, the second sound generating module 31B can be a pillar speaker or a tweeter speaker.

According to an embodiment of the present disclosure, the pillar panel can include a first pillar (or an A pillar) disposed at both sides of a front glass window, a second pillar (or a B pillar) disposed at both sides of a center of a vehicle body, and a third pillar (or a C pillar) disposed at both sides of a rear portion of the vehicle body. The pillar interior material 130B can include a first pillar interior material 130B1 covering the first pillar, a second pillar interior material 130B2 covering the second pillar, and a third pillar interior material 130B3 covering the third pillar. According to an embodiment of the present disclosure, the second sound generating module 31B can be disposed at at least one or more of a region between the first pillar and the first pillar interior material 130B1, a region between the second pillar and the second pillar interior material 130B2, and a region between the third pillar and the third pillar interior material 130B3, and thus, can vibrate at least one or more of the first to third pillar interior materials 130B1 to 130B3. For example, the second sound generating module 31B can be configured to output a sound at about 2 kHz to about 20 kHz, but embodiments of the present disclosure are not limited thereto. For example, the second sound generating module 31B can be configured to output a sound at about 150 Hz to about 20 kHz. For example, the second sound generating module 31B configured to vibrate at least one or more of the first to third pillar interior materials 130B1 to 130B3 can have a same sound output characteristic or different sound output characteristics. The various sound generating modules can be provided in a vehicle display 150, such as a speedometer 151 or a passenger display 170 such as a detachable tablet or other displays 171.

With reference to FIGS. 32 to 34, the third sound generating module 31C according to an embodiment of the present disclosure can be disposed between the roof interior material 130C and a roof frame (or a roof panel) and can vibrate the roof interior material 130C to output a sound based on a vibration of the roof interior material 130C. For example, the third sound generating module 31C can directly vibrate the roof interior material 130C to output a sound based on a vibration of the roof interior material 130C. For example, the third sound generating module 31C can include a sound generating module 330 or a sound apparatus 30 described above with reference to FIGS. 3 to 24, and thus, repeated descriptions are omitted. For example, the third sound generating module 31C can be a roof speaker.

With reference to FIG. 33, at least one or more the third sound generating modules 31C can be disposed at the roof interior material 130C. For example, at least six or more third sound generating modules 31C can be disposed at the roof interior material 130C.

According to an embodiment of the present disclosure, at least one or more of the roof frame (or a roof panel) and the roof interior material 130C covering the roof frame can include the first region corresponding to the driver seat DS, the second region corresponding to the passenger seat PS, a third region corresponding to a region between the driver seat DS and the passenger seat PS, a fourth region corresponding to a first rear seat BS1 behind the driver seat DS, a fifth region corresponding to a second rear seat BS2 behind the passenger seat PS, a sixth region corresponding to a region between the first rear seat BS1 and the second rear seat BS2, and a seventh region between the third region and the sixth region. For example, the third sound generating module 31C can be disposed to vibrate at least one or more among the first to seventh regions of the roof interior material 130C. For example, the third sound generating module 31C can be disposed to vibrate at least one or more of the first to seventh regions of the roof interior material 130C. For example, the third sound generating module 31C can be configured to output a sound of about 150 Hz to about 20 kHz. For example, the third sound generating module 31C configured to vibrate at least one or more of the first to seventh regions of the roof interior material 130C can have a same sound output characteristic or different sound output characteristics. For example, the third sound generating module 31C configured to vibrate each of the first to seventh regions of the roof interior material 130C can have a same sound output characteristic or different sound output characteristics. For example, at least one or more third sound generating modules 31C configured to vibrate at least one or more of the first to seventh regions of the roof interior material 130C can be configured to output a sound of about 2 kHz to about 20 kHz, and the other third sound generating modules 31C can be configured to output a sound of about 150 Hz to about 20 kHz. For example, at least one or more third sound generating modules 31C configured to vibrate each of the first to seventh regions of the roof interior material 130C can be configured to output a sound of about 2 kHz to about 20 kHz, and the other third sound generating modules 31C can be configured to output a sound of about 150 Hz to about 20 kHz.

With reference to FIGS. 31 and 32, the fourth sound generating module 31D according to an embodiment of the present disclosure can be disposed between the door frame and the door interior material 130D and can vibrate the door interior material 130D to output a sound based on a vibration of the door interior material 130D. For example, the fourth sound generating module 31D can directly vibrate the door interior material 130D to output a sound based on a vibration of the door interior material 130D. According to an embodiment of the present disclosure, the fourth sound generating module 31D can include a sound generating module 330 or a sound apparatus 30 described above with reference to FIGS. 3 to 24, and thus, repeated descriptions are omitted. For example, the fourth sound generating module 31D can be a door speaker.

According to an embodiment of the present disclosure, at least one or more of the door frame and the door interior material 130D can include an upper region, a middle region, and a lower region with respect to a height direction Z of the vehicular apparatus 10. For example, the fourth sound generating module 31D can be disposed at at least one or more of the upper region, the middle region, and the lower region between the door frame and the door interior material 130D, and thus, can vibrate at least one or more of the upper region, the middle region, and the lower region of the door interior material 130D.

According to an embodiment of the present disclosure, the upper region of the door interior material 130D can have a relatively small curvature radius. The fourth sound generating module 31D for vibrating the upper region of the door interior material 130D can include the sound apparatus having a flexible characteristic described above with reference to FIGS. 28 and 29.

According to an embodiment of the present disclosure, the door frame can include a first door frame (or a left front door frame), a second door frame (or a right front door frame), a third door frame (or a left rear door frame), and a fourth door frame (or a right rear door frame). According to an embodiment of the present disclosure, the door interior material 130D can include a first door interior material (or a left front door interior material) 130D1 covering the first door frame, a second door interior material (or a right front door interior material) 130D2 covering the second door frame, a third door interior material (or a left rear door interior material) 130D3 covering the third door frame, and a fourth door interior material (or a right rear door interior material) 130D4 covering the fourth door frame. For example, the fourth sound generating module 31D can be disposed at at least one or more of an upper region, a middle region, and a lower region between each of the first to fourth door frames and the first to fourth door interior materials 130D1 to 130D4 and can vibrate at least one or more of the upper region, the middle region, and the lower region of each of the first to fourth door interior materials 130D1 to 130D4.

According to an embodiment of the present disclosure, the fourth sound generating module 31D configured to vibrate the upper region of each of the first to fourth door interior materials 130D1 to 130D4 can be configured to output a sound of about 2 kHz to about 20 kHz, or can be configured to output a sound of about 150 Hz to about 20 kHz. For example, the fourth sound generating module 31D configured to vibrate the upper regions of at least one or more of the first to fourth door interior materials 130D1 to 130D4 can be configured to output a sound of about 2 kHz to about 20 kHz, or can be configured to output a sound of about 150 Hz to about 20 KHz.

According to an embodiment of the present disclosure, the fourth sound generating module 31D configured to vibrate the middle regions and the lower regions of at least one or more of the first to fourth door interior materials 130D1 to 130D4 can be configured to output a sound of about 150 Hz to about 20 kHz. The fourth sound generating module 31D configured to vibrate the middle region and the lower region of each of the first to fourth door interior materials 130D1 to 130D4 can be configured to output a sound of about 150 Hz to about 20 kHz. For example, the fourth sound generating module 31D configured to vibrate the middle regions and the lower regions of at least one or more of the first to fourth door interior materials 130D1 to 130D4 can be one or more of a woofer, a mid-woofer, and a sub-woofer. For example, the fourth sound generating module 31D configured to vibrate the middle region and the lower region of each of the first to fourth door interior materials 130D1 to 130D4 can be one or more of a woofer, a mid-woofer, and a sub-woofer.

Sounds, which are respectively output from the fourth sound generating module 31D disposed at the first door interior material 130D1 and the fourth sound generating module 31D disposed at the second door interior material 130D2, can be combined and output. For example, sounds, which are respectively output from at least one or more of the fourth sound generating module 31D disposed at the first door interior material 130D1 and the fourth sound generating module 31D disposed at the second door interior material 130D2, can be combined and output. In addition, sounds, which are respectively output from the fourth sound generating module 31D disposed at the third door interior material 130D3 and the fourth sound generating module 31D disposed at the fourth door interior material 130D4 can be combined and output.

According to an embodiment of the present disclosure, the upper region of each of the first to fourth door interior materials 130D1 to 130D4 can include a first upper region adjacent to the dashboard 130A, a second upper region adjacent to the rear seats BS1 to BS3, and a third upper region between the first upper region and the second upper region. For example, the fourth sound generating module 31D can be disposed at one or more of the first to third upper regions of each of the first to fourth door interior materials 130D1 to 130D4. For example, the fourth sound generating module 31D can be disposed at the first upper region of each of the first and second door interior materials 130D1 and 130D2 and can be disposed at one or more of the second and third upper regions of each of the first and second door interior materials 130D1 and 130D2. For example, the fourth sound generating module 31D can be disposed at one or more among the first to third upper regions of one or more of the first to fourth door interior materials 130D1 to 130D4. For example, the fourth sound generating module 31D configured to vibrate the first upper regions of one or more of the first and second door interior materials 130D1 and 130D2 can be configured to output a sound of about 2 kHz to about 20 kHz, and the fourth sound generating module 31D configured to vibrate one or more among the second and third upper regions of each of the first and second door interior materials 130D1 and 130D2 can be configured to output a sound of about 2 kHz to about 20 kHz, or can be configured to output a sound of about 150 Hz to about 20 kHz. For example, the fourth sound generating module 31D configured to vibrate one or more among the second and third upper regions of at least one or more of the first and second door interior materials 130D1 and 130D2 can be configured to output a sound of about 2 kHz to about 20 kHz, or can be configured to output a sound of about 150 Hz to about 20 KHz.

With reference to FIGS. 31, 32, and 34, the fifth sound generating module 31E according to an embodiment of the present disclosure can be disposed between a seat frame and the seat interior material 130E and can vibrate the seat interior material 130E to output a sound based on a vibration of the seat interior material 130E. For example, the fifth sound generating module 31E can directly vibrate the seat interior material 130E to output a sound based on a vibration of the seat interior material 130E. For example, the fifth sound generating module 31E can include a sound generating module 330 or a sound apparatus 30 described above with reference to FIGS. 3 to 24, and thus, repeated descriptions are omitted. For example, the fifth sound generating module 31E can be a sheet speaker or a headrest speaker.

According to an embodiment of the present disclosure, the seat frame can include a first seat frame (or a driver seat frame), a second seat frame (or a passenger seat frame), a third seat frame (or a first rear seat frame), a fourth seat frame (or a second rear seat frame), and a fifth seat frame (or a third rear seat frame). According to an embodiment of the present disclosure, the seat interior material 130E can include the first seat interior material surrounding the first seat frame, the second seat interior material surrounding the second seat frame, the third seat interior material surrounding the third seat frame, the fourth seat interior material surrounding the fourth seat frame, and the fifth seat interior material surrounding the fifth seat frame.

According to an embodiment of the present disclosure, at least one or more of the first to fifth seat frames can include a seat bottom frame, a seat back frame, and a headrest frame. The seat interior material 130E can include a seat bottom interior material 130E1 surrounding the seat bottom frame, a seat back interior material 130E2 surrounding the seat back frame, and a headrest interior material 130E3 surrounding the headrest frame. At least one or more of the seat bottom interior material 130E1, the seat back interior material 130E2, and the headrest interior material 130E3 can include an inner interior material and an outer interior material. For example, the inner interior material can include a foam layer. For example, the outer interior material can include a surface layer including a fiber or leather. For example, the outer interior material can further include a base layer including a plastic material which supports the surface layer.

According to an embodiment of the present disclosure, the fifth sound generating module 31E can be disposed at at least one or more of a region between the seat back frame and the seat back interior material 130E2 and a region between the headrest frame and the headrest interior material 130E3, and thus, can vibrate at least one or more of the outer interior material of the seat back interior material 130E2 and the outer interior material of the headrest interior material 130E3.

According to an embodiment of the present disclosure, the fifth sound generating module 31E disposed at at least one or more of the driver seat DS and the passenger seat PS can be disposed at at least one or more of the region between the seat back frame and the seat back interior material 130E2 and the region between the headrest frame and the headrest interior material 130E3.

According to an embodiment of the present disclosure, the fifth sound generating module 31E disposed at at least one or more of the first to third rear seats BS1 to BS3 can be disposed between the headrest frame and the headrest interior material 130E3. For example, at least one or more of the first to third rear seats BS1 to BS3 can include at least one or more fifth sound generating modules 31E disposed between the headrest frame and the headrest interior material 130E3.

According to an embodiment of the present disclosure, the fifth sound generating module 31E vibrating the seat back interior materials 130E2 of at least one or more of the driver seat DS and the passenger seat PS can be configured to output a sound of about 150 Hz to about 20 KHz.

According to an embodiment of the present disclosure, the fifth sound generating module 31E vibrating the headrest interior materials 130E3 of at least one or more of the driver seat DS, the passenger seat PS, and the first to third rear seats BS1 to BS3 can be configured to output a sound of about 2 kHz to about 20 kHz, or can be configured to output a sound of about 150 Hz to about 20 KHz.

With reference to FIGS. 31 and 32, the sixth sound generating module 31F according to an embodiment of the present disclosure can be disposed between a handle frame and the handle interior material 130F and can vibrate the handle interior material 130F to output a sound based on a vibration of the handle interior material 130F. For example, the sixth sound generating module 31F can directly vibrate the handle interior material 130F to output a sound based on a vibration of the handle interior material 130F. According to an embodiment of the present disclosure, the sixth sound generating module 31F can include a sound generating module 330 or a sound apparatus 30 described above with reference to FIGS. 3 to 24, and thus, repeated descriptions are omitted. For example, the sixth sound generating module 31F can be a handle speaker or a steering speaker.

According to an embodiment of the present disclosure, the sixth sound generating module 31F can vibrate the handle interior material 130F to provide a driver with a sound based on a vibration of the handle interior material 130F. For example, the sixth sound generating module 31F can directly vibrate the handle interior material 130F to provide the driver with the sound based on the vibration of the handle interior material 130F. A sound output by the sixth sound generating module 31F can be a sound which is a same as or different from a sound output from each of the first to fifth sound generating modules 31A to 31E. For example, a sound output by the sixth sound generating module 31F can be a sound which is the same as or different from sounds output from at least one or more of the first to fifth sound generating modules 31A to 31E. As an embodiment of the present disclosure, the sixth sound generating module 31F can output a sound which is to be provided to only the driver. As another embodiment of the present disclosure, the sound output by the sixth sound generating module 31F and a sound output by each of the first to fifth sound generating modules 31A to 31E can be combined and output. For example, the sound output by the sixth sound generating module 31F and the sound output by at least one or more of the first to fifth sound generating modules 31A to 31E can be combined and output.

With reference to FIGS. 31 and 32, the seventh sound generating module 31G can be disposed between the floor panel and the floor interior material 130G and can vibrate the floor interior material 130G to output a sound based on a vibration of the floor interior material 130G. For example, the seventh sound generating module 31G can directly vibrate the floor interior material 130G to output the sound based on the vibration of the floor interior material 130G.

The seventh sound generating module 31G can be disposed between the floor panel and the floor interior material 130G disposed between the front seats DS and PS and the third rear seat BS3. For example, the seventh sound generating module 31G can include a sound generating module 330 or a sound apparatus 30 described above with reference to FIGS. 3 to 24, and thus, repeated descriptions are omitted. For example, the seventh sound generating module 31G can be configured to output a sound of about 150 Hz to about 20 kHz. For example, the seventh sound generating module 31G can be a floor speaker, a bottom speaker, or an under speaker.

With reference to FIGS. 31 to 33, the vehicular apparatus or the vehicle 10 according to an embodiment of the present disclosure can further include a second sound generating apparatus 30-2 which is disposed at the vehicle interior material 130 exposed at an indoor space. For example, the vehicular apparatus or the vehicle 10 according to an embodiment of the present disclosure can include only the second sound generating apparatus 30-2 instead of the first sound generating apparatus 30-1, or can include all of the first sound generating apparatus 30-1 and the second sound generating apparatus 30-2.

According to an embodiment of the present disclosure, the vehicle interior material 130 can further include a rear view mirror 130H, an overhead console 130I, a rear package interior material 130J, a glove box 130K, and a sun visor 130L, or the like.

The second sound generating apparatus 30-2 can include at least one or more sound generating modules 31H to 31L which are disposed at at least one of the rear view mirror 130H, the overhead console 130I, the rear package interior material 130J, the glove box 130K, and the sun visor 130L. For example, the second sound generating apparatus 30-2 can include at least one or more of eighth to twelfth sound generating modules 31H to 31L, and thus, can output sounds of one or more channels.

With reference to FIGS. 31 to 33, the eighth sound generating module 31H can be disposed at the rear view mirror 130H and can vibrate the rear view mirror 130H to output a sound based on a vibration of the rear view mirror 130H. For example, the eighth sound generating module 31H can be configured to directly vibrate the rear view mirror 130H to output the sound based on the vibration of the rear view mirror 130H.

The eighth sound generating module 31H can be disposed between a mirror housing connected to a vehicle body structure and the rear view mirror 130H supported by the mirror housing. According to an embodiment of the present disclosure, the eighth sound generating module 31H can include a sound generating module 330 or a sound apparatus 30 described above with reference to FIGS. 3 to 24, and thus, repeated descriptions are omitted. For example, the eighth sound generating module 31H can be configured to output a sound of about 150 Hz to about 20 kHz. For example, the eighth sound generating module 31H can be a mirror speaker.

With reference to FIGS. 33 and 34, the ninth sound generating module 31I can be disposed at the overhead console 130I and can vibrate a console cover of the overhead console 130I to output a sound based on a vibration of an interior material (or the console cover) of the overhead console 130I. For example, the ninth sound generating module 31I can be configured to directly vibrate the console cover of the overhead console 130I to output the sound based on the vibration of the interior material (or the console cover) of the overhead console 130I.

According to an embodiment of the present disclosure, the overhead console 130I can include a console box buried (or embedded) into the roof panel, a lighting device disposed at the console box, and the console cover covering the lighting device and the console box.

The ninth sound generating module 31I can be disposed between the console cover and the console box of the overhead console 130I and can vibrate the console cover. For example, the ninth sound generating module 31I can be disposed between the console cover and the console box of the overhead console 130I and can directly vibrate the console cover. According to an embodiment of the present disclosure, the ninth sound generating module 31I can include a sound generating module 330 or a sound apparatus 30 described above with reference to FIGS. 3 to 24, and thus, repeated descriptions are omitted. For example, the ninth sound generating module 31I can be configured to output a sound of about 150 Hz to about 20 kHz. For example, the ninth sound generating module 31I can be a console speaker or a lighting speaker.

For example, the vehicular apparatus or the vehicle 10 can further include a center lighting box disposed at a center region of the roof interior material 130C, a center lighting device disposed at the center lighting box, and a center lighting cover covering the center lighting device. In this case, the ninth sound generating module 31I can be further disposed between a center lighting cover and a center lighting box of the center lighting device and can additionally vibrate the center lighting cover.

With reference to FIGS. 31 and 32, the tenth sound generating module 31J can be disposed at the rear package interior material 130J and can vibrate the rear package interior material 130J to output a sound based on a vibration of the rear package interior material 130J. For example, the ninth sound generating module 31I can be configured to directly vibrate the rear package interior material 130J to output the sound based on the vibration of the rear package interior material 130J.

The rear package interior material 130J can be disposed behind the first to third rear seats BS1 to BS3. For example, a portion of the rear package interior material 130J can be disposed under a rear glass window 230C.

The tenth sound generating module 31J can be disposed at a rear surface of the rear package interior material 130J and can vibrate the rear package interior material 130J. For example, the tenth sound generating module 31J can directly vibrate the rear package interior material 130J. According to an embodiment of the present disclosure, the tenth sound generating module 31J can include a sound generating module 330 or a sound apparatus 30 described above with reference to FIGS. 3 to 24, and thus, repeated descriptions are omitted. For example, the tenth sound generating module 31J can be a rear speaker.

According to an embodiment of the present disclosure, the rear package interior material 130J can include a first region corresponding to a rear portion of the first rear seat BS1, a second region corresponding to a rear portion of the second rear seat BS2, and a third region corresponding to a rear portion of the third passenger seat BS3. According to an embodiment of the present disclosure, the tenth sound generating module 31J can be disposed to vibrate at least one or more of the first to third regions of the rear package interior material 130J. For example, the tenth sound generating module 31J can be disposed at each of the first and second regions of the rear package interior material 130J, or can be disposed at each of the first to third regions of the rear package interior material 130J. For example, the tenth sound generating module 31J can be disposed at at least one or more of the first and second regions of the rear package interior material 130J, or can be disposed at at least one or more of the first to third regions of the rear package interior material 130J. For example, the tenth sound generating module 31J can be configured to output a sound of about 150 Hz to about 20 kHz. For example, the tenth sound generating module 31J configured to vibrate each of the first to third regions of the rear package interior material 130J can have a same sound output characteristic or different sound output characteristics. For example, the tenth sound generating module 31J configured to vibrate at least one or more of the first to third regions of the rear package interior material 130J can have a same sound output characteristic or different sound output characteristics.

With reference to FIGS. 31 and 32, the eleventh sound generating module 31K can be disposed at a glove box 130K and can vibrate the glove box 130K to output a sound based on a vibration of the glove box 130K. For example, the eleventh sound generating module 31K can directly vibrate the glove box 130K to output the sound based on the vibration of the glove box 130K.

The glove box 130K can be disposed at a dashboard 130A corresponding to a front portion of the passenger seat PS.

The eleventh sound generating module 31K can be disposed at an inner surface of the glove box 130K and can vibrate the glove box 130K. For example, the eleventh sound generating module 31K can directly vibrate the glove box 130K. According to an embodiment of the present disclosure, the eleventh sound generating module 31K can include a sound generating module 330 or a sound apparatus 30 described above with reference to FIGS. 3 to 24, and thus, repeated descriptions are omitted. For example, the eleventh sound generating module 31K can be configured to output a sound of about 150 Hz to about 20 kHz, or can be one or more of a woofer, a mid-woofer, and a sub-woofer. For example, the eleventh sound generating module 31K can be a glove box speaker.

With reference to FIG. 33, the twelfth sound generating module 31L can be disposed at the sun visor 130L and can vibrate the sun visor 130L to output a sound based on a vibration of the sun visor 130L. For example, the twelfth sound generating module 31L can directly vibrate the sun visor 130L to output the sound based on the vibration of the sun visor 130L.

The sun visor 130L can include a first sun visor 130L1 corresponding to the driver seat DS and a second sun visor 130L2 corresponding to the passenger seat PS.

The twelfth sound generating module 31L can be disposed at at least one or more of the first sun visor 130L1 and the second sun visor 130L2 and can vibrate at least one or more of the first sun visor 130L1 and the second sun visor 130L2. For example, the twelfth sound generating module 31L can directly vibrate at least one or more of the first sun visor 130L1 and the second sun visor 130L2. According to an embodiment of the present disclosure, the twelfth sound generating module 31L can include a sound generating module 330 or a sound apparatus 30 described above with reference to FIGS. 3 to 24, and thus, repeated descriptions are omitted. For example, the twelfth sound generating module 31L can be configured to output a sound of about 150 Hz to about 20 kHz. For example, the twelfth sound generating module 31L can be a sun visor speaker.

For example, at least one or more of the first sun visor 130L1 and the second sun visor 130L2 can further include a sun visor mirror. In this case, the twelfth sound generating module 31L can be configured to vibrate a sun visor mirror of at least one or more of the first sun visor 130L1 and the second sun visor 130L2. The twelfth sound generating module 31L can directly vibrate the sun visor mirror of at least one or more of the first sun visor 130L1 and the second sun visor 130L2. The twelfth sound generating module 31L vibrating the sun visor mirror can include a sound generating module 330 or a sound apparatus 30 described above with reference to FIGS. 3 to 24, and thus, repeated descriptions are omitted.

With reference to FIGS. 31 to 33, the vehicular apparatus or the vehicle 10 according to an embodiment of the present disclosure can further include a third sound generating apparatus 30-3 disposed at a vehicle glass window 230. For example, the vehicular apparatus or the vehicle 10 according to an embodiment of the present disclosure can include the third sound generating apparatus 30-3 instead of at least one or more of the first and second sound generating apparatuses 30-1 and 30-2, or can include all of the first to third sound generating apparatuses 30-1 to 30-3.

The third sound generating apparatus 30-3 can include at least one or more sound generating modules 31N to 31O disposed at the vehicle glass window 230. For example, the third sound generating apparatus 30-3 can include at least one or more of thirteenth and fourteenth sound generating modules 31N and 31O, and thus, can output sounds of one or more channels. For example, the third sound generating apparatus 30-3 can be a transparent sound generating apparatus.

The vehicle glass window 230 of the vehicular apparatus or the vehicle 10 can include at least one or more of a front glass window and a side glass window. The vehicle glass window 230 of the vehicular apparatus can further include at least one or more of a rear glass window and a roof glass window.

The vehicle glass window 230 according to an embodiment of the present disclosure can be configured to be wholly transparent. The vehicle glass window 230 according to another embodiment of the present disclosure can include a transparent portion and a semitransparent portion surrounding the transparent portion. The vehicle glass window 230 according to another embodiment of the present disclosure can include a transparent portion and an opaque portion surrounding the transparent portion.

The sound generating module 330 described above with reference to FIGS. 3 to 24 can be configured to be transparent or semitransparent. For example, when the vehicle glass window 230 is wholly transparent, the sound generating module 330 can be configured to be transparent and can be disposed at a middle region or a peripheral region of the vehicle glass window 230. When the vehicle glass window 230 includes the semitransparent portion or the opaque portion, the sound generating module 330 can be configured to be semitransparent or opaque and can be disposed at the semitransparent portion or the opaque portion of the vehicle glass window 230. For example, the sound generating module 330 can be a transparent sound generating module.

With reference to FIG. 1 in conjunction with FIG. 2, the sound generating module 330 can be disposed at one surface (or an indoor surface) of the vehicle glass window 230 exposed at inside or an indoor space IS of the vehicular apparatus or the vehicle 10. For example, a sound apparatus 30 for vehicles can include at least one or more sound generating module 330 disposed at the vehicle glass window 230 or a plurality of sound generating module 330 disposed at the vehicle glass window 230. As an embodiment of the present disclosure, the sound generating module 330 can be disposed at at least one or more of the front glass window and the side glass window and can be further disposed at at least one or more of the rear glass window and the roof glass window.

The at least one or more of the thirteenth and fourteenth sound generating modules 31N and 31O can include the transparent or semitransparent sound generating module 330. For example, when the at least one or more of the thirteenth and fourteenth sound generating modules 31N and 31O includes the sound generating module 330, the at least one or more of the thirteenth and fourteenth sound generating modules 31N and 31O can vibrate the vehicle glass window 230 to output a sound based on a vibration of the vehicle glass window 230. For example, the at least one or more of the thirteenth and fourteenth sound generating modules 31N and 31O can directly vibrate the vehicle glass window 230 to output a sound based on a vibration of the vehicle glass window 230.

According to an embodiment of the present disclosure, the vehicle glass window 230 can include the front glass window, the side glass window 230B, and the rear glass window. According to an embodiment of the present disclosure, the vehicle glass window 230 can further include the roof glass window 230D. For example, when the vehicular apparatus or the vehicle 10 includes the roof glass window 230D, a portion of a region of the roof frame and the roof interior material 130C can be replaced with the roof glass window 230D. For example, when the vehicular apparatus or the vehicle 10 includes the roof glass window 230D, the third sound generating module 31C can be configured to vibrate a periphery portion of the roof interior material 130C surrounding the roof glass window 230D.

With reference to FIGS. 32 to 34, the thirteenth sound generating module 31N according to an embodiment of the present disclosure can be disposed at the side glass window 230B and can be configured to output a sound by vibrating itself (or self-vibration thereof), or can be configured to indirectly or directly vibrate the side glass window 230B to output a sound based on a vibration of the side glass window 230B. For example, the thirteenth sound generating module 31N can directly vibrate the side glass window 230B to output a sound based on the vibration of the side glass window 230B.

According to an embodiment of the present disclosure, the side glass window 230B can include a first side glass window (or a right front window) 230B2, a second side glass window (or a left rear window) 230B3, a third side glass window (or a right rear window) 230B4, and a fourth side glass window (or a left front window).

According to an embodiment of the present disclosure, the thirteenth sound generating module 31N can be disposed at at least one or more of the first to third side glass windows 230B2 to 230B4. For example, at least one or more of the first to third side glass windows 230B2 to 230B4 can include at least one or more thirteenth sound generating module 31N.

For example, the thirteenth sound generating module 31N can be disposed at at least one or more of the first to third side glass windows 230B2 to 230B4 and can output a sound by vibrating itself (or self-vibration thereof), or can vibrate a corresponding side glass windows 230B2 to 230B4 to output a sound. For example, the thirteenth sound generating module 31N can directly vibrate the side glass windows 230B2 to 230B4 to output the sound. For example, the thirteenth sound generating module 31N can be configured to output the sound of 150 Hz to 20 kHz. For example, the thirteenth sound generating module 31N disposed at at least one or more of the first to third side glass windows 230B2 to 230B4 can have a same sound output characteristic or different sound output characteristics. For example, the thirteenth sound generating module 31N disposed at at least one or more of the first to third side glass windows 230B2 to 230B4 can be configured to output the sound of 150 Hz to 20 kHz. For example, the thirteenth sound generating module 31N can be a side window speaker.

With reference to FIG. 31, the fourteenth sound generating module 31O according to an embodiment of the present disclosure can be disposed at the rear glass window 230C and can output a sound by vibrating itself (or self-vibration thereof), or can vibrate the rear glass window 230C to output a sound based on a vibration of the rear glass window 230C. For example, the fourteenth sound generating module 31O can directly vibrate the rear glass window 230C to output the sound based on the vibration of the rear glass window 230C.

According to an embodiment of the present disclosure, the rear glass window 230C can include a first region corresponding to a rear portion of the first rear seat BS1, a second region corresponding to a rear portion of the second rear seat BS2, and a third region corresponding to a rear portion of the third rear seat BS3. According to an embodiment of the present disclosure, the fourteenth sound generating module 31O can be disposed at at least one or more of the first and second regions of the rear glass window 230C. For example, the fourteenth sound generating module 31O can be disposed at at least one or more of the first to third regions of the rear glass window 230C. For example, the fourteenth sound generating module 31O can be disposed at each of the first and second regions of the rear glass window 230C, or can be disposed at each of the first to third regions of the rear glass window 230C. For example, the fourteenth sound generating module 31O can be disposed at at least one or more of the first and second regions of the rear glass window 230C, or can be disposed at at least one or more of the first to third regions of the rear glass window 230C. For example, the fourteenth sound generating module 31O can be configured to output a sound of about 150 Hz to about 20 kHz. For example, the fourteenth sound generating module 31O disposed at at least one or more of the first to third regions of the rear glass window 230C can have a same sound output characteristic or different sound output characteristics. For example, the fourteenth sound generating module 31O disposed at each of the first to third regions of the rear glass window 230C can have a same sound output characteristic or different sound output characteristics. For example, the fourteenth sound generating module 31O disposed at at least one or more of the first and second regions of the rear glass window 230C can be configured to output a sound of about 150 Hz to about 20 kHz, or can be one or more of a woofer, a mid-woofer, and a sub-woofer. For example, the fourteenth sound generating module 31O can be a rear window speaker.

With reference to FIGS. 31 and 32, the vehicular apparatus or the vehicle 10 according to an embodiment of the present disclosure can further include a woofer speaker WS which is disposed at at least one or more of a dashboard 130A, a door frame, and a rear package interior material 130J.

The woofer speaker WS according to an embodiment of the present disclosure can include at least one or more of a woofer, a mid-woofer, and a sub-woofer. For example, the woofer speaker WS can be a speaker which outputs a sound of about 60 Hz to about 150 Hz. Therefore, the woofer speaker WS can output a sound of about 60 Hz to about 150 Hz, and thus, can enhance a low-pitched sound band characteristic of a sound which is output to an indoor space.

According to an embodiment of the present disclosure, the woofer speaker WS can be disposed at at least one or more of first and second regions of the dashboard 130A. According to an embodiment of the present disclosure, the woofer speaker WS can be disposed at each of first to fourth door frames of the door frame and can be exposed at a lower region of each of the first to fourth door interior materials 130D1 to 130D4 of the door interior material 130D. For example, the woofer speaker WS can be disposed at at least one or more of the first to fourth door frames of the door frame and can be exposed at the lower regions of at least one or more of the first to fourth door interior materials 130D1 to 130D4 of the door interior material 130D. According to an embodiment of the present disclosure, the woofer speaker WS can be disposed at at least one or more of the first and second regions of the rear package interior material 130J. For example, the fourth sound generating module 31D disposed at the lower region of at least one or more of the first to fourth door interior materials 130D1 to 130D4 can be replaced by the woofer speaker WS.

With reference to FIG. 32, the vehicular apparatus according to an embodiment of the present disclosure can further include a garnish member 130P which covers a portion of the vehicle interior material 130 exposed at the indoor space, and a fourth sound generating apparatus 30-4. For example, the fourth sound generating apparatus 30-4 can be disposed at the garnish member 130P and the vehicle interior material 130 to output a sound. For example, at least one or more of the garnish member 130P and the vehicle interior material 130 can output a sound based on vibrations of fourth sound generating apparatus 30-4.

The garnish member 130P can be configured to cover a portion of the door interior material 130D exposed at the indoor space, but embodiments of the present disclosure are not limited thereto. For example, the garnish member 130P can be configured to cover a portion of one or more of the dashboard 130A, the pillar interior material 130B, and the roof interior material 130C, which are exposed at the indoor space.

The garnish member 130P according to an embodiment of the present disclosure can include a metal material or a nonmetal material (or a composite nonmetal material) having a material characteristic suitable for generating a sound based on a vibration. For example, a metal material of the garnish member 130P can include any one or more materials of stainless steel, aluminum (Al), an Al alloy, a magnesium (Mg), a Mg alloy, and a magnesium-lithium (Mg—Li) alloy, but embodiments of the present disclosure are not limited thereto. The nonmetal material (or the composite nonmetal material) of the garnish member 130P can include one or more of wood, plastic, glass, cloth, fiber, rubber, paper, carbon, and leather, but embodiments of the present disclosure are not limited thereto. For example, the garnish member 130P can include a metal material having a material characteristic suitable for generating a sound of a high-pitched sound band, but embodiments of the present disclosure are not limited thereto. For example, the high-pitched sound band can have a frequency of 1 kHz or more or 3 kHz or more, but embodiments of the present disclosure are not limited thereto.

The fourth sound generating apparatus 30-4 can be disposed between the garnish member 130P and the vehicle interior material 130. For example, the fourth sound generating apparatus 30-4 can be a garnish speaker or the like, but embodiments of the present disclosure are not limited thereto.

The fourth sound generating apparatus 30-4 according to an embodiment of the present disclosure can include one or more of the sound generating module 30 described above with reference to FIGS. 3 to 24. The fourth sound generating apparatus 30-4 can be disposed at a main interior material or the vehicle interior material 130 and the garnish member 130P and can be connected or coupled to the garnish member 130P.

The fourth sound generating apparatus 30-4 according to an embodiment of the present disclosure can be configured to indirectly or directly vibrate the garnish member 130P to output a sound into the indoor space of the vehicular apparatus. For example, the fourth sound generating apparatus 30-4 can be configured to output a sound of a high-pitched sound band, but embodiments of the present disclosure are not limited thereto.

The vehicular apparatus or the vehicle 10 according to an embodiment of the present disclosure can output a sound to the indoor space through at least one or more of the first sound generating apparatus 30-1 disposed at the vehicle interior material 130, the second sound generating apparatus 30-2 disposed at the vehicle interior material 130 exposed at the indoor space, the third sound generating apparatus 30-3 disposed at the vehicle glass window 230, and the fourth sound generating apparatus 30-4 disposed at the garnish member 130P, and thus, can output the sound by a vehicle interior material 130 as a vibration plate or a sound vibration plate, thereby outputting a multichannel surround stereo sound.

Figure 35:
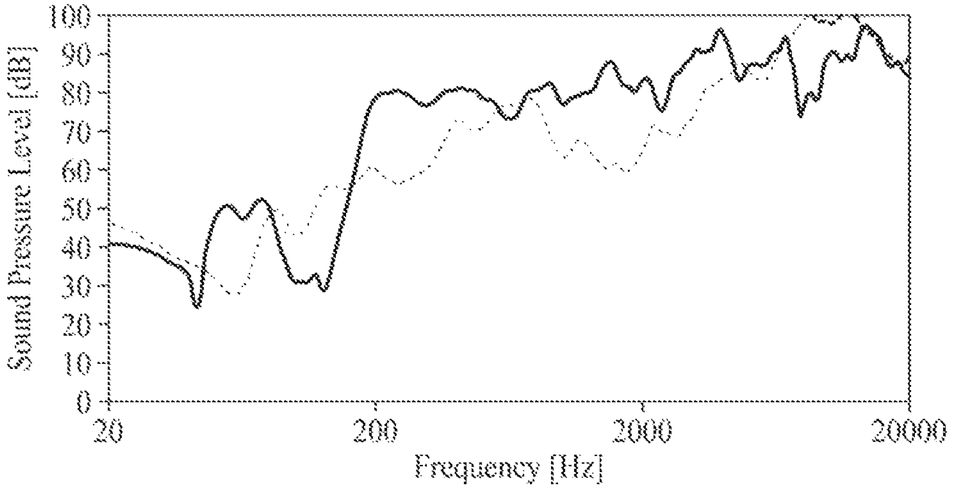
FIG. 35 illustrates a sound output characteristic according to an embodiment of the present disclosure and an experimental example.

FIG. 35 illustrates a sound output characteristic according to an embodiment of the present disclosure and an experimental example.

In FIG. 35, the abscissa axis represents a frequency in hertz (Hz), and the ordinate axis represents a sound pressure level (SPL) in decibels (dB). A solid line represents a sound output characteristic of an apparatus where the sound apparatus 30 of FIG. 11 is coupled to the vehicle interior material 130 with an opening portion 310*o*. A dotted line represents a sound output characteristic of an apparatus where the sound apparatus 30 of FIG. 11 is coupled to the vehicle interior material 130 without an opening portion 310*o*.

The sound output characteristic can be measured by sound analysis equipment. The sound analysis equipment can include a control PC, a sound card for transmitting and receiving sound, an amplifier for amplifying and transmitting the sound generated from the sound card to the sound apparatus, and a microphone for collecting the sound generated in the apparatus based on driving of the vibration apparatus. The sound collected by the microphone is input to the control PC through the sound card, and the sound is checked in a control program to analyze the sound of the apparatus.

The sound output characteristic has been measured in an anechoic chamber, which is closed in all directions. When measuring, an applied frequency signal is applied as a sine sweep within a range of 150 Hz to 20 kHz, and ⅙ octave smoothing has been performed on a measurement result. A separation distance between the apparatus and the microphone is adjusted to be 1 m. However, a measurement method of the sound output characteristic can be not limited thereto.

With reference to FIG. 35, comparing with the dotted line, in the solid line, it can be seen that a flatness characteristic of a sound pressure level is enhanced.

Comparing with the dotted line, in the solid line, it can be seen that a sound pressure level increases in α-pitched sound band of 1 kHz or less, and it can be seen that a peak phenomenon and a dip phenomenon decrease in α-pitched sound band of 1 kHz or less. Accordingly, in an apparatus including a sound apparatus according to an embodiment of the present disclosure, a sound characteristic and/or a sound pressure level characteristic of a low-pitched sound band can be enhanced, and a flatness characteristic of a sound pressure level can be enhanced.

Comparing with the dotted line, in the solid line, it can be seen that a sound pressure level increases in α-pitched sound band of 2 kHz or less and an undesired sound pressure level decreases in a high-pitched sound band of 2 kHz or more, and thus, a balance characteristic of a sound pressure level or a flatness characteristic of a sound pressure level is enhanced in a full-pitched sound band. Accordingly, in an apparatus including a sound apparatus according to an embodiment of the present disclosure, a sound characteristic and/or a sound pressure level characteristic of a middle-pitched sound band of a middle-low-pitched sound band of 2 kHz or less can be enhanced, a sound characteristic and/or a sound pressure level characteristic of the high-pitched sound band of 2 kHz or more can be enhanced, and a balance characteristic or a flatness characteristic of a sound pressure level is enhanced in a full-pitched sound band.

A sound apparatus and a vehicular apparatus including the same according to an embodiment of the present disclosure are described below.

A sound apparatus according to one or more embodiments of the present disclosure can comprise an enclosure including an internal space, and a sound generating module at the internal space, the enclosure can comprise an opening portion connected to the internal space.

A sound apparatus according to one or more embodiments of the present disclosure may comprise a sound generating module including a vibration apparatus configured to be displaced by an electric signal applied to the vibration apparatus. The sound generating module is exposed to air on at least one side thereof.

According to one or more embodiments of the present disclosure, the sound generating module can comprise a vibration member configured at the internal space to be spaced part from the opening portion, and a vibration apparatus configured at the vibration member.

According to one or more embodiments of the present disclosure, the vibration apparatus can comprise a first vibration apparatus configured at a first surface of the vibration member, and a second vibration apparatus configured at a second surface different from the first surface of the vibration member.

According to one or more embodiments of the present disclosure, the vibration member can comprise a metal material, or can comprise a single nonmetal material or a composite nonmetal material of one or more of wood, rubber, plastic, carbon, glass, fiber, cloth, paper, mirror, and leather.

According to one or more embodiments of the present disclosure, the enclosure can comprise a first enclosure including the opening portion, and a second enclosure connected to the first enclosure. The sound generating module can be configured at the internal space between the first enclosure and the second enclosure.

According to one or more embodiments of the present disclosure, the internal space can comprise a first space between a first surface of the sound generating module and the first enclosure and connected to the opening portion, and a second space between a second surface, which is opposite to the first surface, of the sound generating module and the second enclosure.

According to one or more embodiments of the present disclosure, the sound generating module can comprise a vibration member disposed at the internal space and supported by the first enclosure and the second enclosure, a first vibration apparatus connected to a first surface of the vibration member, and a second vibration apparatus connected to a second surface different from the first surface of the vibration member, or connected to the first vibration apparatus.

According to one or more embodiments of the present disclosure, the sound apparatus can further comprise a connection member connected to the first enclosure. The first enclosure comprises an inner surface facing the vibration member and an outer surface opposite to the inner surface, and the connection member can be connected to a periphery of the opening portion of the outer surface of the first enclosure.

According to one or more embodiments of the present disclosure, the sound apparatus can further comprise a soft member connected to the first enclosure. The first enclosure can comprise an inner surface facing the vibration member and an outer surface opposite to the inner surface, and the soft member can be connected to a periphery of the opening portion of the outer surface of the first enclosure.

According to one or more embodiments of the present disclosure, the sound apparatus can further comprise a coupling part configured to couple the enclosure to a mount object equipped with the enclosure. The coupling part can comprise a hollow portion connected to the internal space through the opening portion of the enclosure.

According to one or more embodiments of the present disclosure, the coupling part can comprise a hook member coupled to an inner surface of the first enclosure facing the sound generating module, and the hook member can pass through the mount object and can be accommodated into the opening portion of the first enclosure.

According to one or more embodiments of the present disclosure, the first enclosure can comprise an inner surface facing the vibration member and an outer surface opposite to the inner surface, and the enclosure can further comprise a protrusion portion protruding from the outer surface of the first enclosure to surround the opening portion.

According to one or more embodiments of the present disclosure, the coupling part can comprise a hook member coupled to an inner surface of the first enclosure facing the sound generating module, and the hook member can pass through the mount object and the protrusion portion and can be accommodated into the opening portion of the first enclosure.

According to one or more embodiments of the present disclosure, the first enclosure can comprise an inner surface facing the vibration member and an outer surface opposite to the inner surface. The first enclosure can further comprise a protrusion portion protruding from the outer surface of the first enclosure to surround the opening portion, and a coupling part including a hollow portion coupled to the protrusion portion and connected to the internal space through the protrusion portion and the opening portion.

According to one or more embodiments of the present disclosure, the coupling part can comprise a hollow member accommodated into and coupled to the protrusion portion, the hollow member including the hollow portion, and a latch member connected to the hollow member. The latch member can be configured to be coupled to a mount object equipped with the enclosure.

According to one or more embodiments of the present disclosure, the latch member can comprise a flexible material.

According to one or more embodiments of the present disclosure, the mount object can comprise a first surface facing the enclosure, a second surface opposite to the first surface, and a hole provided to pass through the first surface and the second surface. The latch member can pass through the hole and is coupled to the second surface of the mount object.

According to one or more embodiments of the present disclosure, the vibration apparatus can comprise one or more vibration generator. The one or more vibration generator can comprise a vibration portion, a first electrode portion at a first surface of the vibration portion, and a second electrode portion at a second surface different from the first surface of the vibration portion.

According to one or more embodiments of the present disclosure, the vibration portion can comprise a piezoelectric material.

According to one or more embodiments of the present disclosure, the vibration portion can comprise a plurality of inorganic material portions having a piezoelectric characteristic, and an organic material portion between the plurality of inorganic material portions.

According to one or more embodiments of the present disclosure, the one or more vibration generator can comprise a first cover member at the first electrode portion, and a second cover member at the second electrode portion.

According to one or more embodiments of the present disclosure, the one or more vibration generator can further comprise a signal supply member electrically connected to the vibration portion. A portion of the signal supply member can be accommodated between the first cover member and the second cover member.

According to one or more embodiments of the present disclosure, the vibration apparatus can comprise a first vibration generator and a second vibration generator stacked on each other. Each of the first vibration generator and the second vibration generator can comprise a vibration portion, a first electrode portion at a first surface of the vibration portion, and a second electrode portion at a second surface different from the first surface of the vibration portion.

According to one or more embodiments of the present disclosure, the vibration apparatus can further comprise an intermediate member connected between the first vibration generator and the second vibration generator. The first vibration generator and the second vibration generator can be displaced in a same direction.

A vehicular apparatus according to one or more embodiments of the present disclosure can comprise an interior material exposed at an internal space, and at least one or more sound generating apparatuses disposed at the interior material to output a sound to the internal space. The at least one or more sound generating apparatuses can comprise a sound apparatus. The sound apparatus can comprise an enclosure including an internal space, and a sound generating module at the internal space, the enclosure can comprise an opening portion connected to the internal space.

According to one or more embodiments of the present disclosure, the interior material can comprise one or more holes connected to the opening portion at the at least one or more sound generating apparatuses.

According to one or more embodiments of the present disclosure, the vehicular apparatus can further comprise a connection member between the interior material and the at least one or more sound generating apparatuses.

According to one or more embodiments of the present disclosure, the connection member can comprise a hole connected to the opening portion at the at least one or more sound generating apparatuses.

According to one or more embodiments of the present disclosure, the vehicular apparatus can further comprise a soft member between the interior material and the at least one or more sound generating apparatuses. The interior material can comprise at least one or more curved portions contacting the soft member.

According to one or more embodiments of the present disclosure, the soft member can comprise a hole connected to the opening portion at the at least one or more sound generating apparatuses.

According to one or more embodiments of the present disclosure, the vehicular apparatus can further comprise a coupling part configured to couple the interior material to the enclosure at the at least one or more sound generating apparatuses. The coupling part can comprise a hollow portion connected to the internal space through the opening portion of the enclosure.

According to one or more embodiments of the present disclosure, the vehicular apparatus can further comprise a connection member between the interior material and the at least one or more sound generating apparatuses. The interior material can comprises a hole connected to the opening portion. The coupling part can pass through the opening portion and the hole of the interior material and can be configured to be coupled to the enclosure.

According to one or more embodiments of the present disclosure, the coupling part can comprise a hollow member including the hollow portion, a hook member connected to a first side of the hollow member and coupled to an inner surface of the enclosure facing the at least one or more sound generating apparatuses, and a latch member connected to a second side of the hollow member and coupled to one surface of the interior material exposed at the internal space. The hollow member can pass through the hole of the interior material and can be accommodated into the opening portion.

According to one or more embodiments of the present disclosure, the vehicular apparatus can further comprise a soft member between the interior material and the at least one or more sound generating apparatuses. The interior material can comprise at least one or more curved portions contacting the soft member. The interior material can comprise a hole connected to the opening portion. The coupling part can pass through the opening portion and the hole of the interior material and can be configured to be coupled to the enclosure.

According to one or more embodiments of the present disclosure, the soft member can comprise a hole connected to the opening portion at the at least one or more sound generating apparatuses.

According to one or more embodiments of the present disclosure, the interior material can comprise a hole connected to the opening portion. The enclosure in the at least one or more sound generating apparatuses can further comprise a protrusion portion protruding from the enclosure to surround the opening portion, the protrusion portion can be accommodated into the hole. The coupling part can pass through the hole of the interior material and can be configured to be coupled to the enclosure.

According to one or more embodiments of the present disclosure, the coupling part can comprise a hollow member including the hollow portion, a hook member connected to a first side of the hollow member and coupled to an inner surface of the enclosure facing the at least one or more sound generating apparatuses, and a latch member connected to a second side of the hollow member and configured to be coupled to one surface of the interior material exposed at the internal space. The hollow member can pass through the hole of the interior material and can be accommodated into the opening portion According to one or more embodiments of the present disclosure, the interior material can comprise a hole connected to the opening portion. The enclosure in the at least one or more sound generating apparatuses can further comprise a protrusion portion protruding from the enclosure to surround the opening portion. The protrusion portion can be accommodated into the hole. The coupling part can be accommodated into and coupled to the protrusion portion and can be configured to be coupled to one surface of the interior material exposed at the internal space.

According to one or more embodiments of the present disclosure, the coupling part can comprise a hollow member accommodated into and coupled to the protrusion portion, the hollow member including the hollow portion; and a latch member connected to the hollow member. The latch member can be configured to be coupled to one surface of the interior material exposed at the internal space.

According to one or more embodiments of the present disclosure, the latch member can comprise a flexible material.

According to one or more embodiments of the present disclosure, the at least one or more sound generating apparatuses can comprise one or more vibration generator. The one or more vibration generator can comprise a vibration portion, a first electrode portion at a first surface of the vibration portion, and a second electrode portion at a second surface different from the first surface of the vibration portion.

According to one or more embodiments of the present disclosure, the vibration portion can comprise a piezoelectric material.

According to one or more embodiments of the present disclosure, the vibration portion can comprise a plurality of inorganic material portions having a piezoelectric characteristic, and an organic material portion between the plurality of inorganic material portions.

According to one or more embodiments of the present disclosure, the one or more vibration generator can comprise a first cover member at the first electrode portion, and a second cover member at the second electrode portion.

According to one or more embodiments of the present disclosure, the at least one or more sound generating apparatuses can further comprise a signal supply member electrically connected to the vibration portion. A portion of the signal supply member can be accommodated between the first cover member and the second cover member.

According to one or more embodiments of the present disclosure, the interior material can comprise one or more materials of metal, wood, rubber, plastic, carbon, glass, fiber, cloth, paper, a mirror, and leather.

According to one or more embodiments of the present disclosure, the interior material can comprise at least one or more of a dashboard, a pillar interior material, a roof interior material, a door interior material, a seat interior material, a handle interior material, a floor interior material, a rear package interior material, an overhead console, a rear view mirror, a glove box, and a sun visor. The at least one or more sound generating apparatuses can be configured to vibrate at least one or more of the dashboard, the pillar interior material, the roof interior material, the door interior material, the seat interior material, the handle interior material, the floor interior material, the rear package interior material, the overhead console, the rear view mirror, the glove box, and the sun visor, to generate a sound.

A sound apparatus according to an embodiment of the present disclosure can be applied to or included in a sound disposed at an apparatus or a display apparatus. The apparatus or the display apparatus according to an embodiment of the present disclosure can be applied to or included in mobile apparatuses, video phones, smart watches, watch phones, wearable apparatuses, foldable apparatuses, rollable apparatuses, bendable apparatuses, flexible apparatuses, curved apparatuses, sliding apparatuses, variable apparatuses, electronic organizers, electronic books, portable multimedia players (PMPs), personal digital assistants (PDAs), MP3 players, mobile medical devices, desktop personal computers (PCs), laptop PCs, netbook computers, workstations, navigation apparatuses, automotive navigation apparatuses, automotive display apparatuses, automotive apparatuses, theatre apparatuses, theatre display apparatuses, TVs, wall paper display apparatuses, signage apparatuses, game machines, notebook computers, monitors, cameras, camcorders, and home appliances, or the like. Further, the vibration apparatus according to one or more embodiments of the present disclosure can be applied to or included in an organic light-emitting lighting apparatus or an inorganic light-emitting lighting apparatus. When the vibration apparatus is applied to or included in the lighting apparatuses, the lighting apparatuses can act as lighting and a speaker. In addition, when the vibration apparatus according to one or more embodiments of the present disclosure is applied to or included in the mobile apparatuses, or the like, the sound apparatus can be one or more of a speaker, a receiver, and a haptic device, but embodiments of the present disclosure are not limited thereto.

It will be apparent to those skilled in the art that various modifications and variations can be made in the present disclosure without departing from the spirit or scope of the disclosures. Thus, it is intended that the present disclosure covers the modifications and variations of this disclosure provided that within the scope of the claims and their equivalents.

What is claimed is:

1. A sound apparatus comprising:

a sound generating module including a vibration apparatus configured to be displaced by an electric signal applied to the vibration apparatus;

an enclosure including an internal space containing air and an opening portion connected to the internal space; and a coupling part configured to couple the enclosure to a mount object equipped with the enclosure, wherein the sound generating module comprises:

a vibration member disposed at the internal space to be spaced part from the opening portion; and the vibration apparatus on the vibration member, and wherein the coupling part comprises a hollow portion connected to the internal space through the opening portion of the enclosure.

2. The sound apparatus of claim 1, wherein the vibration apparatus comprises:

a first vibration apparatus on a first surface of the vibration member; and a second vibration apparatus on a second surface different from the first surface of the vibration member.

3. The sound apparatus of claim 1, wherein the enclosure comprises:

a first enclosure including the opening portion; and a second enclosure connected to the first enclosure, and wherein the sound generating module is configured at the internal space between the first enclosure and the second enclosure.

4. The sound apparatus of claim 3, wherein the internal space comprises:

a first space between a first surface of the sound generating module and the first enclosure and connected to the opening portion; and a second space between a second surface, which is opposite to the first surface, of the sound generating module and the second enclosure.

5. The sound apparatus of claim 3, wherein the vibration member is supported by the first enclosure and the second enclosure, and wherein the vibration apparatus includes:

a first vibration apparatus connected to a first surface of the vibration member; and a second vibration apparatus connected to a second surface different from the first surface of the vibration member, or connected to the first vibration apparatus.

6. The sound apparatus of claim 5, further comprising a connection member connected to the first enclosure, wherein the first enclosure comprises an inner surface facing the vibration member and an outer surface opposite to the inner surface, and wherein the connection member is connected to a periphery of the opening portion of the outer surface of the first enclosure.

7. The sound apparatus of claim 5, further comprising a soft member connected to the first enclosure, wherein the first enclosure comprises an inner surface facing the vibration member and an outer surface opposite to the inner surface, and wherein the soft member is connected to a periphery of the opening portion of the outer surface of the first enclosure.

8. The sound apparatus of claim 3, wherein:

the coupling part comprises a hook member coupled to an inner surface of the first enclosure facing the sound generating module, and the hook member passes through the mount object and is accommodated into the opening portion of the first enclosure.

9. The sound apparatus of claim 3, wherein:

the first enclosure comprises an inner surface facing the vibration member and an outer surface opposite to the inner surface, and the first enclosure further comprises a protrusion portion protruding from the outer surface of the first enclosure to surround the opening portion.

10. The sound apparatus of claim 9, wherein:

the coupling part comprises a hook member coupled to an inner surface of the first enclosure facing the sound generating module, and the hook member passes through the mount object and the protrusion portion and is accommodated into the opening portion of the first enclosure.

11. The sound apparatus of claim 1, wherein:

the vibration apparatus comprises one or more vibration generators, and the one or more vibration generators comprise:

a vibration portion;

a first electrode portion at a first surface of the vibration portion; and a second electrode portion at a second surface different from the first surface of the vibration portion.

12. The sound apparatus of claim 11, wherein the vibration portion comprises a piezoelectric material.

13. The sound apparatus of claim 11, wherein the vibration portion comprises:

a plurality of inorganic material portions having a piezoelectric characteristic; and an organic material portion between the plurality of inorganic material portions.

14. The sound apparatus of claim 11, wherein the one or more vibration generators comprise:

a first cover member at the first electrode portion; and a second cover member at the second electrode portion.

15. The sound apparatus of claim 14, wherein:

the one or more vibration generators further comprise a signal supply member electrically connected to the vibration portion, and a portion of the signal supply member is accommodated between the first cover member and the second cover member.

16. The sound apparatus of claim 1, wherein:

the vibration apparatus comprises a first vibration generator and a second vibration generator stacked on each other, and each of the first vibration generator and the second vibration generator comprises:

a vibration portion;

a first electrode portion at a first surface of the vibration portion; and a second electrode portion at a second surface different from the first surface of the vibration portion.

17. The sound apparatus of claim 16, wherein:

the vibration apparatus further comprises an intermediate member connected between the first vibration generator and the second vibration generator, and the first vibration generator and the second vibration generator are displaced in a same direction.

18. A vehicular apparatus, comprising:

an interior material exposed at the internal space; and at least one or more sound generating apparatuses disposed at the interior material to output a sound to the internal space, wherein the at least one or more sound generating apparatuses comprise the sound apparatus of claim 1, and wherein the interior material is the mount object.

19. The vehicular apparatus of claim 18, wherein the interior material comprises one or more holes connected to the opening portion into the internal space at the at least one or more sound generating apparatuses.

20. The vehicular apparatus of claim 18, further comprising a connection member between the interior material and the at least one or more sound generating apparatuses.

21. The vehicular apparatus of claim 20, further comprising a soft member between the interior material and the at least one or more sound generating apparatuses, wherein the interior material comprises at least one or more curved portions contacting the soft member.

22. The vehicular apparatus of claim 18, wherein the coupling part is configured to couple the interior material to the enclosure that accommodates the internal space at the at least one or more sound generating apparatuses.

23. The vehicular apparatus of claim 22, wherein the interior material comprises a hole connected to the opening portion, and wherein the coupling part passes through the opening portion and the hole of the interior material and is configured to be coupled to the enclosure.

24. The vehicular apparatus of claim 23, wherein the coupling part comprises:

a hollow member including the hollow portion, wherein the hollow member passes through the hole of the interior material and is accommodated into the opening portion;

a hook member connected to a first side of the hollow member and coupled to an inner surface of the enclosure facing the at least one or more sound generating apparatuses; and a latch member connected to a second side of the hollow member and coupled to one surface of the interior material exposed at the internal space.

25. The vehicular apparatus of claim 22, further comprising a soft member between the interior material and the at least one or more sound generating apparatuses, wherein the interior material comprises at least one or more curved portions contacting the soft member, wherein the interior material comprises a hole connected to the opening portion, and wherein the coupling part passes through the opening portion and the hole of the interior material and is configured to be coupled to the enclosure.

26. The vehicular apparatus of claim 22, wherein the interior material comprises a hole connected to the opening portion, wherein the enclosure in the at least one or more sound generating apparatuses further comprises a protrusion portion protruding from the enclosure to surround the opening portion, wherein the protrusion portion is accommodated into the hole, and wherein the coupling part passes through the hole of the interior material and is configured to be coupled to the enclosure.

27. The vehicular apparatus of claim 26, wherein the coupling part comprises:

a hollow member including the hollow portion, wherein the hollow member passes through the hole of the interior material and is accommodated into the opening portion;

a hook member connected to a first side of the hollow member and coupled to an inner surface of the enclosure facing the at least one or more sound generating apparatuses; and a latch member connected to a second side of the hollow member and configured to be coupled to one surface of the interior material exposed at the internal space.

28. The vehicular apparatus of claim 22, wherein the interior material comprises a hole connected to the opening portion, wherein the enclosure in the at least one or more sound generating apparatuses further comprises a protrusion portion protruding from the enclosure to surround the opening portion, wherein the protrusion portion is accommodated into the hole, and wherein the coupling part is accommodated into and coupled to the protrusion portion and is configured to be coupled to one surface of the interior material exposed at the internal space.

29. The vehicular apparatus of claim 18, wherein:

the interior material comprises at least one or more of a dashboard, a pillar interior material, a roof interior material, a door interior material, a seat interior material, a handle interior material, a floor interior material, a rear package interior material, an overhead console, a rear view mirror, a glove box, and a sun visor; and the at least one or more sound generating apparatuses are configured to vibrate at least one or more of the dashboard, the pillar interior material, the roof interior material, the door interior material, the seat interior material, the handle interior material, the floor interior material, the rear package interior material, the overhead console, the rear view mirror, the glove box, and the sun visor, to generate a sound.

30. A sound apparatus comprising:

a sound generating module including a vibration apparatus configured to be displaced by an electric signal applied to the vibration apparatus; and an enclosure including an internal space containing air and an opening portion connected to the internal space, wherein the enclosure further comprises:

a first enclosure including the opening portion; and a second enclosure connected to the first enclosure, and wherein the sound generating module is configured at the internal space between the first enclosure and the second enclosure, wherein the first enclosure comprises an inner surface facing a vibration member and an outer surface opposite to the inner surface, and wherein the first enclosure further comprises:

a protrusion portion protruding from the outer surface of the first enclosure to surround the opening portion; and a coupling part including a hollow portion coupled to the protrusion portion and connected to the internal space through the protrusion portion and the opening portion.

31. The sound apparatus of claim 30, wherein:

the coupling part comprises:

a hollow member accommodated into and coupled to the protrusion portion, the hollow member including the hollow portion; and a latch member connected to the hollow member, and wherein the latch member is configured to be coupled to a mount object equipped with the first enclosure.

32. The sound apparatus of claim 31, wherein:

the mount object comprises:

a first surface facing the first enclosure;

a second surface opposite to the first surface; and a hole provided to pass through the first surface and the second surface, and the latch member passes through the hole and is coupled to the second surface of the mount object.

* * * * *